INVENTORS.
THOMAS A. DOWDS
MORTON W. MARCOVITZ
CORNELIUS C. PERKINS
WILLIAM W. PHILLIPS
BY William E. Cleaver
ATTORNEY

ITEM-DATA PROCESSOR

Filed Sept. 8, 1960

38 Sheets-Sheet 5

March 1, 1966 T. A. DOWDS ETAL 3,238,356

ITEM-DATA PROCESSOR

Filed Sept. 8, 1960 38 Sheets-Sheet 14

March 1, 1966 T. A. DOWDS ETAL 3,238,356

ITEM-DATA PROCESSOR

Filed Sept. 8, 1960

38 Sheets-Sheet 18

March 1, 1966 T. A. DOWDS ET AL 3,238,356

ITEM-DATA PROCESSOR

Filed Sept. 8, 1960

38 Sheets-Sheet 22

March 1, 1966 T. A. DOWDS ETAL 3,238,356

ITEM-DATA PROCESSOR

Filed Sept. 8, 1960

38 Sheets-Sheet 23

March 1, 1966 T. A. DOWDS ETAL 3,238,356

ITEM-DATA PROCESSOR

Filed Sept. 8, 1960 38 Sheets-Sheet 24

March 1, 1966 T. A. DOWDS ETAL 3,238,356

ITEM-DATA PROCESSOR

Filed Sept. 8, 1960

38 Sheets-Sheet 25

March 1, 1966 T. A. DOWDS ETAL 3,238,356

ITEM-DATA PROCESSOR

Filed Sept. 8, 1960 38 Sheets-Sheet 26

March 1, 1966 T. A. DOWDS ETAL 3,238,356

ITEM-DATA PROCESSOR

Filed Sept. 8, 1960 38 Sheets-Sheet 35

3,238,356

ITEM-DATA PROCESSOR

Thomas A. Dowds, Malvern, Morton W. Marcovitz, Drexel Hill, Cornelius C. Perkins, Malvern, and William W. Phillips, Berwyn, Pa., assignors to Burroughs Corporation, Detroit, Mich., a corporation of Michigan Filed Sept. 8, 1960, Ser. No. 54,638
29 Claims. (Cl. 235—61.7)

This invention relates to data processing systems.

Heretofore in a data processing system where a comparison is made between data from one source with data from another source, or sources, and subsequent mathematical operations performed on this data, it has been the practice to provide first, a comparison circuit to handle the data comparison and secondly, a bank of counter devices, or an arithmetic unit, to handle the mathematical operations. Further in prior art data processing systems timing pulses are generated from an independent source and the circuits throughout are designed to operate in accordance with system synchronized timing pulses. Such system synchronization of timing pulses very often causes the initiation of an operation to be delayed until a proper timing pulse is generated. In addition, the increased use of magnetic core memories in data processing systems has made it necessary to provide methods and means to effect non-destructive information readouts.

The present invention provides improvements in each of the data processing operations just described. For instance, the arithmetic unit in the present invention does double duty in that it enables a comparison of data from two sources to be made and also performs mathematical operations on the data being handled. Such an arrangement offers a data processing system in which there is substantial saving of equipment. The timing pulses in the present system are asynchronously generated and are provided without delay at the times they are needed. The magnetic core memory is arranged to transmit information therefrom in parallel while simultaneously recirculating the information signals back to the magnetic cores from whence they came, thereby providing a non-destructive readout.

It is an object of the present invention to provide an improved data processing system.

It is a further object of the present invention to provide an improved data processing system which accepts and compares data from at least two independent sources.

It is a further object of the present invention to provide a non-destructive magnetic core memory readout means.

It is a further object of the present invention to provide improved timing pulse generating means.

It is a further object of the present invention to provide a data processing system which performs mathematical operations on data from two sources after a predetermined relationship between the data from the two sources is recognized.

In accordance with a main feature of the present invention, there is provided a first temporary memory register and an arithmetic means through which all the data being handled are transmitted and to which control circuits are connected. By virtue of this feature, data from one source can be compared with data from another source as well as mathematically operated on, within the same equipment.

In accordance with another feature of the present invention, there is provided a second temporary memory register. The second temporary memory register is loop connected with the arithmetic means mentioned above. Accordingly, data which are transmitted into the arithmetic means from the second memory register can be mathematically operated thereon and subsequently retransmitted into the second memory register for possible further disposition therefrom, depending upon the programming of the system.

In accordance with another feature of the present invention, there is provided a readout circuit for a magnetic core memory device which enables information to be read out in parallel and substantially simultaneously retransmitted into the magnetic cores from whence it was retrieved, thereby effecting a non-destructive information readout.

In accordance with another feature of the present invention, there is provided timing pulse circuit means which generate timing pulses asynchronously, thereby enabling one data processing operation to follow another without the normal delay in time. The normal delay in time refers to the time that the system waits for a synchronous timing pulse.

The foregoing and other objects and features of this invention will be best understood by reference to the following description of an embodiment of the invention taken in conjunction with the accompanying drawings, wherein.

Figures 24, 25:
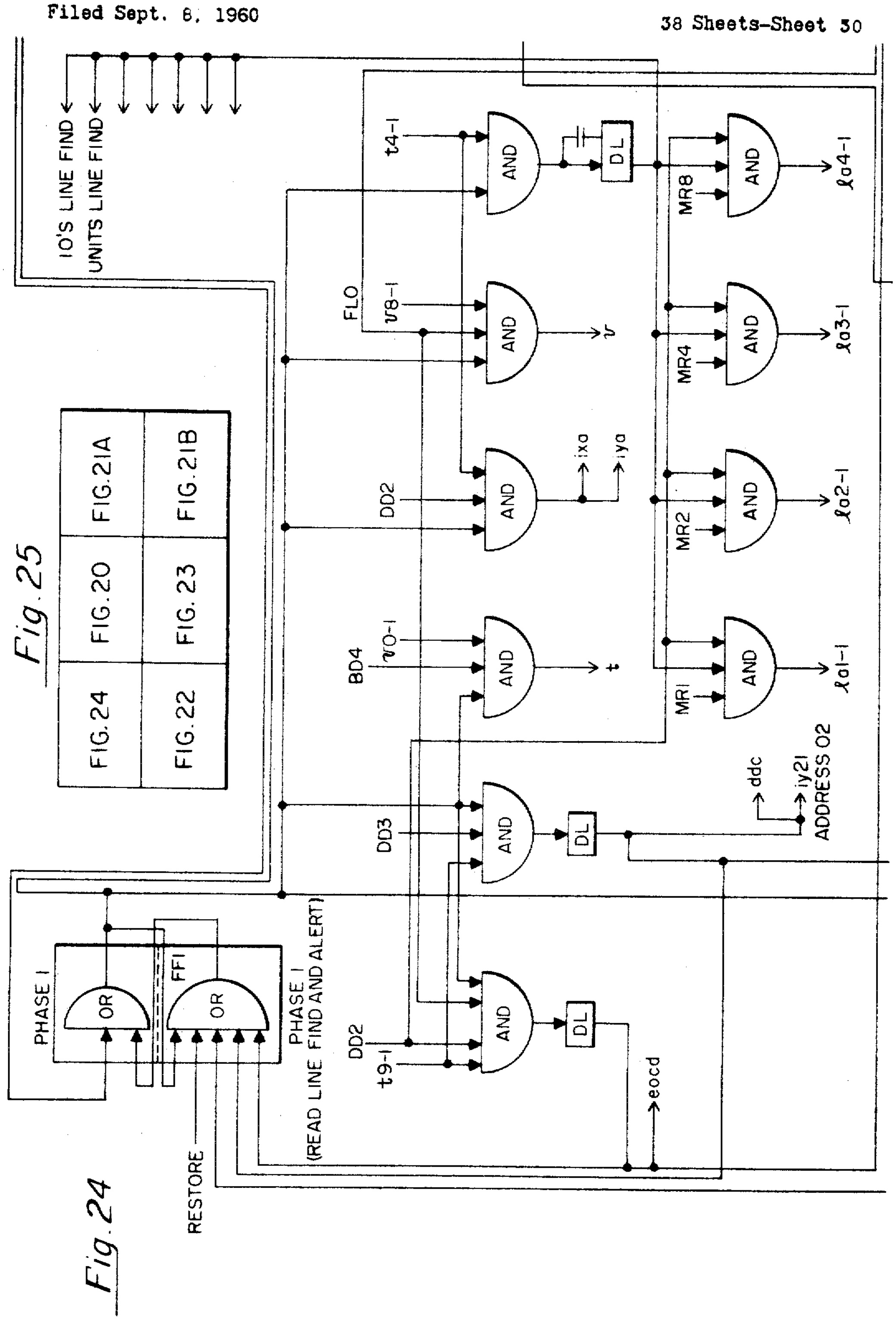
Figures 26, 27:
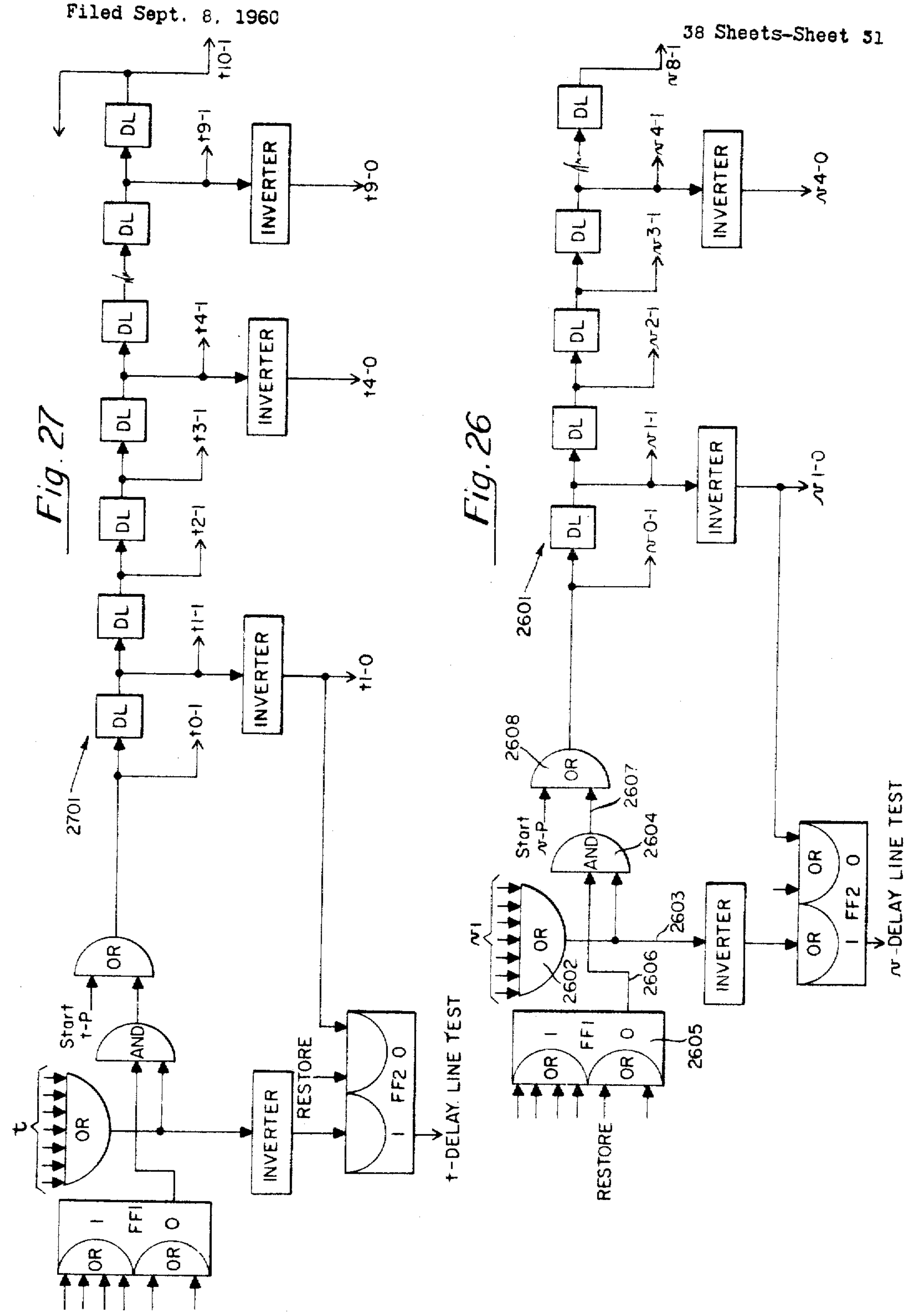
Figure 28:
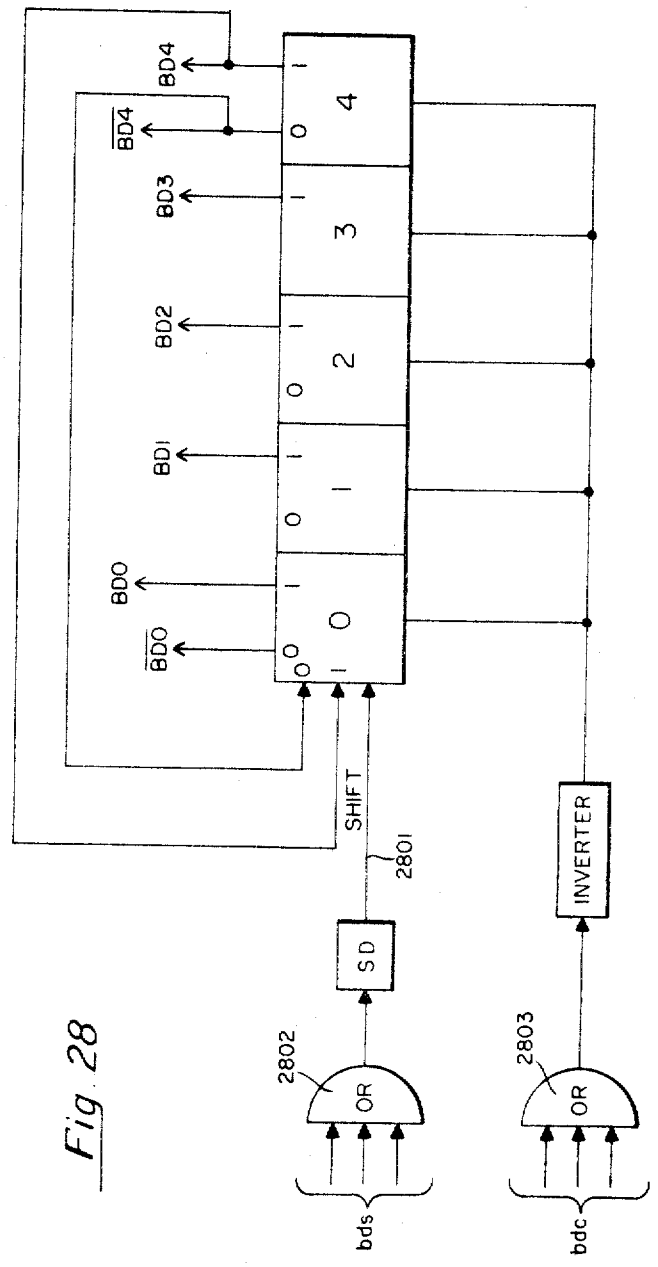
Figure 29:
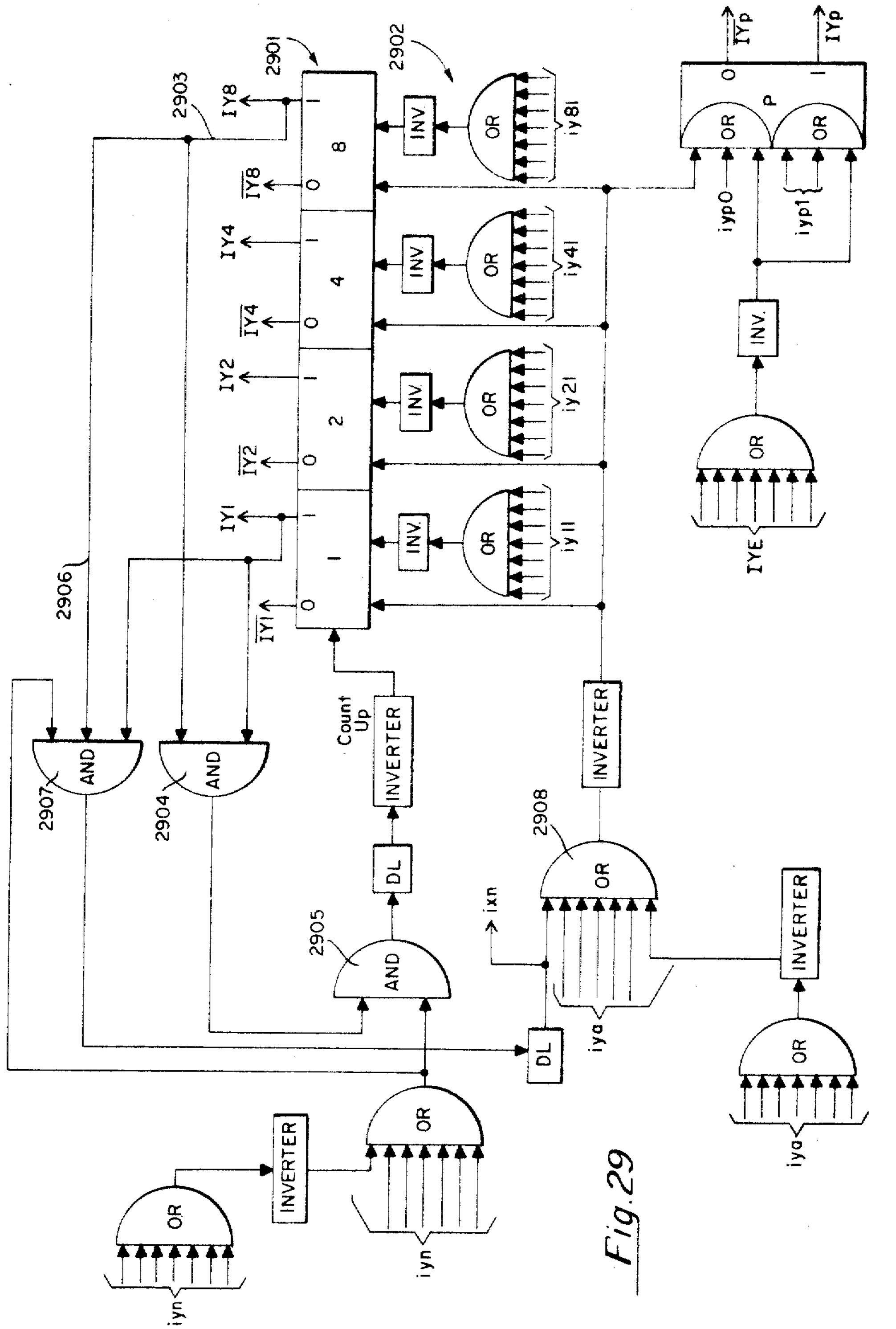
Figure 30:
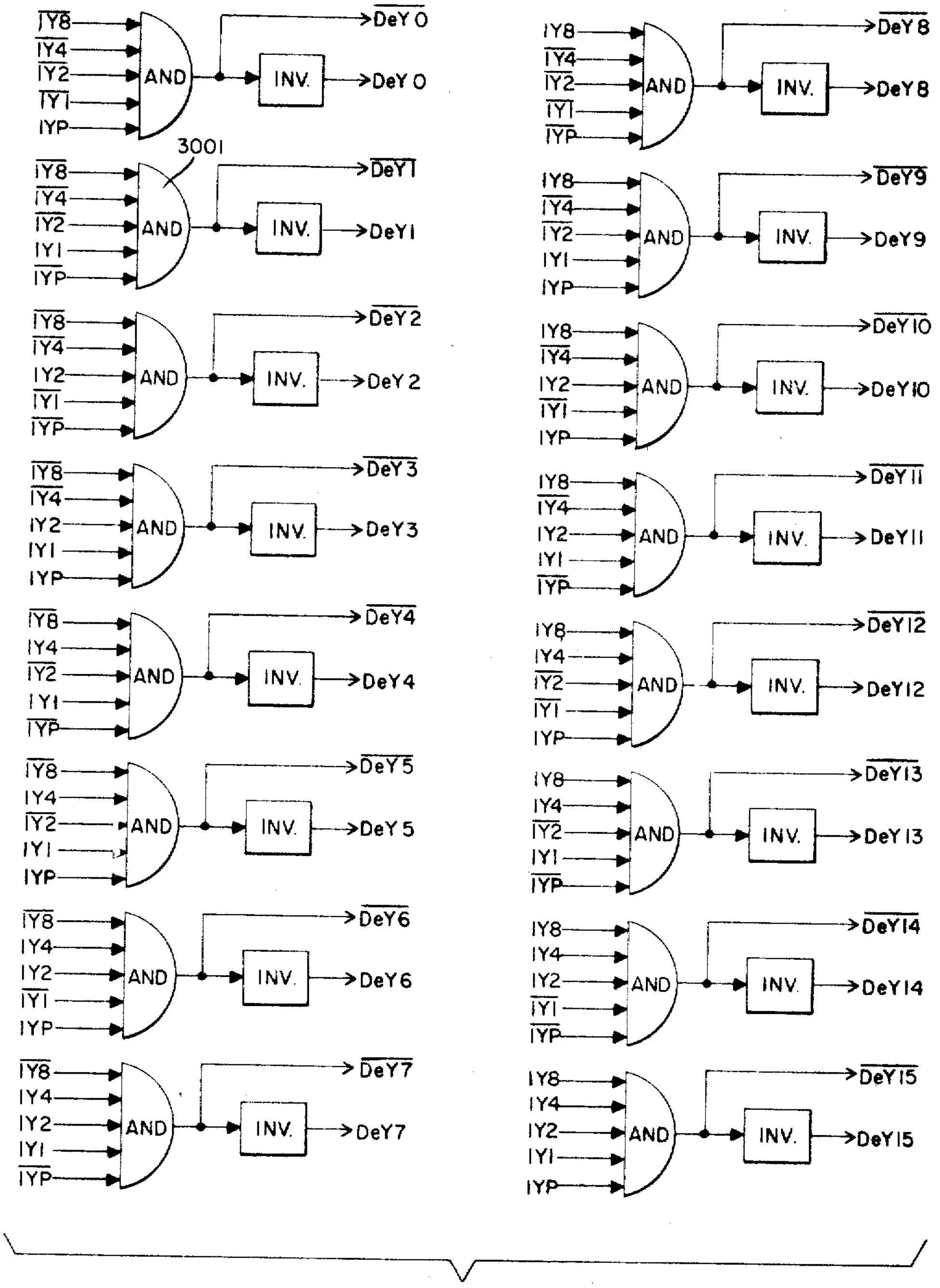
Figure 36:
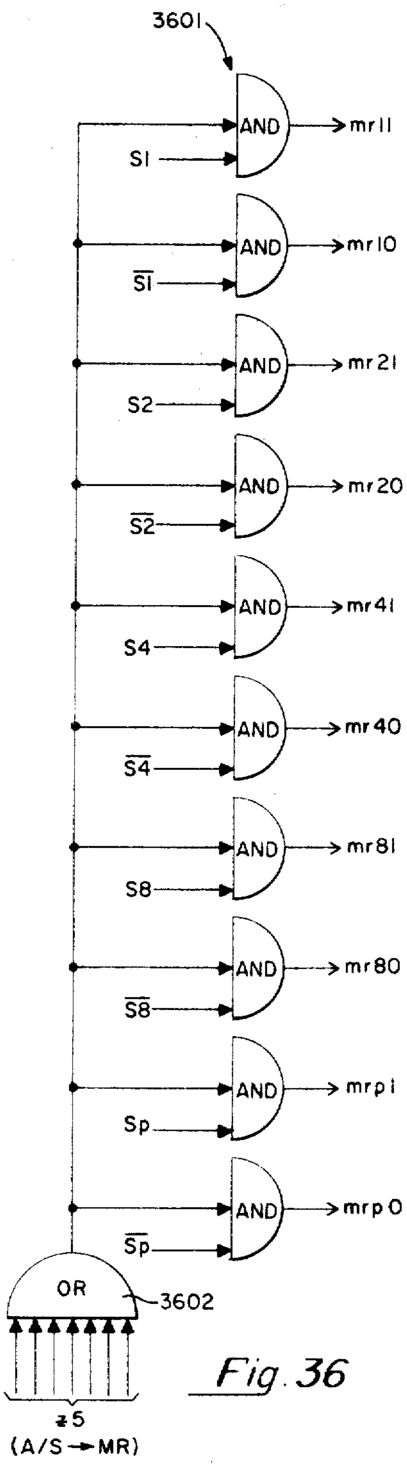
Figure 31:
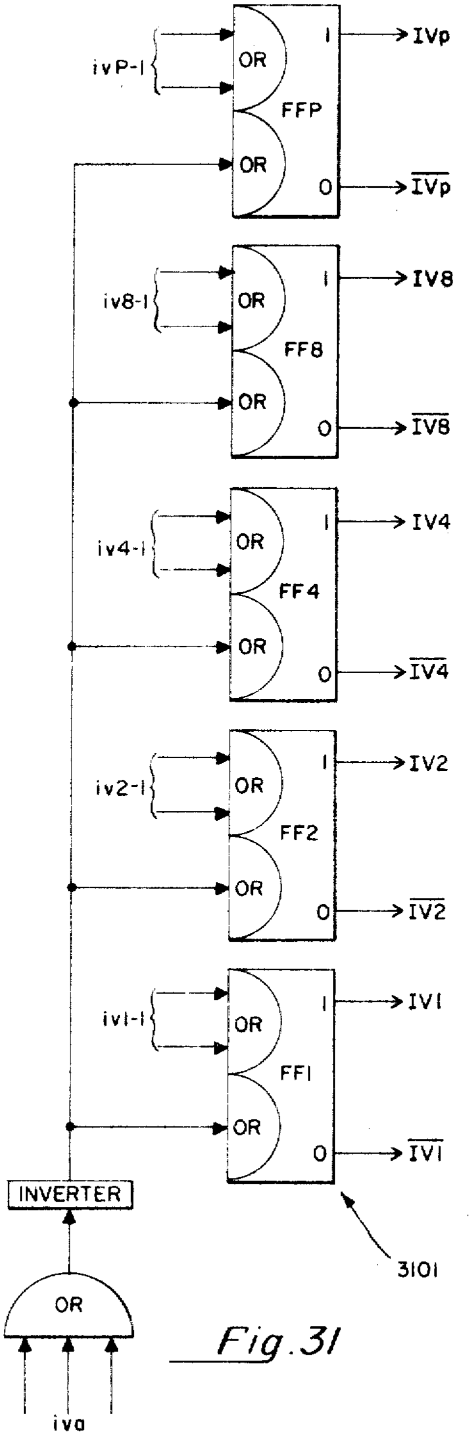
Figure 32:
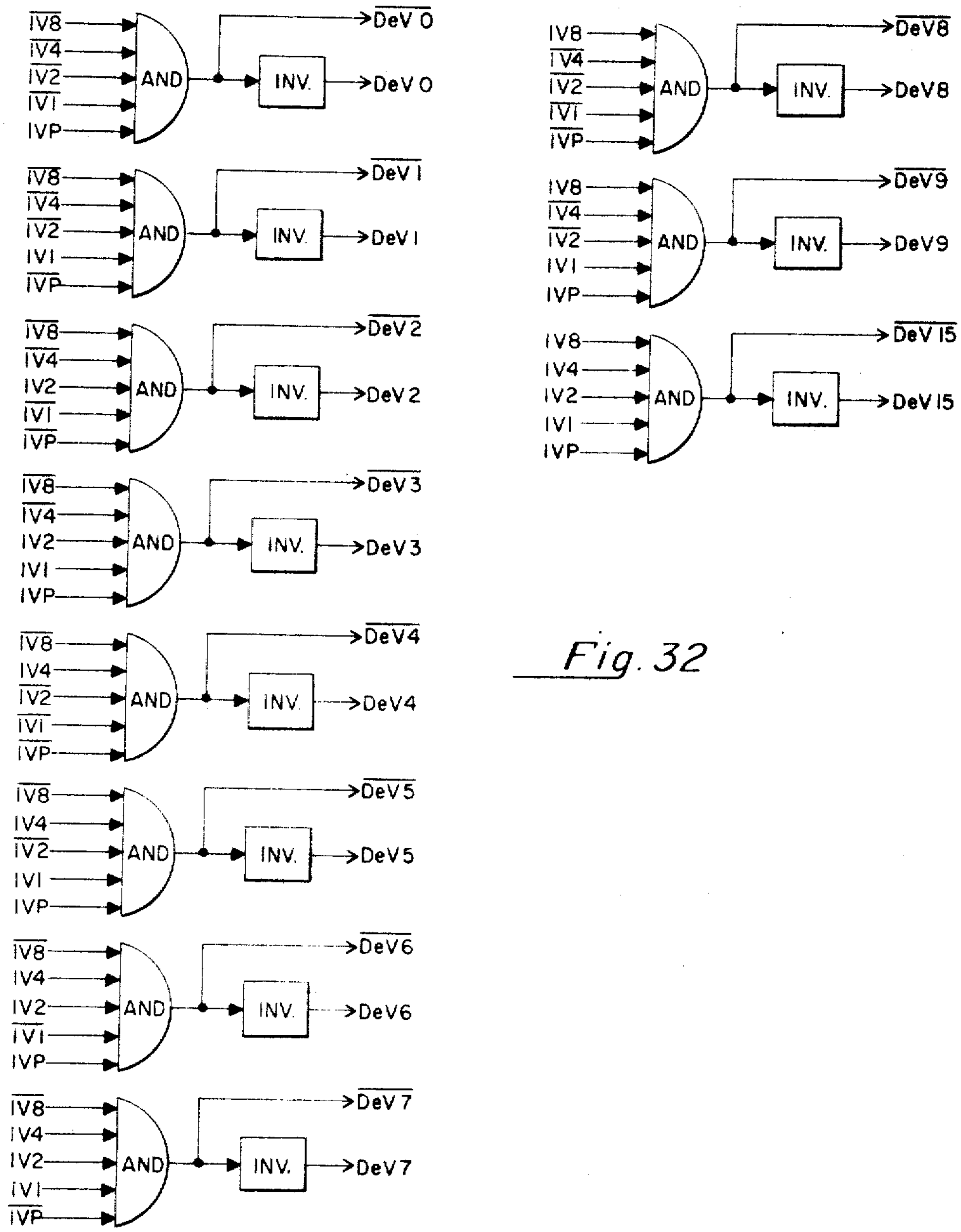
Figure 33:
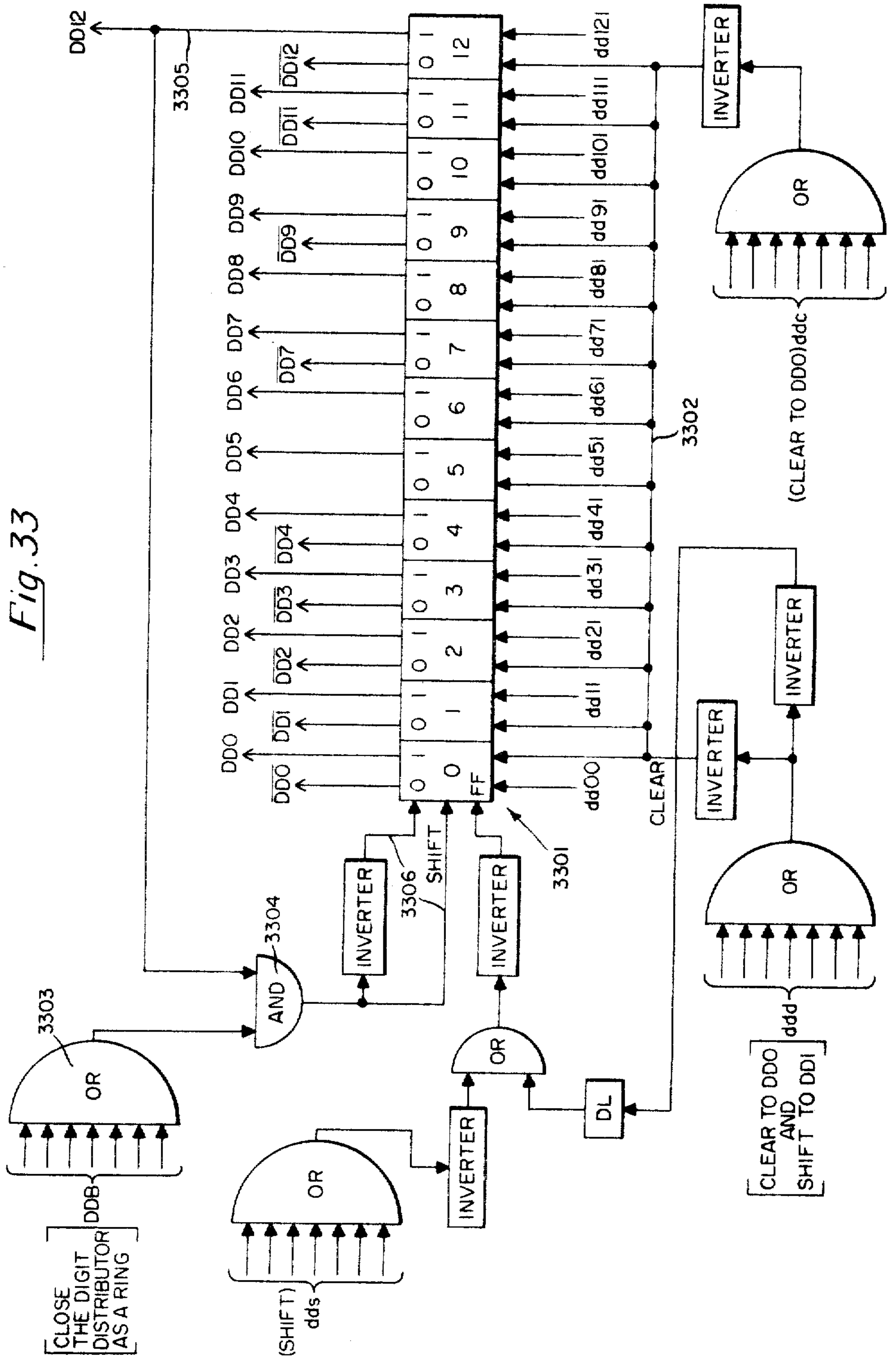
Figure 35:
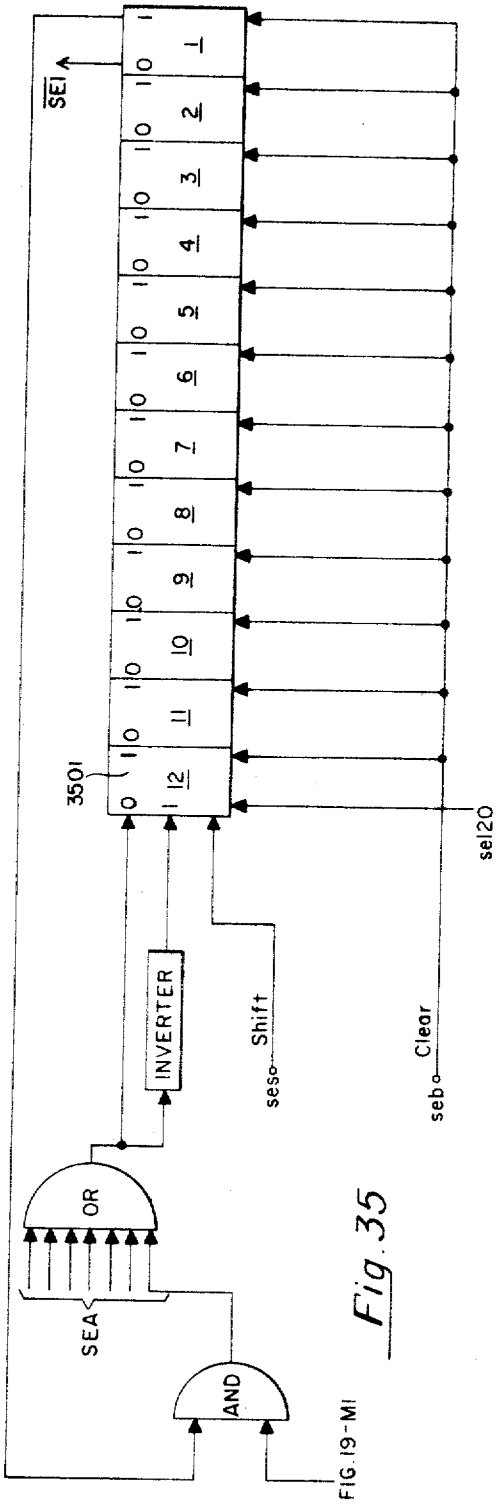
Figure 34:
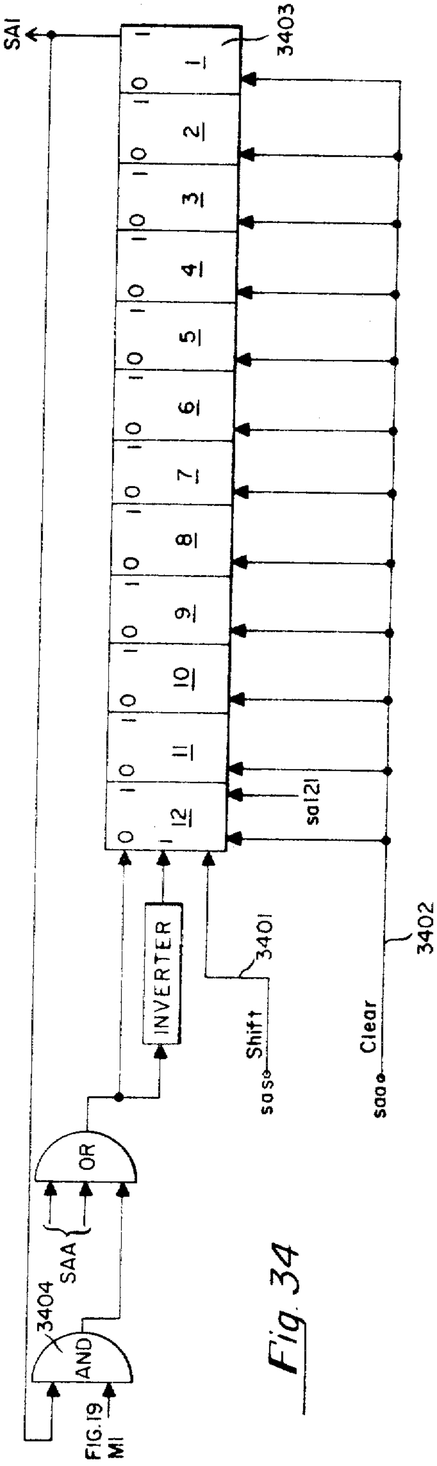

FIGURE 25, comprising FIGURES 20, 21A, 21B, 22, 23 and 24, is a composite schematic of the ledger feed circuitry;

FIGURE 26 is a schematic of $v$ pulse timing circuitry;

FIGURE 27 is a schematic of $t$ pulse timing circuitry;

FIGURE 28 is a schematic of bit distributor circuitry;

FIGURE 29 is a schematic of the IY instruction signals;

FIGURE 30 is a schematic of the decoded IY instruction signals;

FIGURE 31 is a schematic of IV instruction signals;

FIGURE 32 is a schematic of the decoded IV instruction signals;

FIGURE 33 is a schematic of the digit distributor timing circuit;

FIGURE 34 is a schematic of the shift register used in the accumulator register;

FIGURE 35 is a schematic of a second type of shift register used in the accumulator register; and FIGURE 36 is a schematic of the memory register control.

Before considering the operation of the present invention, certain standard elements used throughout the system should be described and certain ground rules should be established so that throughout the explanation where these elements are used and where the ground rules dictate the operation, these points will not have to be reiterated.

Throughout the description, the signals on the various lines and from the various gates, etc. will be designated high and low. The terms high and low will refer respectively to a relatively high voltage condition and a relatively low voltage condition. The high and low signals control the elements to which they are applied in accordance with whether or not these elements respond to a relatively high voltage condition or a relatively low voltage condition. In close relationship to this ground rule, it should also be understood that throughout the description signals may be designated as representing either a binary zero or a binary one condition. For our purposes, a binary zero condition will be a low signal, while a binary one condition will be a high signal. However, in an operation where a high signal is used with a binary zero condition, the signal is designated "not binary one" by having a bar symbol (logical not) over the character designation of the signal. An example of this last described rule is evident with the two signals from the memory register flip-flop number one shown in FIG. 9A. When this flip-flop is in its binary one condition, it transmits a high signal designated MR1 and when this flip-flop is in its binary zero condition, it transmits a high signal designated $\overline{MR1}$ (not MR1).

Figure 7:
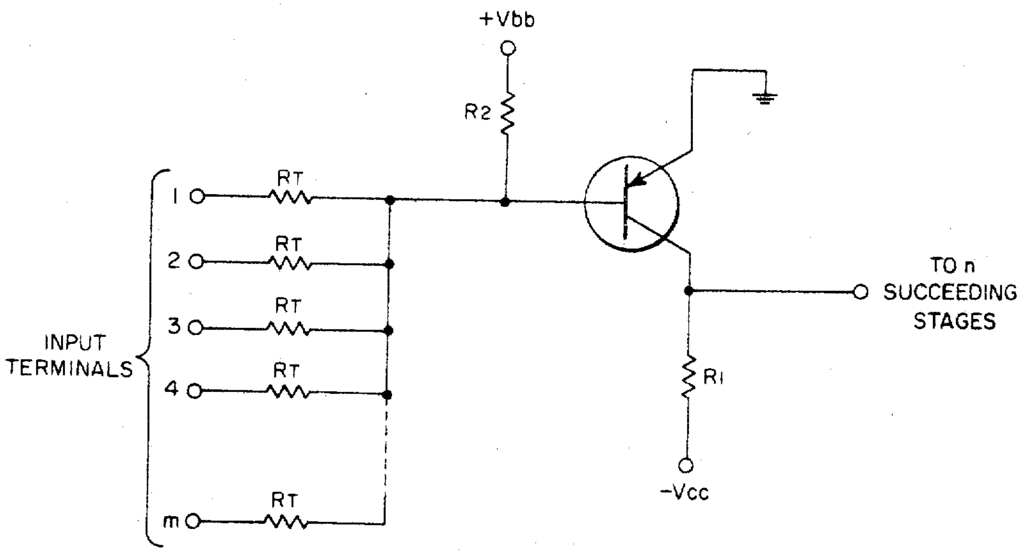
FIGURE 7 is a resistance coupled transistor logic gate.

Throughout the system, there are numerous AND gates and OR gates used to effect certain logical operations. Occasionally OR gates are referred to as mixers. As a general rule, each AND gate and each OR gate is structurally the same, since each gate is a resistance coupled transistor logical gate as shown in FIGURE 7. This RCTL gate structure and its operation has been described and claimed in U.S. patent application Serial No. 612,848, entitled "Switching Networks," by Dr. Howard E. Tompkins, filed September 28, 1956, and assigned to Burroughs Corporation. For our purposes, this gate can be considered to operate such that if each of the input signals is high, a low output signal will be provided and if any one or more of the input signals is low, the gate will provide a high output signal. If a gate operation does not follow this ground rule it will be so stated in the description. Obviously other types of AND gates and OR gates might be used provided the circuitry components are altered accordingly.

Further in the description there will be references to the generation and correction of parity numbers. Under this rule, if a binary coded digit has in its binary coded designation an even number of ones, then this binary coded digit will be assigned a parity bit of one. On the other hand, if the binary coded digit has an odd number of ones, this binary coded digit will be assigned a parity bit of zero.

In the figures, wherever possible, an arrow with an open head will indicate the signal which actually pulses a component (to which it is applied) into operation.

Throughout the description references will be made to timing pulses identified as DD pulses (DD0 through DD12), *t* pulses, and *v* pulses. With regard to elapsed time it should be noted at this point that for each digit (DD) pulse, DD0 through DD12, it is possible to have either ten *t* pulses or eight *v* pulses. However, since the timing pulses throughout are generated asynchronously, it is to be understood that there need not necessarily be ten *t* pulses available each time a DD pulse is present. The relationship between the different timing pulses depends upon the relative instant that each of the pulse generators (for the various timing signals) is started. It should be noted here that a system "word" may be made up of twelve digits and an algebraic sign. The algebraic sign is dealt with at DD0 time and the twelve digits are each dealt with respectively at DD1 through DD12 times.

GENERAL DESCRIPTION

The present invention is described in the mode in which it is used with the Burroughs' Visible Record Computer. It is to be understood however that the invention can be used with other forms of data processing systems.

Figure 1:
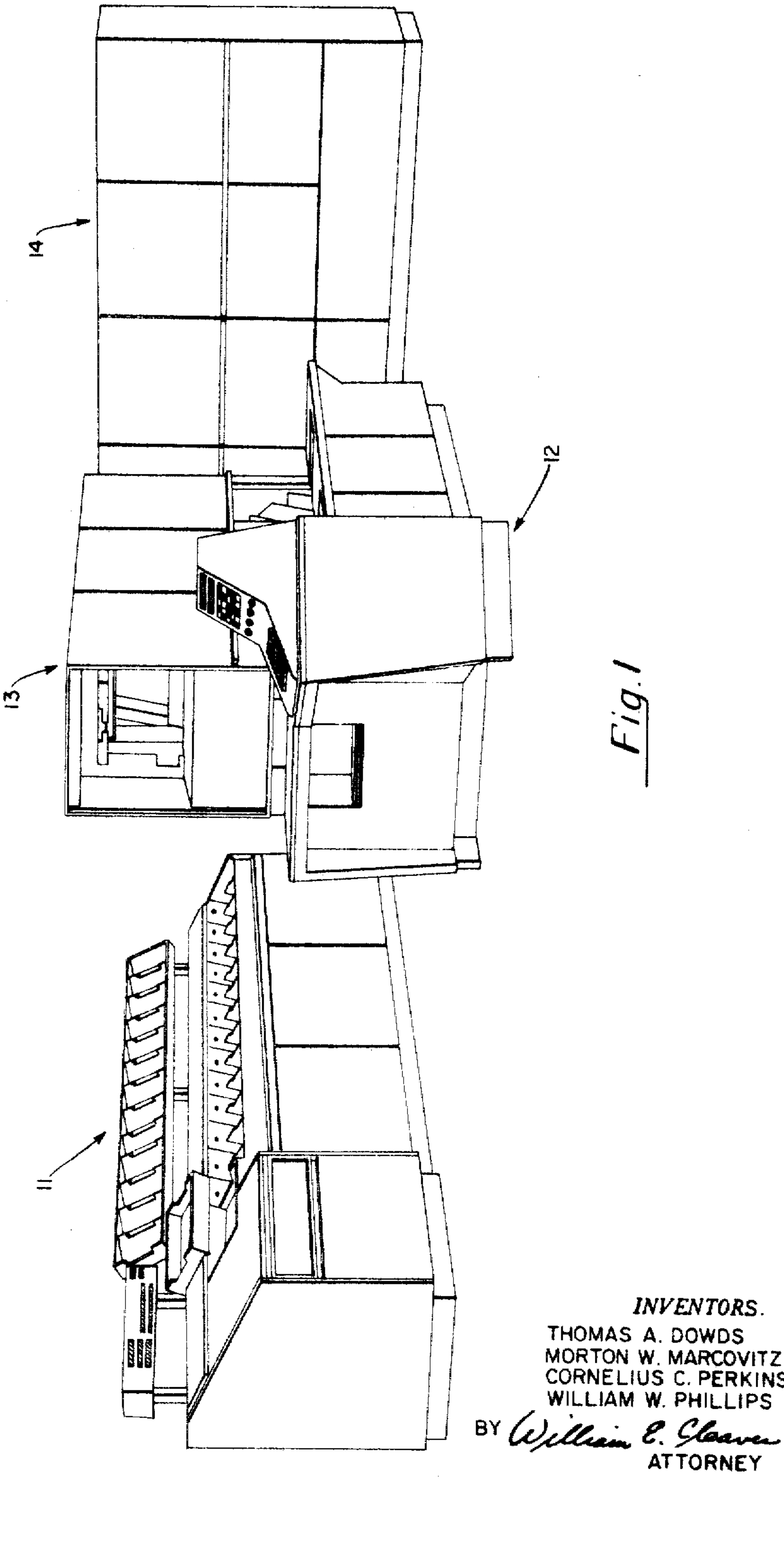
FIGURE 1 is a pictorial view of the Visible Record Computer system.

In FIG. 1 there is shown a pictorial view of the Burroughs' Visible Record Computer. On the left hand side of FIG. 1 an item sorter reader 11 is depicted. The item sorter-reader is a device which reads and recognizes printed characters from a document such as a bank check or a bank deposit slip. The characters on the checks or deposit slips are printed with magnetizable ink and a description of how this reading process is accomplished is found in the United States patent application entitled "Character Recognition," by I. M. Sheaffer and Eric Seif, filed January 29, 1959, Serial No. 789,983. In the center of FIG. 1 there is shown a console 12 which serves to enable the operator to control the system. Behind the console there is a printer device 13 which is capable of transporting bank ledger cards therethrough and printing new information on these ledger cards. Pictured to the right and rear of the printer device 13 is the computer device 14 which is the heart of the system insofar as data processing is concerned and which is the device with which the present invention is primarily concerned.

Figure 2:
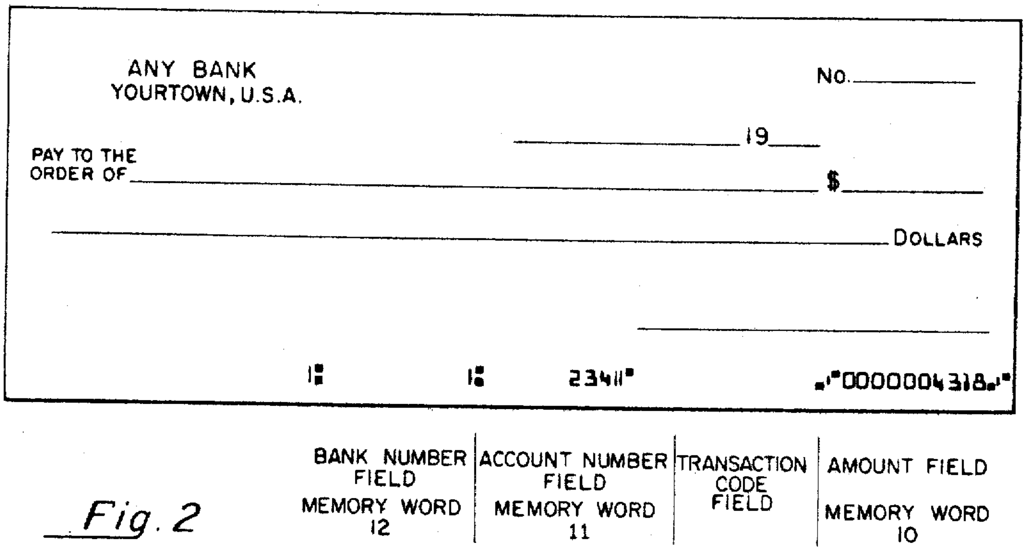
FIGURE 2 is an illustration of a bank check with bank information printed thereon in magnetizable ink.

FIG. 2 depicts a bank check which has characters printed in magnetizable ink along the bottom edge in accordance with the system developed under the sponsorship of the American Banking Association.

It will be noted from the illustration in FIG. 2 that the amount of the check is defined by furthermost righthand group of printed characters and that the second group of printed characters (moving to the left) defines the account number. Normally the check is transported into the check reader in a fashion which moves the right hand edge (as shown in FIG. 2) into the reader station first and therefore the amount of the check is the first item which is read. The check amount is stored in a relative state of permanency as it is read into the system. The account number is then read and as will become apparent hereinafter, it is temporarily stored to be compared with the various account numbers in a group of ledger cards. The information on the check is translated into binary coded form, to be used throughout the system.

Figure 3:
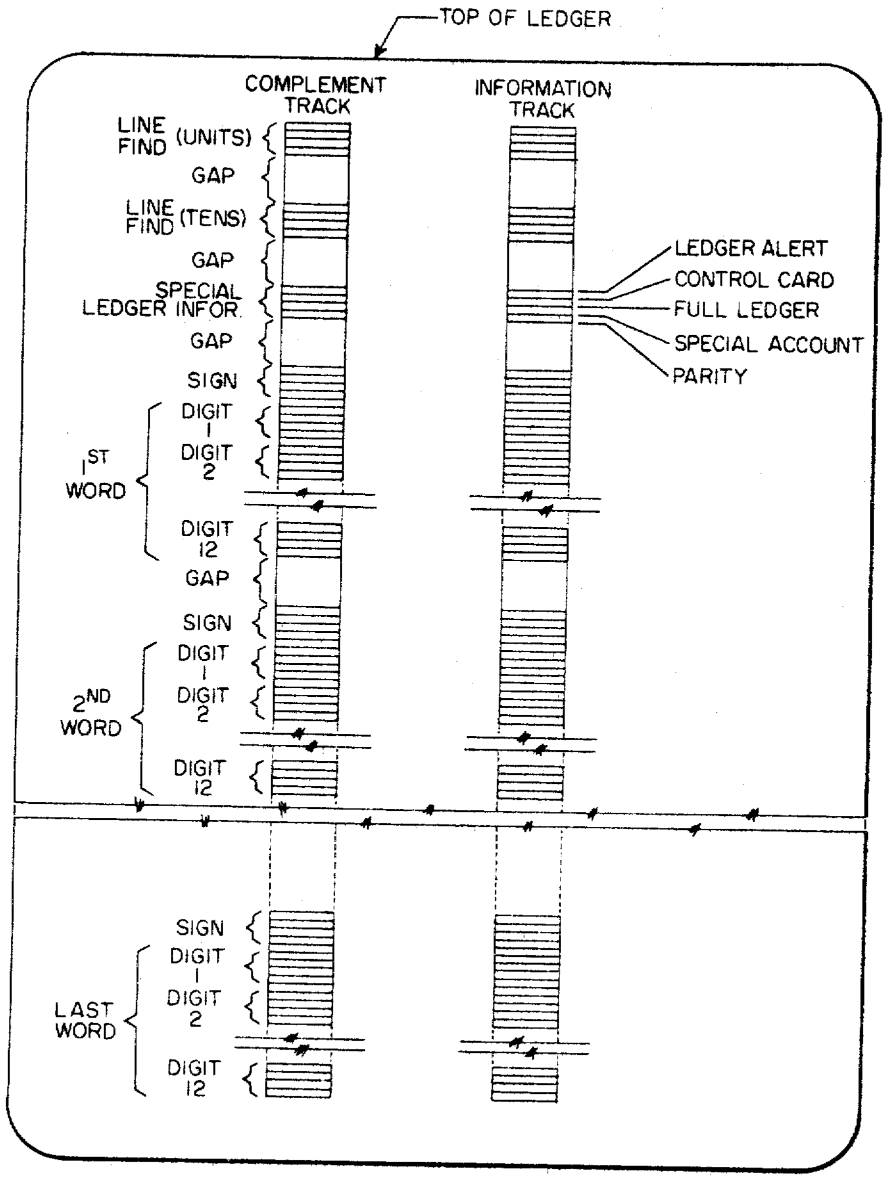
FIGURE 3 shows the reverse side of a bank ledger card with two magnetic recording stripes thereon.

With regard to the ledger cards, the Visible Record Computer makes use of the front and reverse sides of these bank ledger cards. On the front side of the ledger normal banking information is printed by the printing device 13. For instance, the account number, the latest balance of the account, deposit amounts, withdrawal amounts, etc. are printed on the ledger cards. In FIG. 3 there is shown an example of the two magnetic stripes which are placed on the reverse side of the bank ledger as used with this system. These two magnetic stripes have banking information (as designated in FIG. 3) stored in magnetic bit form.

The first two groups of magnetic bits in FIG. 3 are the line find information in units and tens. The system is thus capable of locating 99 lines for printing information on a ledger card. By having the last line upon which information has been printed, recorded on the stripes in magnetic bit form (thereby in an erasable fashion), it is possible to have the ledger automatically moved up to the next clear line for printing the next bank transaction information, when this information becomes available. Thereafter the line finding information for the "filled"

line is erased and the latest line, which has been filled by printing, is recorded on the stripes for use in a subsequent printing operation.

In dealing with our present invention, we will only consider the information on the magnetic stripes starting with the algebraic sign, digit 1, digit 2, etc. This information pertains to the account number and balance, etc. By having the information recorded magnetically on the reverse side of the ledger, the information can be retrieved and used in the data processing operation as will become apparent below.

Figure 4:
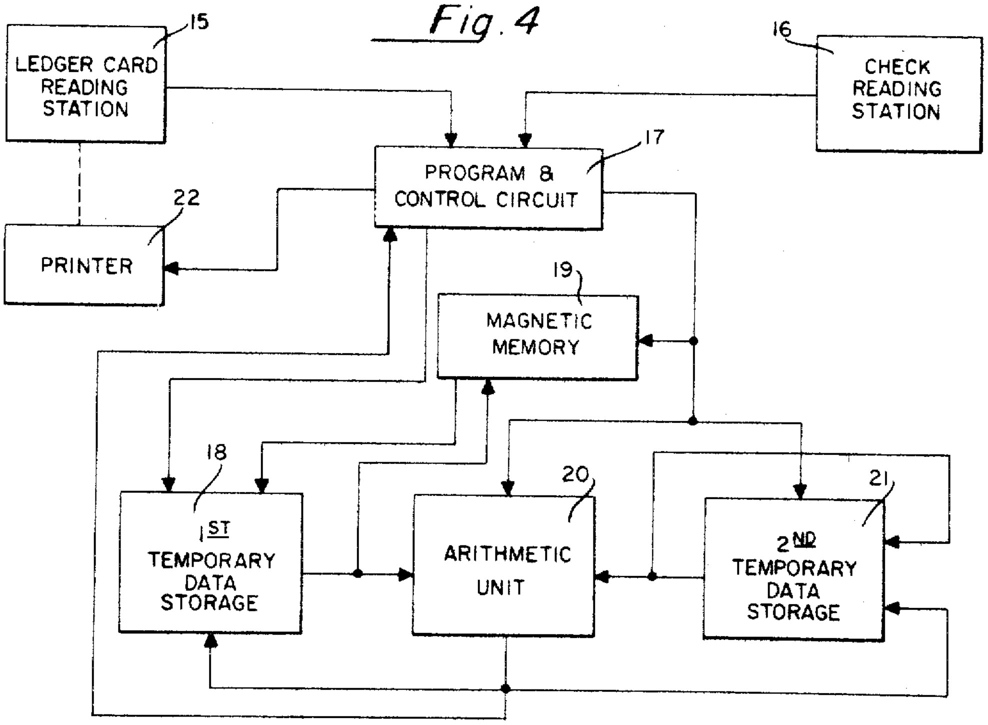
FIGURE 4 is a block diagram of the present invention.

Turning now to FIG. 4, consider the general operation of the system which is the subject of the present invention. In FIG. 4 there is a block entitled "ledger card reading station" 15 and this pertains to a reading device which is contained in item 13 of FIG. 1. Opposite the station 15 there is shown a "check reading station" 16 which pertains to item 11 shown in FIG. 1. The information signals obtained at each of these reading stations are initially transmitted through control circuits, primarily in the form of gating components, which are identified by block 17 in FIG. 4. It is to be clearly understood that within the system itself, there isn't a neatly arranged package of program and control circuits, since these circuits are dispersed throughout the system to perform the proper operation, but for a general consideration at this time it is convenient to show the program and control circuits in a single package 17.

After the information has been transmitted through the control circuits 17 from either of the reading stations, it is transferred into the first memory register or first temporary data storage device 18. From the first temporary data storage device 18, the information is transmitted selectively into both the magnetic memory device 19 and the arithmetic unit 20. In the arithmetic unit 20, the information may be subjected to a comparison operation or may be mathematically operated on and therefore possibly altered to a "new" answer. The information in the arithmetic unit is then transmitted therefrom; to the second temporary data storage device 21; or to the first temporary data storage device 18; or to the printing device 22, the latter path also being through proper control circuits.

In the operation of comparing a ledger, or a group of ledgers, with a check, the check information is first read at the check reading station 16 and transmitted through the control circuit 17, through the first temporary data storage device 18, through the arithmetic unit 20 into the second temporary data storage device 21. The amount on the check has been simultaneously transferred to the magnetic core memory device 19 where it is held in a relative state of permanency. After transferring the information into the second temporary data storage device, the ledgers are processed (the magnetic stripes on the reverse side being read) until the ledger with an account number matching that of the check is found. This operation is accomplished by having the ledger information transmitted from station 15 through the control circuit 17, through the first temporary data storage device 18 into the arithmetic unit 20. In the arithmetic unit 20 the information coming from the ledger is compared with information coming from the second temporary data storage 21 (the account number of the check) by a mathematical operation. For instance, the ledger account number may be subtracted from the account number of the check and if there is an answer other than zero it becomes evident that there is not a match between the two account numbers.

When, in fact, this last-mentioned answer is zero, and therefore a match has been determined, the system shifts into another operation or a new program step. The additional information from the check is retrieved from the magnetic core memory 19, transmitted through the first temporary data storage device 18, through the arithmetic unit 20 into the second temporary data storage device 21. Then the information from the matched ledger is retrieved from the magnetic memory device 19, transmitted through the first temporary storage unit 18, into the arithmetic unit 20 wherat there is a mathematical operation performed. For instance, the check amount would be subtracted from the latest balance of the account and the remaining balance of the account transmitted from the arithmetic unit 20, through the control circuit 17, to the printer 22 whereat the new balance would be printed on the ledger.

It becomes evident then from the above general description that all the information being handled in the present data processing system is routed through the first temporary data storage or first memory register 18 and through the arithmetic unit 20 whereat comparison operations and mathematical operations are accomplished. The details of this operation will become evident as they are described hereinbelow.

The following tabulation of symbols and abbreviations used throughout the description and in the figures will be helpful in understanding the operation of the system. In listing the functions, the symbols are listed only in their positive sense and not in their negation. In other words, to find $\overline{DD0}$, look up DD0 and take the negated meaning.

Since there are a great number of registers in the system, a standard method of designating the pulses and voltage levels associated with the registers is used. The method is illustrated by means of an imaginary XY register:

*YYA*=Put "1" into first stage of register when next shift pulse is received.

*YYB*=Close register as a ring counter.

*YY"X"*=Output from set side of FF"X", register YY.

$\overline{YY''X''}$=Output from reset side of FF"X", register YY.

*YYE*=Set both sides of FFP, register YY.

*yya*=Clear YY register to—0 0 0 0 . . . 0.

*yyb*=Clear YY register to—1 1 1 . . . 1.

*yyc*=Clear register to—0 0 0 . . . 1.

*yyd*=Clear YY register to—1 0 0 0 . . . 0 and shift to 0 1 0 0 0 . . . 0.

*yyn*=Causes *yy* counter to count up.

*yys*=Shift YY register to right 1 place.

FLIP FLOPS

*FF*1=*FF*11=Output from set side of FF No. 1.

$\overline{FF1}$=*FF*10=Output from reset side of FF No. 1.

*ff*11=Set *ff* No. 1.

*ff*10=Reset *ff* No. 1.

*ff*1c=Complement *ff* No. 1.

SYMBOLS AND ABBREVIATIONS

*ACC*=Accumulator Register (also AR).

*ACMI*=Operation code—No. 82—make sign of accumulator minus.

*ACPL*=Operation code—No. 81—make sign of accumulator plus.

*ADD*=Operation code—No. 32—add contents of memory address XY to accumulator.

*ALN*=Operation code—No. 64—if "alert," take next instructions; if no "alert" skip next instruction.

*ALS*=Operation code—No. 74—if "alert," skip next instruction; if no "alert," take next instruction.

*AR*=Five shift registers, sign FF's, and associated hardware collectively called the accumulator registers (also ACC).

*AR*→*A/S*=Connect the least significant digit of the accumulator to the X inputs of the Adder/Subtracter; if "AR→A/S" is not present (high), then a zero is put into the X inputs (Z21) of the A/S (also called Z1).

*A/S*=Base 16 Adder/Subtracter (also Arithmetic Unit) with parity check and correction circuit to change to base 2, base 10, and base 12 outputs.

*A/S*→$\overline{Z}$=Put A/S into internal subtract mode.

*A/S→AR*=Connect output of A/S to shift inputs of MSD position of A/R (Z14).

*A*1=Internal add operation note $[(+X)+(+Y)]$, $[(+X)-(-Y)]$, $[(-X)+(-Y)]$ and $[(-X)-(+Y)]$=internal add.

$\overline{A1}$=Internal sub operation note $[(+X)-(+Y)]$, $[(+X)+(-Y)]$, $[(-X)+(+Y)]$, and $[(-X)-(-Y)]$=internal sub.

*A*2=Minuend is X.

$\overline{A2}$=Minuend is Y.

*a*20=Set minuend Y.

*a*21=Set minuend X.

*a*3=Shifts "carry" FF.

*a*30=Store "no carry in" in "carry" FF ($\overline{C1}$).

*a*31=Store "carry in" in "carry" FF (C1).

*B*2=A/S is Adding/Subtracting base 2.

$\overline{B2}$=A/S is Adding/Subtracting base 10 or base 12.

*B*2→*R*2=Used in A/S correction circuit to indicate base 2 and a sum from intermediate (base 16) A/S, second bit.

*B*12=A/S is Adding/Subtracting base 12.

$\overline{B12}$=A/S is Adding/Subtracting base 2 or base 10.

*bcp*=Beginning cycle pulse. There are four types, *bcpo*=low, *becpl*=high, *bcpf*, a special *bcp* given in middle of multiple instruction to simulate *becp*, and *bcpk* is given during *sck* or *hsa* to simulate *bcp*.

*BD*=Bit distributor register (always a closed ring) five stage shift register.

*BOL*=Beam-of-Light detector.

*BP*=Bit plane (1, 2, 4, 8, *p*) in memory.

*BY*=Binary counter "Y" (BY0 indicates BY=0).

*C*1=Carry in from previous digit.

*C*2=Intermediate base "16" carry to 2 bit.

*C*4=Intermediate base "16" carry to 4 bit.

*C*8=Intermediate base "16" carry to 8 bit.

*C*16=Intermediate base "16" carry to 16 bit.

*C*10=Carry out of A/S becomes C1 (carry into next digit) after shift. See C10—AFL.

*CA*=Operation code—No. 30—Clear accumulator and add memory location XY (to AR).

*CAI*=Operation code—No. 56—Clear accumulator and add index register (LSD's to ACC).

*CAM*=Operation code—No. 50—Clear accumulator and add contents of memory location specified by index register to accumulator.

*CAXY*=Operation code—No. 40—Clear accumulator and add constants (tape) XY to accumulator.

*CHS*=Operation code—No. 83—change sign of accumulator.

*CIO*=Carry in-out of A/S.

*CLA*=Operation code—No. 80—clear accumulator to zero and make sign plus.

*CLR*=Abbreviation meaning clear.

*CCR*=Operation code—No. 36—clear memory.

*CP*=Primary tape reader control register.

*CS*=Secondary tape reader control register.

*CSP*=Operation code—No. 84—make sign of accumulator—decimal.

CSS=Operation code—No. 85—make sign of accumulator—sterling.

*D*=Delay—slows leading edge of a negative input pulse. Delay time—width of input pulse.

*DD*=Digit distributor (see register conventions), 13 stage-register.

*DECO*=A level which decodes the operation codes.

*DeP*=(1→12) Decoded from CP register.

*DeS*=(1→12) Decoded from CS register.

*DeV*=(0→9) Decoded from IV register.

*DeW*=(0→9) Decoded from IW register.

*DeX*=(0→12) Decoded from IX register.

*DeY*=(0→15) Decoded from IY register.

*DIV*=Operation code—No. 35—operation code reserved for divide instruction.

*DL*=Delay line.

*DMV*=Delay multivibrator (pulse input—level output).

*DR*=Information drivers (1→10).

*DU*=Decoded units line find.

*E & I*=Extract and Insert cycle.

*FF*=Flip-Flop (see 1.5).

*FLAC*↑ & $\overline{FLAC}$↓=$-\overline{DeW1}+\overline{DeW3}$ (feed ledger and compare instructions, 01 or 03).

*G*=-Gate

*HSA*=Operation code—No. 54—high speed read, first field of item, and add it to accumulator.

*I*=Inverter.

*I* only=Insert part of E & L cycle with "E" inhibited.

*IR*=Initial restore—special restore level occurring just after machine is turned on.

*IRD*=Operation code—No.14—read item.

*IV*="V" register.

*IW*="W" instruction register.

*IX*="X" correct as in register.

*IX→MR*=Load IX into MR.

*IY*="Y" instruction register.

*IY→MR*=Load IY into MR.

*IZ*="Z" instruction register.

*IZ→AZ*=Load IZ into AZ.

*L*=Thirty to 50 μsecond pulses from information stripe.

$\overline{L}$=Thirty to 50 μsecond pulse from complementary stripe.

*LA*=Ledger alert register.

*LRC*=Operation code instruction—No. 01—read ledger and compare.

*LRP*=Operation code instruction—No. 05—read ledger and position at XY.

*LSD*=Least significant digit.

*LSP*=Operation code instruction—No. 23—space ledger—one line.

*LT*=Ten's line find register.

*LU*=Unit's line find register.

*LWR*=Operation code instruction—No. 11—write and eject ledger.

*M*=Mixer (usually followed by a number indicating element number on a specific drawing).

*m*1=Trigger E & I cycle.

*m*2–0=Negative going pulse at end of E & I cycle.

*m*2–1=Positive going pulse at end of E & I cycle.

*MIN*=Operation code—No. 61—if accumulator minus, take next instruction; if plus, skip next instruction.

*MIS*=Operation code—No. 71—if accumulator minus, skip next instruction; if plus, take next instruction.

*MR*=Memory Register (Y1, Y2, Y4, Y8, YP on A/S).

*MR→A/S*=(Z22) Connect memory register to Y inputs if A/S; otherwise Y input is assumed to be ZERO.

*MSD*=Most significant digit.

*MUL*=Operation code—No. 34—Multiply contents of 00 by contents of XY.

*NNC*=Negative number correction.

P(1, 2, 3)=intermediate parity bits in A/S.

*PB*=Plugboard.

*PB*1=M*r*1–1 from PB.

*PB*2=M*r*2–1 from PB.

*PB*3=M*r*4–1 from PB.

*PB*4=M*r*8–1 from PB.

*PB*5=M*r*P–1 from PB.

*PB*6=M*ra* from PB.

*PB*7=*dds* from PB.

*PB*8=*ixn* from PB.

*PB*9=*iyn* from PB.

*pe*=Test parity. If error is present, set PE F.F.

*PR*=Print symbol register.

*PRA*=Operation code instruction—No. 89—set up symbol from least significant digit of accumulator.

*PRT*=Operation code instruction—No. 20—print accumulator contents in format XY.

*PRY*=Operation code instruction—No. 88—set up symbol from Y digit.

*PS*=pulse standardizer (level input→pulse output).

*R1, R2, R4, R8*=Intermediate sum bits in A/S.

*RD*=Energize read driver.

*RDP*=Read digit plane (1→13).
*RESTORE*=Level that resets most of the FF's in order to be ready for next instruction.
*RLE*=Read ledger error.
*S (1, 2, 4, 8, p)*=Output sum bits of A/S.
*SA (1 through 5)*= Sense amplifiers.
*SA*="1" register of accumulator (X1).
*SB*="2" register of accumulator (X2).
*SC*="4" register of accumulator (X4).
*SD*="8" register of accumulator (X8).
*SE*="P" register of accumulator (XP).
*SAP*=Stopping or stopped at printer—a ledger is stopping at the printer.
*SBM*=Operation code—No. 53—subtract contents of memory location specified by index register from accumulator.
*SCK*=Sequence check.
*SD*=Shift register driver.
*SN*=Sign register—composed of two FF's. FF1 registers a "+" (FF10) or a "+" (FF11) and FF2 registers sterling or decimal.
*SP*=Parity bit from parity generator No. 2, which generates a parity from final sums.
*SPO*=Parity bit from parity generator No. 1, which generates a parity from original data, carries and correction circuit.
$\overline{SPC}$=Inhibit *eocd* and negative number correction, only when low.
*SRD*=Shift register driver.
*SSI*=Start Symbol on item is being printed.
*SUB*=Operation code—No. 33—subtract contents of XY from accumulator.
*SXY*=Operation code—No. 43—subtract constants of instruction tape fields XY from LSD of accumulator.
*t*=Initiate the "*t*" timing pulse.
*v*=Trigger "*v*" delay line.
*v*1→*v*8=Timing pulses from *v* delay line. If followed by a 1 (v1–1), pulse is high (for a gate); if followed by a 0 (v1–0), pulse is low (for a mixer).
*VRC*=Visible Record Computer.
*WD*=Write driver.
*WDP*=(1→13) write digit plane.
*WP*=Word plane.
*X*=(1, 2, 4, 8, *p*) Bit signals into A/S from AR
*Y*=(1, 2, 4, 8, *p*) Bit signals into A/S from MR
*Z1*=AR→A/S (221 signal mixed→Z1).
*z1*=Shift AR (goes through mixer to yield *sas, sbs, sas, sis,* and *ses*).
*Z2*=MR→A/S (output of mixer ZZZ).
*z2*=Clear AR (goes through mixer to yield *saa, sba, sca, dss,* and *aeb*).
*z5*=See A/S→MR.
*Z14*=See A/S→AR.
*Z16*=Close ring on AR (yields SAB, SBB, SCB, SDB and SEB).
*ZZ1*=See AR→A/S (ZZ1→AR→A/S; $\overline{ZZ1}$→ZERO →A/S).
*ZZ2*=See Mr→A/S (ZZ2→MR→A/S; ZZ2→ZERO →A/S).
*ZP*=Parity error.

Figure 5:
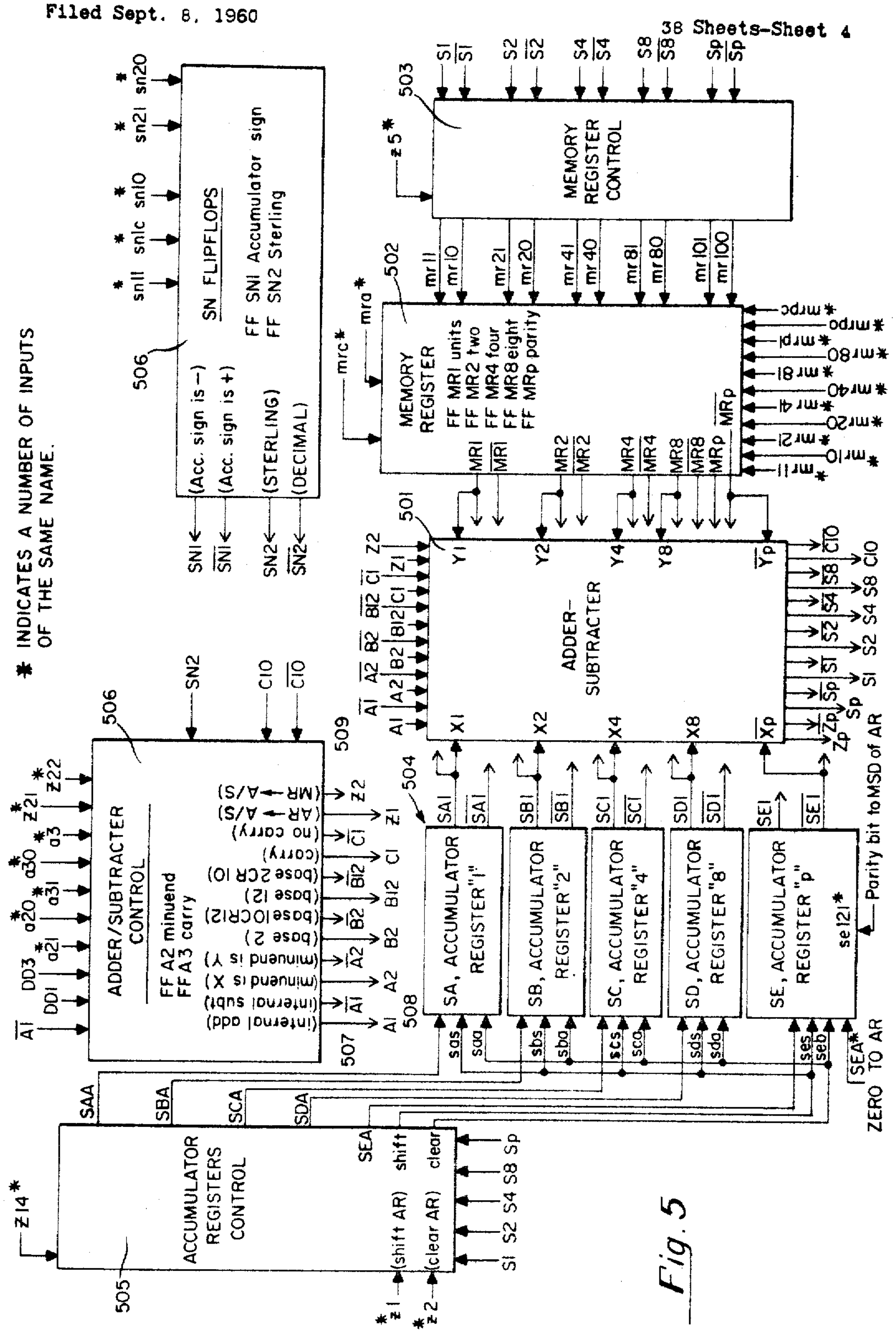
FIGURE 5 is a block diagram in more detail of the temporary data storage elements in the arithmetic unit of FIGURE 4.

By way of broadening the general picture of the present system consider FIG. 5 which depicts in block form the arithmetic unit 501; the first temporary storage device 502 with its control circuitry 503; and the second temporary storage device 504 with control circuitry 505. The arithmetic unit may be referred to in the description as the adder/subtracter unit. A portion of the arithmetic unit control circuitry is represented by blocks 506. If the notations on the various lines are considered in view of the above definitions the general operation of the arithmetic unit can be readily understood.

Many control signals are transmitted from the control circuitry 506 to the arithmetic unit 501. By way of example a control signal $\overline{A1}$ (507) indicating "internal subtract," another A2 (508) indicating "minuend is in the accumulator register," and two others Z1 and Z2 (509) can cause the information in the memory register to be subtracted from the information in the accumulator register.

The output lines from the first temporary storage device (memory register) are designated MR1, MR2, MR4, MR8, MRP and their respective negations. The MR lines as well as MRP are connected to Y terminals in the arithmetic unit 501. The Y input lines are connected to many gate devices within the arithmetic unit 501 as will be discussed below. The memory register 502 is primarily made up of a bank of five flip-flops. Four of the flip-flops are assigned to store four bits of a binary coded digit, while the fifth flip-flop stores the parity number of the digit. Hence the memory register handles binary coded digits one at a time.

The accumulator register 504 is composed primarily of five sets of twelve flip flops. Each of the twelve flip flops is associated in a column with its counterpart in each of the other sets. Accordingly a binary coded digit is stored along a column of flip flops with a different weighted bit plus the parity stored in the respective five flip flops of the column. Since there are twelve columns of flip flops a system word of twelve digits may be stored in the accumulator register 504. The flip flops are connected as shift registers according to rows.

When an operation is underway which requires that the information in the accumulator register 504 be read out, the word will be advanced one digit at a time into the arithmetic unit 501. It follows then that the arithmetic unit 501 deals with only two digits at any one time, the digits being one from the accumulator register 504 and one from the memory register 502. When a comparison operation takes place the respective shift registers are each conditioned to act as ring counters as well as shift registers. In other words, when the digit information is advanced from the accumulator register 504 into the arithmetic unit 501 it is simultaneously recirculated, or loop connected, back into the shift registers. In this way a comparison can be made and the information in the accumulator register 504 is not lost. This makes it possible for instance for an account number from a check to be repeatedly compared with each account number in a batch of ledger cards until the ledger card account number which matches the check is found.

Figure 6:
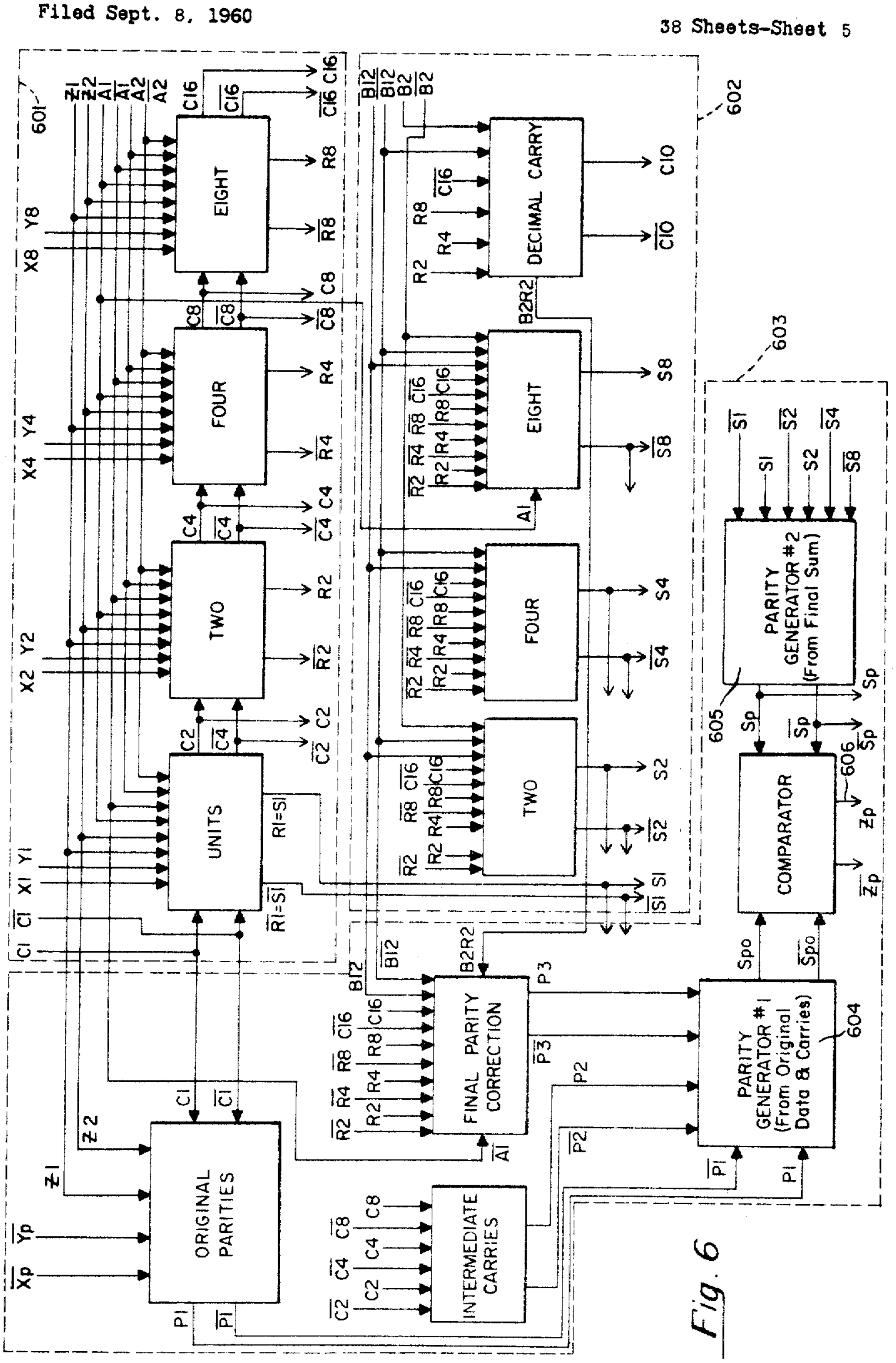
FIGURE 6 is a block diagram in more detail of the arithmetic unit of FIGURE 5.

By way of further general consideration examine FIG. 6 which is a block diagram of the internal structure of the arithmetic unit. It will be noted that the arithmetic unit is divided into three main sections: the base 16 section 601; the correction circuit section 602; and the parity checker circuit 603. The raw information from the accumulator register and the memory register is fed into the base 16 section 601. The raw information is then operated thereon to provide a set of signal conditions which represent an "answer" in binary form. This system is primarily designed to operate with decimal terms and optionally with sterling (British currency) which uses base 12 and base 2, or limited binary (base 2). Therefore the information to the base 16 must be converted. The correction circuit 602 enables the information signals in base 16 form to be translated into decimal coded binary signals or optionally into sterling or base 12 and base 2 signals.

The output lines from the correction circuit are labeled S(1–8) and C10 or the respective negations. The S(1–8) signals represent the 1, 2, 4 and 8 weighted output bit signals. These bit signals can be recirculated into, the accumulator register, and/or the memory register, and/or the magnetic core memory, and/or the printer, each in response to proper programming signals.

The system has an internal checking provision using a parity number method. By means of the parity number generator 604, a parity number is generated for a digit taking into the original parity numbers and this first generated parity number is then compared with a second generated parity number for the final sum from generator 605. If a parity error exists there is an error signal ZP applied to line 606 which is transmitted to effect a connection of the incorrect parity and/or to provide an alarm signal. The operation of the parity checker circuit will be detailed hereinafter.

In order to have a complete understanding of the present invention consider an example wherein a check (FIG. 2) representing a withdrawal of $43.18 has been forwarded to a bank. Further hpyothesize that the bank customer who made out this check has a bank balance of $205.69.

As described earlier, a customer's banking record is kept on a ledger card which is identified by an account number. In the example under present consideration the customer's account number is 234. As mentioned above, when such bank ledger cards are used in conjunction with Burroughs' Visible Record Computer both the front and reverse sides of the ledger cards are used. The customer's account number as well as his present balance, withdrawals and deposits are printed on the front side. On the ledger card's reverse side, information including the account number and present balance is further recorded on magnetic recording means. This illustrative example is a simple one and in point of fact, Burroughs' Visible Record Computer is capable of doing far more sophisticated operations. Normally in magnetic ink character recognition checking systems, other information is included on the check, for instance the routing number, the bank number, the transition code, etc. The Visible Records Computer is designed to operate on the ledger cards using all the information found on the check.

In order to make the illustrative example easier to follow, assume that the check for $43.18 has been transported through the item sorter reader (FIG. 1) and the numerals (representing the amount $43.18 and the account number 234) are being transmitted in binary coded form into the computer portion of the Visible Record System.

Figure 8:
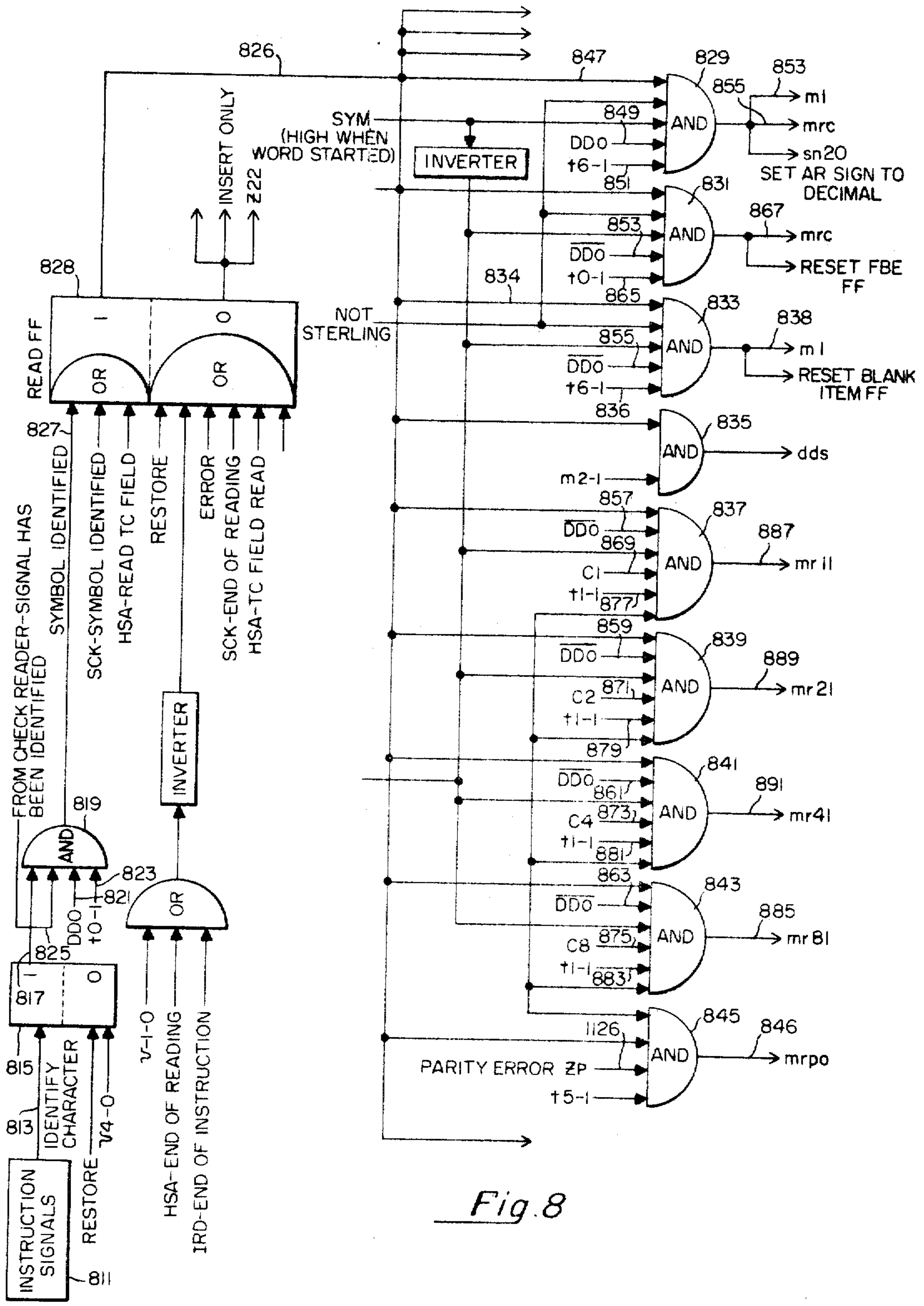
FIGURE 8 is a schematic showing circuits for "read item" control.

In FIG. 8 there is shown a block 811 which is entitled "Instruction Signals." Any one of a number of well-known programming arrangements can be used to provide the program signals, or Instruction Signals, from block 811. In the Visible Record Computer, the programming portion of the system is a combination of plugboard means, dial and punched tape devices. However, since the generation of program instruction signals is not basic to the present invention, it will suffice to consider that the proper instruction signals are provided as indicated hereinafter.

From the instruction signal circuitry 811 there is provided an output line 813 upon which an instruction signal is transmitted to indicate to the computer device that it is time to "identify the character." The instruction signal on line 813 causes the flip-flop 815 to be transferred to its ONE condition which provides a high signal on line 817. As was explained earlier the timing circuits are arranged to provide thirteen digit pulses DD0 through DD12 and, in addition, *t* or *v* clock pulses during each digit pulse time. Assume that the DD pulse and *t* pulse generators have been started as will be explained below.

In FIG. 8 AND gate 819 has four input lines to which high signals must simultaneously be transmitted to render the gate fully conditioned. The high signal on line 813, the DD0 pulse on line 821 and the *t*0–1 pulse on line 823 represent three of the required high signals. If during the time that these last-mentioned signals are applied to gate 819, the check reader provides a high signal on line 825, the gate will be fully conditioned to provide a low signal on line 827. The high signal on line 825 in effect indicates that the symbol on the check has been recognized and has been decoded into binary language. The low output signal from gate 819 is transmitted via line 827 to each of the odd-numbered gates 829 through 845.

As shown in FIG. 8, in order for each of the odd-numbered gates 831 through 845 to be fully conditioned, a $\overline{DD0}$ signal must be applied. The system first considers the algebraic sign of the words it is dealing with and this takes place at DD0 time. Since the initial portion of the operation takes place at DD0 time and therefore a $\overline{DD0}$ signal is not available, each of these odd-numbered gates 831 through 845 is not fully conditioned. Instead, gate 829 is partially conditioned by the output signal from gate 819 which appears on line 847 and by the DD0 signal appearing on line 849. When the sixth *t* pulse is transmitted, designated *t*6–1, on line 851, the gate 829 becomes fully conditioned and provides a low output signal to each of the output lines 853 and 855.

Figures 9, 9A:
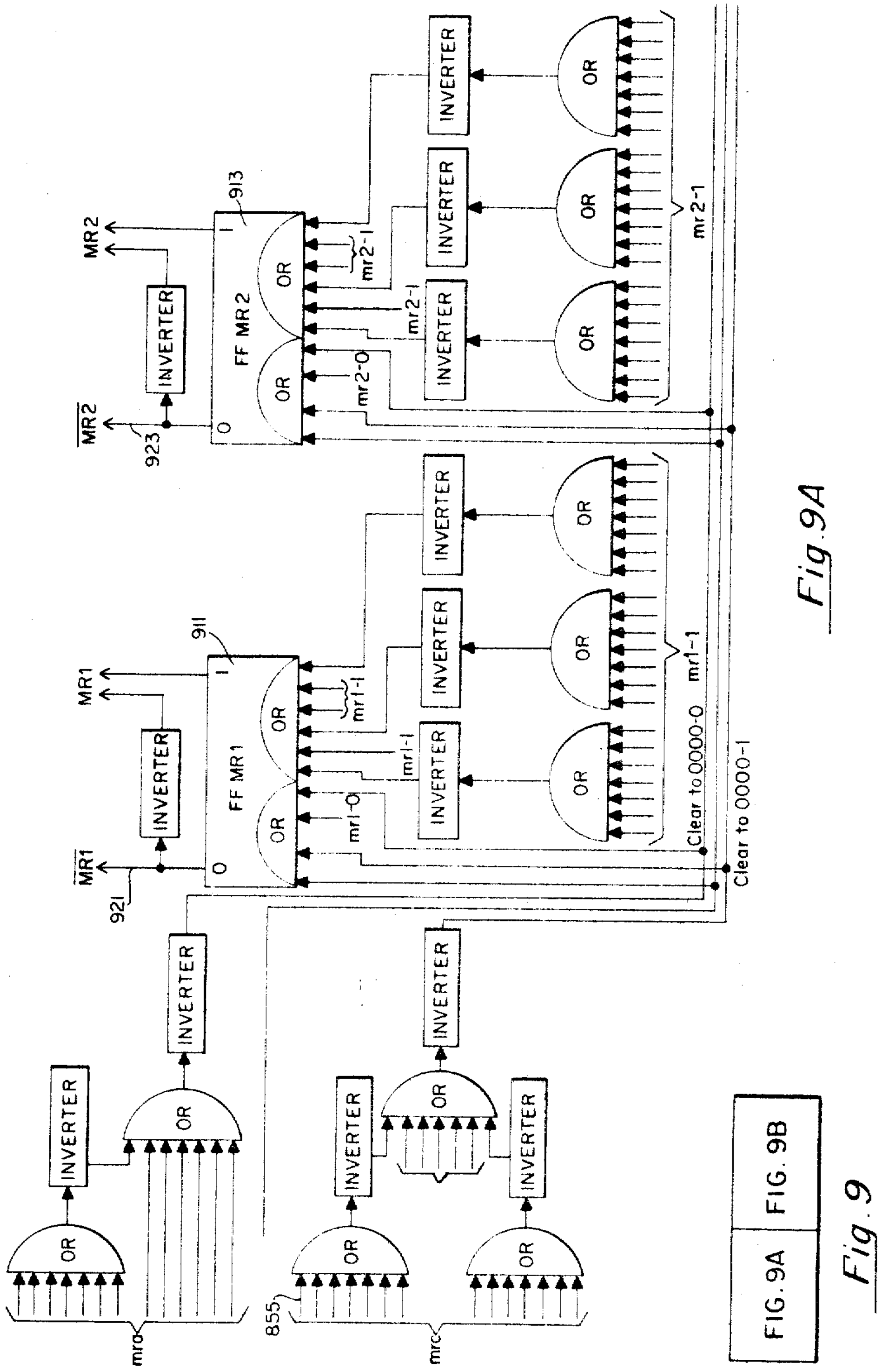
FIGURE 9 is a schematic of the memory register and comprises the circuits of FIGURES 9A and 9B.
Figure 9B:
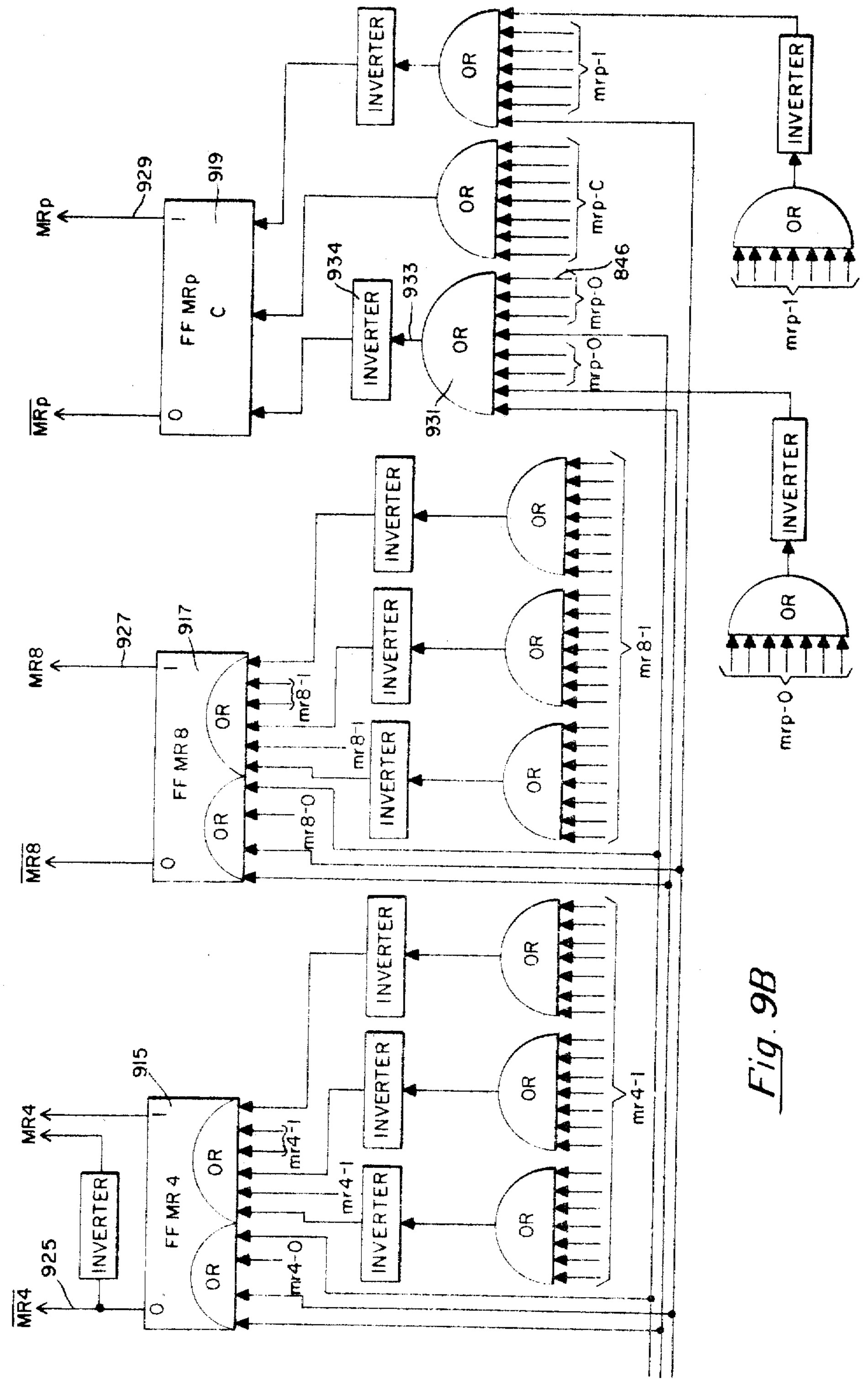

The low output signal on line 855 is transmitted to clear, or restore to zero, each of the odd-numbered flip-flops 911 through 917 in FIG. 9. The flip-flop 919 in FIG. 9 is the parity flip-flop and in this initial operation it is reset to its ONE condition.

When the check reader recognizes or identifies the numeral, the numeral is translated electronically into binary coded information signals. In our example the numeral 8 which is the least significant digit in the check amount $43.18, is the first digit read from the check. Therefore the numeral 8 is electronically translated into binary signals 0–0–0–1. In accordance with the ground rules outlined above, it will be recalled that if an information signal is considered representing a binary ZERO, it is a low signal. Therefore, in accordance with this ground rule the numeral 8 which is binary coded 0–0–0–1 is translated into three low signals and one high signal. The bit input lines 869, 871, 873, 875 are respectively designated C–1, C–2, C–4 and C–8 to indicate the weighted values of the information bit signals. Keeping in mind the description thus far, it becomes evident that the bit signals applied to lines 869, 871, and 873 are low signals, thereby inhibiting the gates 837, 839 and 841 from being fully conditioned during the handling of the least significant digit, the numeral 8. Consequently, only the gate 843 has two of its four input lines properly conditioned for rendering the gate fully conditioned as described thus far.

The output signal on line 853 is transmitted to cause the magnetic core memory device 19 shown in FIG. 4 to read in the information standing in the odd-numbered flip-flops 911 through 919 in FIG. 9. The details of the *m*1 signal will be described hereinafter. The output signal on line 853 is slightly delayed in order that the odd-numbered flip-flops 911 through 919 in FIG. 9 can be reset to 0–0–0–0–1 and therefore 0–0–0–0–1 information is transmitted into the magnetic core memory device 19 (FIG. 4).

The *t* clock pulses continue to be generated and if, in fact, there is an algebraic sign present it will be transferred into the magnetic core memory at DD0 time. At the end of DD time a DD1 signal is transmitted thereby enabling the system throughout to operate in whatever fashion is desirable in accordance with DD1 time.

At the first digit time, the DD1 signal is applied to each of the odd-numbered input lines 853 through 863. These input lines are designated $\overline{DD0}$. The application of a DD1 signal to each of the odd-numbered input lines 853 through 863 serves to properly condition a third input line to each of the odd-numbered gates 831 through 843. At the first *t* time during DD1 time, a *t*0–1 pulse is applied to the input line 865 which is the only remaining unconditional input line to gate 831. The application of the small *t*0–1 pulse renders the gate 831 fully conditioned, thereby providing a low signal on line 867 which signal serves to reset the odd-numbered flip-flops 911 through 919 of FIG. 9. The reset signal on line 867 makes the memory register flip-flops 911 through 919 ready to receive the first digit information during DD1 time.

At the second *t* time during DD1 time, a *t*1–1 pulse is applied to each of the odd-numbered input lines 877 through 883. Examining FIG. 8, it becomes clear that with the $t1-1$ pulse so applied each of the odd-numbered gates 837 through 843 might be rendered fully conditioned, but in fact only gate 843 is fully conditioned. It will be recalled that the gates 837, 839 and 841 were inhibited by the application of binary ZERO pulses when the numeral 8 (binary coded 0–0–0–1) was transmitted from the item sorter. In summary then, at $t1-1$ pulse time the only gate which is rendered fully conditioned is gate 843 which provides a low signal on line 885. The low output signal from gate 843 is transmitted to transfer memory register flip-flop 917 (FIG. 9) to its ONE condition. Since the high signals from the inhibited gates appearing on lines 887, 889, 891 fail to transfer the memory register flip-flops 911, 913, and 915 to their respective ONE conditions, these last-mentioned flip-flops remain in their respective ZERO conditions and when viewed together, the odd-numbered flip-flops 911 through 917 represent the numeral 8 or the binary coded digit 0–0–0–1.

It will be recalled that when the memory register flip-flops were reset, the parity flip-flop 919 was reset to its ONE condition. The selection of a parity bit of ONE for a numeral being read in is a random selection and therefore the system must check to see whether or not this parity is correct.

In accordance with the parity rules outlined earlier in the ground rules section, if there is an odd number of ones in the binary coding of a digit, the parity number assigned is ZERO while if there is an even number of ones in the binary coding of a digit, the parity number is ONE. In our example, we have first recognized and read a numeral 8 which is binary coded 0–0–0–1. This binary coded number having an odd number of ones should have assigned to it a parity numer of ZERO. Flip-flop 919 has been arbitrarily set to a ONE condition, thereby giving an improper parity check number and the system must check and correct this parity number. Therefore consider the parity check operation.

PARITY CHECK

The parity checking operation is commenced by transmitting the information from the memory register into the arithmetic unit (shown in FIG. 10) to generate a parity number. The generated parity number is then compared with the setting of the flip-flop 919.

Figure 10A:
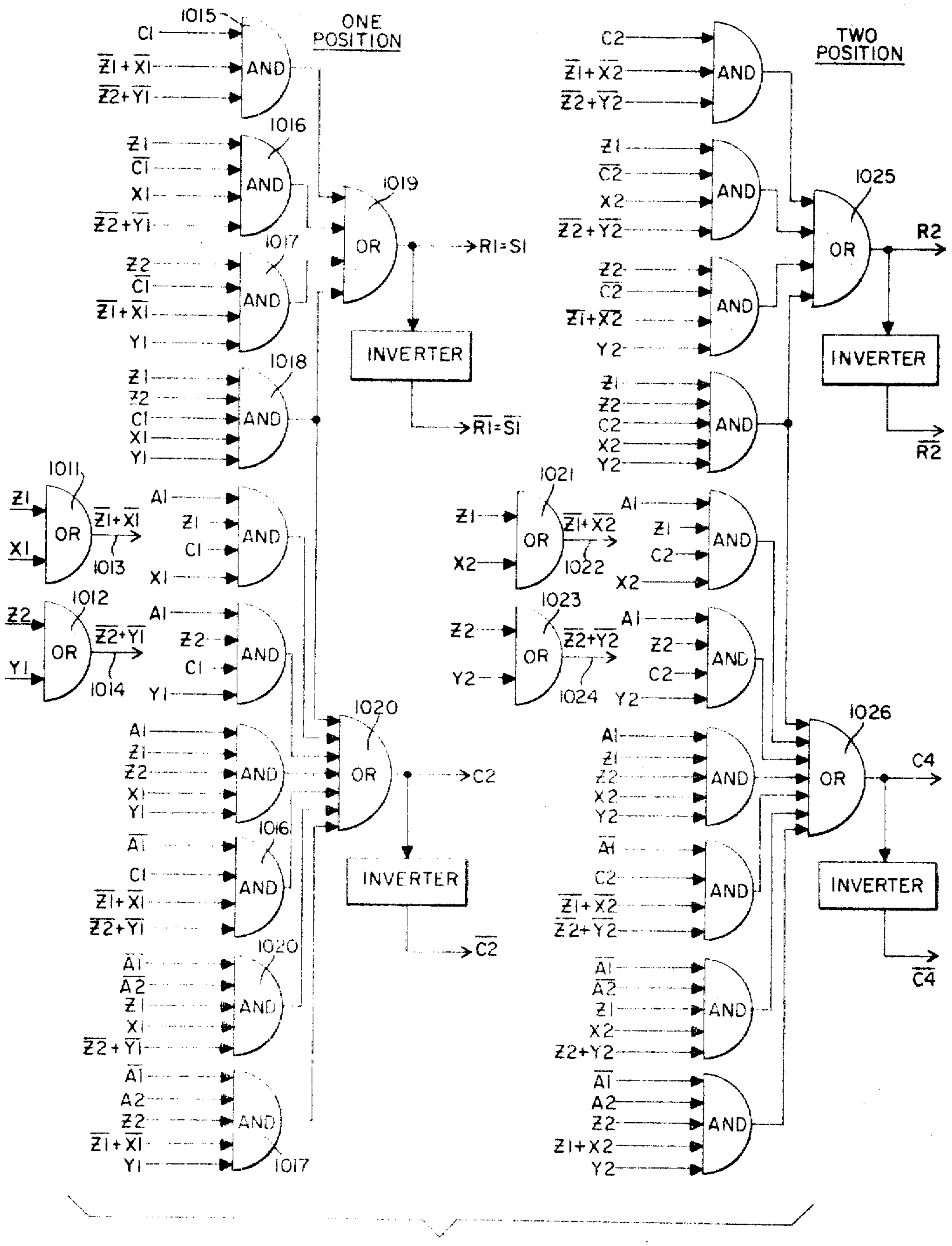
FIGURES 10A and 10B are a schematic of the arithmetic unit "base 16"
Figure 10B:
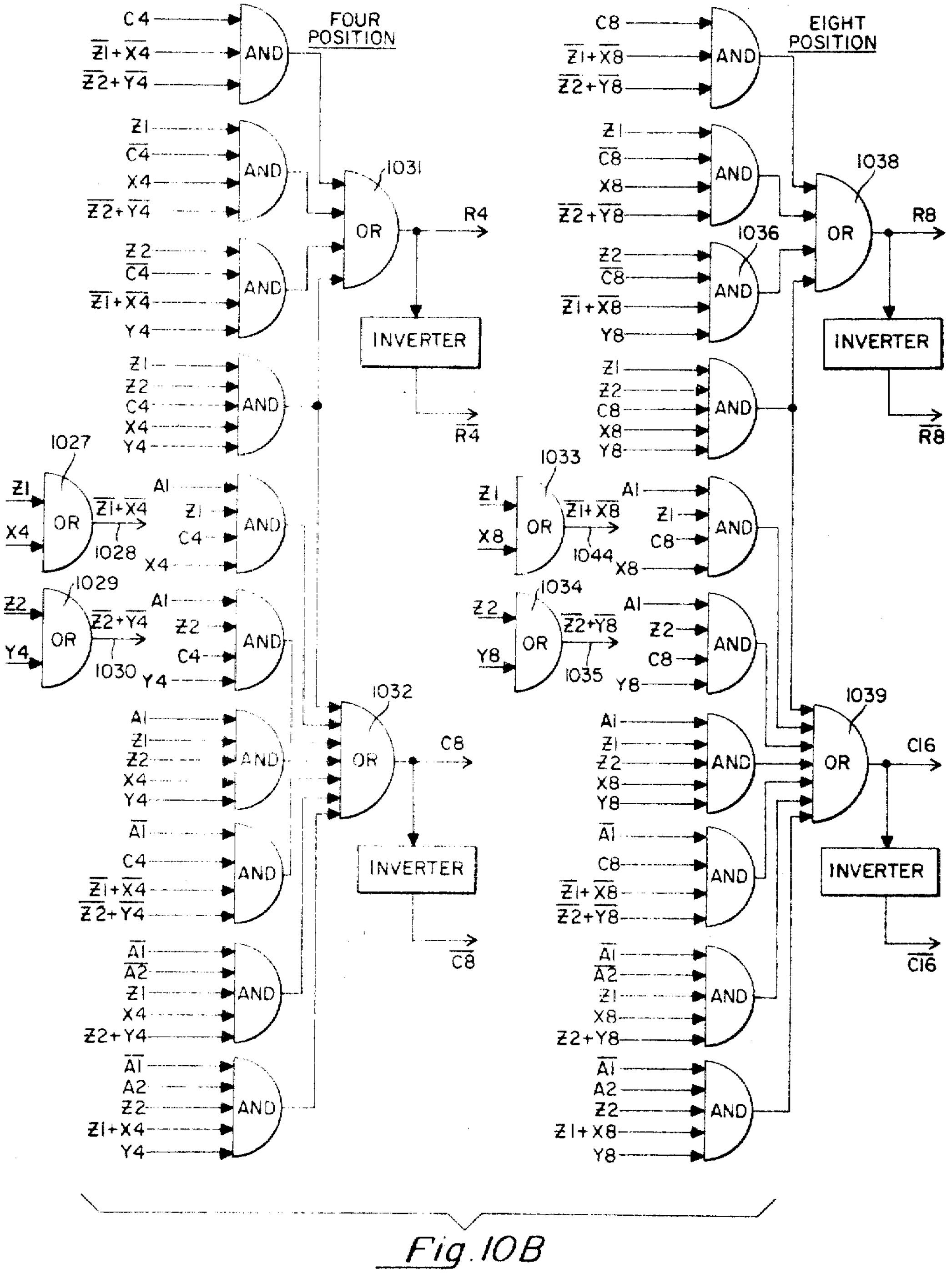

Consider FIG. 10 in conjunction with FIG. 9. In FIG. 9, we have numeral 8 temporarily stored in the odd numbered flip-flops 911 through 917, with a ONE parity stored in flip-flop 919. Consequently a high signal is provided on lines 921, 923, 925, 927, and 929.

Line 921 is designated $\overline{MR1}$ and is connected into the arithmetic unit of FIG. 10, at each one of the $\overline{Y1}$ terminals. Line 923 is designated $\overline{MR2}$ and is connected into the arithmetic unit at each of the $\overline{Y2}$ terminals. Line 925 is designated $\overline{MR4}$ and is connected into the arithmetic unit at each of the $\overline{Y4}$ terminals. Line 927 is designated MR8 and is connected into the arithmetic unit at each of the Y8 terminals. Line 929 is designated MRP and is connected into the arithmetic unit parity check circuit shown in FIG. 11 at each of the YP terminals.

The leads in the arithmetic unit which have high signals thereon (as a result of the numeral 8 being stored in binary coded form in the memory register), have been established. Consider now which leads in the arithmetic unit have high signals thereon in response to the condition of the accumulator register. Up to this point, no information has been transferred into the accumulator register although there may be information therein from another operation. During the parity check operation the information in the accumulator register is inhibited from being transferred into the arithmetic unit and therefore the output signals from the accumulator register are 0–0–0–0–0. The inhibition of information signals from the accumulator register is accomplished by providing a $\overline{Z1}$ signal as will be explained more fully hereinafter.

Figure 11:
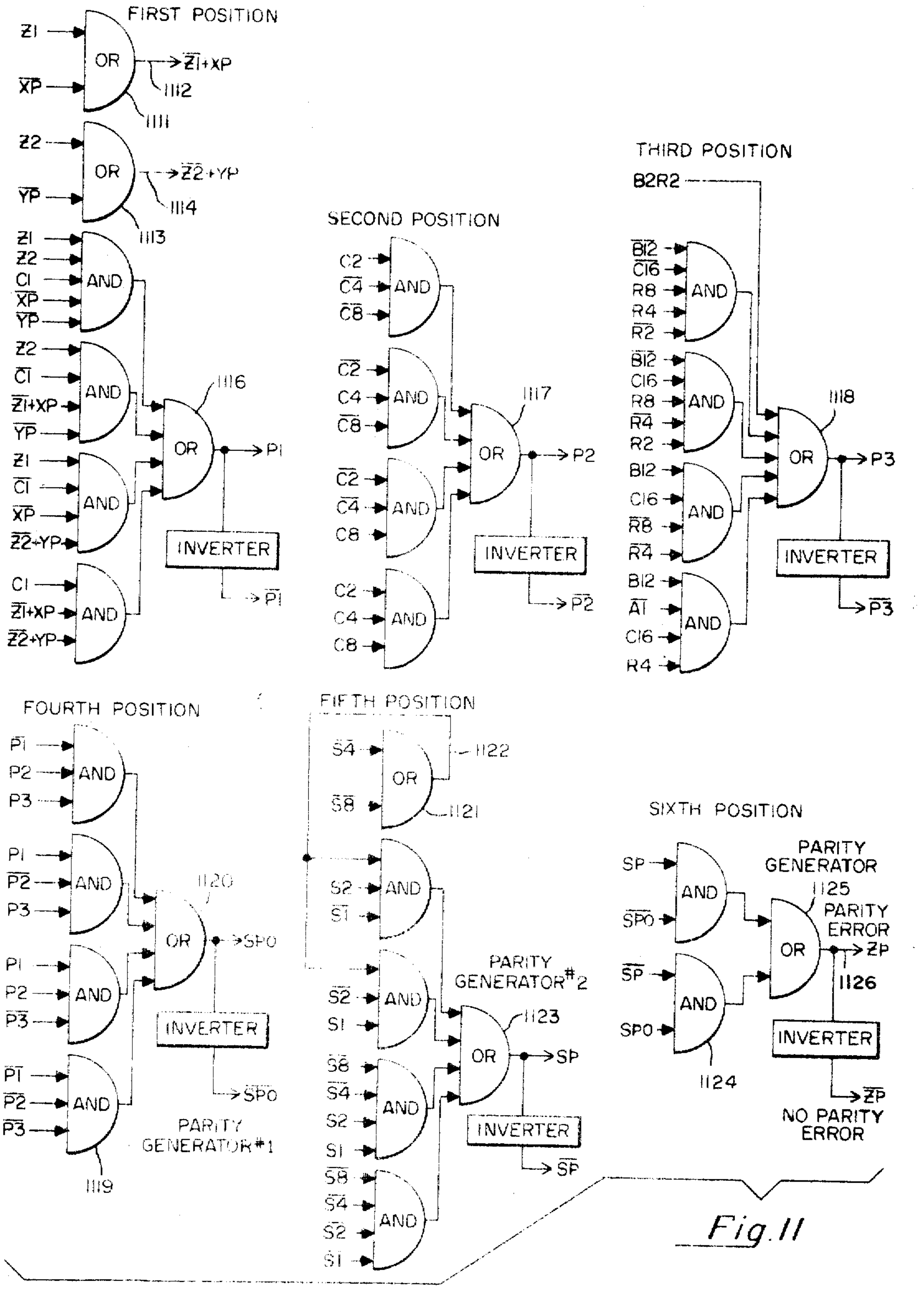
FIGURE 11 is a schematic of the parity checker circuit.

Since there are effectively all ZEROS from the accumulator register, the output leads $\overline{SA1}$, $\overline{SB1}$, $\overline{SC1}$, $\overline{SD1}$ and $\overline{SE1}$ will have high signals thereon. These last mentioned output leads are respectively connected to $\overline{X1}$, $\overline{X2}$, $\overline{X4}$ and $\overline{X8}$ terminals in the arithmetic unit, and to the $\overline{XP}$ terminal in a parity check circuit (FIG. 11). It should be further understood that in this particular parity check operation the internal control signal Z2, as well as $\overline{Z1}$, is provided.

With the above set of conditions in mind, examine in detail the operation of the arithmetic unit (FIG. 10). In FIG. 10, in the One Position, there are shown two OR gates, 1011 and 1012. Consider the inputs to the OR gate 1011. The upper input is connected to Z1 which is low and the lower input is connected to X1 which is also low. In accordance with our ground rules, if one of the input signals to an OR gate is low, the output signals therefrom are high. Therefore, the signal appearing on line 1013 is high. Consider also the input signals to the OR gate 1012. The upper input signal Z2 is high and the lower signal Y1 is low. Again in accordance with the ground rule just mentioned, the output signal on line 1014 will be high.

Examine now the possible AND gates which might be fully conditioned amongst the AND gates in One Position. AND gate 1015 has a C1 signal which is low since there has been no carry to the first position (as will be more fully understood hereinafter). Therefore, AND gate 1015 is not fully conditioned. AND gate 1016 has an input signal Z1 which is low and an input signal X1 which is low, therefore AND gate 1016 is not fully conditioned. AND gate 1017 is not fully conditioned at this time, because its bottommost input line Y1 is low. Likewise AND gate 1018 cannot be fully conditioned at this time because its three bottommost input lines each has a low signal thereon. Without reciting the signals present at each input line it suffices to mention that if each of the AND gates under One Position is examined, it will be found that none of these AND gates is fully conditioned. Therefore each output signal from the AND gates of One Position is high which renders the output signal from OR gate 1019 low. A low output signal from OR gate 1019 provides an output signal designated $\overline{R1}=\overline{S1}$, high. Similarly, the output signal from OR gate 1020 will be low, rendering the output signal $\overline{C2}$ high.

Examining the OR gates of the Two Position, we find that OR gate 1021 has its upper input signal, Z1, low and its lower input signal, X2, low, thereby rendering a high output signal on line 1022. OR gate 1023 has its upper input signal Z2, high, while its lower input signal X1 is low, thereby causing a high output signal on line 1024. If the AND gates in the two position are now studied, it will be found that at least one input signal transmitted to each of these AND gates will be low, thereby providing a high signal from each of the AND gates in the Two Position. In accordance with the earlier stated ground rules, if each of the output signals from these last mentioned AND gates is high, the output signal from OR gate 1025 is low which renders the output signal $\overline{R2}$ high. At the same time the output signal from OR gate 1026 is low and renders the output signal terminal $\overline{C4}$ high. Examining now the condition in the Four Position, we find that the upper input signal to OR gate 1027 is Z1 which is low and its lower input signal is X4 which is also low. As a result there is provided a high output signal on line 1028. The input signals to OR gate 1029 are Z2 which is high and Y4 which is low, which, in turn, causes the output signal on line 1030 to be high.

Further study of the AND gates under the Four Position reveals that at least one input signal to each of the AND gates is low thereby rendering the output signal from each of these AND gates high. In accordance with the previously stated ground rules, if each of the AND gates transmits a high signal to the OR gate 1031, it will generate a low output signal and therefore the output signal terminal $\overline{R4}$ becomes high. Similarly the OR gate 1032 provides a low output signal which causes the output signal terminal $\overline{C8}$ to be high.

Examine now the conditions in the Eight Position. The input signals to the OR gate 1033 are Z1, which is low, and X8, which is also low. These last two mentioned low input signals cause the output signal on line 1044 to be high. The input signals to AND gate 1034 are Z2, which is high, and Y8, which is high, thus the output signal on line 1035 is low. Examining the AND gates in the Eight Position, we find that the input signals to AND gate 1036 are Z2 which is high, $\overline{C8}$ which is high, $\overline{Z1}+\overline{X8}$ which is high, and Y8 which is also high. Therefore, AND gate 1036 is fully conditioned to provide a low output signal on line 1037. The remainder of the AND gates in the Eighth Position are not fully conditioned and therefore the only output line having a low signal thereon is line 1037. The low output signal on line 1037 is transmitted to OR gate 1038 to cause a high output signal therefrom at terminal R8. Since each of the input lines to OR gate 1039 is high, there is a low output signal provided therefrom thereby rendering the terminal $\overline{C16}$ high.

Figure 12:
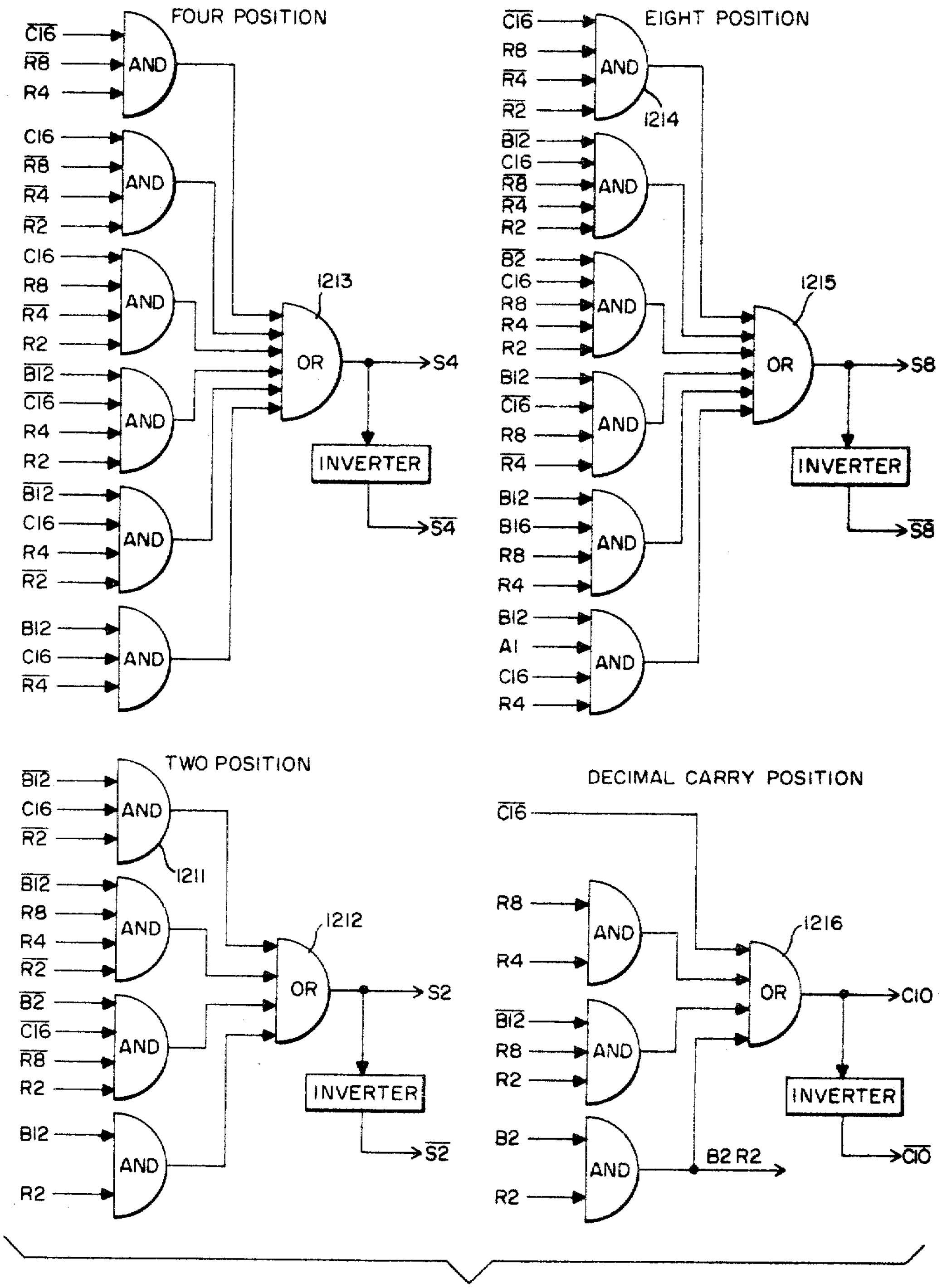
FIGURE 12 is a schematic of the arithmetic unit correction circuit.

Having established the output signals from the base 16 portion of the adder/subtracter or arithmetic circuit, let us consider the adder/subtracter correction circuit shown in FIGURE 12. In FIGURE 12 certain notations are introduced which have not heretofore been considered other than in the tabulation, above. In FIGURE 12 there will be found a notation B12 and $\overline{B12}$ as well as B2 and $\overline{B2}$. Since the overall system is also designed to handle both sterling (British currency) operations, additional circuitry has been provided to convert numbers into sterling equivalents. The B12 control signals relate to pence (digit DD1) while the B2 control signals relate to tens of shillings (digit DD3). The first portion of the adder/subtracter circuit as shown in FIGURE 10 is considered an adder/subtracter circuit to the base 16 and it is with the use of the adder/subtracter correction circuit that the base 16 conditions or signals are translated into signals having values of either decimal or sterling.

Examine now the operation of the correction circuit of FIGURE 12, keeping in mind the output signals which were derived from the circuit shown in FIGURE 10. In the Two Position, consider the input signals to the AND gates. AND gate 1211 has a first input signal $\overline{B12}$ high, since in the present example we are not doing a sterling operation. However, the input signal $\overline{C16}$ is low (from the conditions derived in FIGURE 10) thereby rendering the AND gate 1211 not fully conditioned. A careful examination of each of the AND gates will show that at least one input signal to each is low, thus it follows that each of the output signals from the AND gates in Two Position of FIGURE 12 is high. Since each of the input signals to the OR gate 1212 is high, there is a low output signal therefrom which renders the terminal $\overline{S2}$ high.

If the input signals to the AND gates in the Four Position of FIGURE 12 are studied, it will be found that there is at least one input signal to each of these AND gates which is low, thereby rendering each of the output signals therefrom high. With each of the input signals to the OR gate 1213 being high, there is a low output signal therefrom which causes the terminal $\overline{S4}$ to be high.

Examining the AND gates in the Eighth Position of FIGURE 12, it is found that the uppermost AND gate 1214 has each of its input lines high, rendering its output signal low which, in turn, conditions the OR gate 1215 to provide a high output signal at terminal S8. Moving over to the decimal carry position, we find that none of the AND gates thereat is fully conditioned. Therefore the OR gate 1216 has high input signals thereby rendering a low output signal therefrom, which, in turn, causes the terminal $\overline{C10}$ to have a high signal thereat.

Consider the parity check circuit of FIGURE 11, keeping in mind the conditions derived from FIGURES 10 and 12. The following table shows the conditions derived from FIGURES 10 and 12 which will make it easier to consider the operation of the circuitry shown in FIGURE 11.

*Table I*

| From MR | From AR (effective) | From A/S | From Corr./Circuit |
|---|---|---|---|
| $\overline{Y1}$ | $\overline{X1}$ | $\overline{C2}$ $\overline{R1}=\overline{S1}$ | $\overline{S2}$ $\overline{C10}$ $\overline{B12}$ |
| $\overline{Y2}$ | $\overline{X2}$ | $\overline{C4}$ $\overline{R2}$ | $\overline{S4}$ $\overline{B2}$ |
| $\overline{Y4}$ | $\overline{X4}$ | $\overline{C8}$ $\overline{R4}$ | S8 |
| Y8 | $\overline{X8}$ | $\overline{C16}$ R8 | |
| YP | XP | | |

In the First Position of FIGURE 11, the OR gate 1111 has an upper input signal Z1 which is low, thereby providing a high output signal on line 1112. The OR gate 1113 has an upper input signal Z2 which is high and a lower input signal $\overline{YP}$ which is low, thereby providing a high output signal on line 1114. Considering the AND gates in the first position, it becomes clear that none of the AND gates is fully conditioned and thus there is provided a high output signal from each of these AND gates. In response to having each of its input signals high, the OR gate 1116 provides a low output signal which, in turn, causes the terminal $\overline{P1}$ to have a high signal thereat.

In the Second Position of FIGURE 11, we find that each of the AND gates has at least one low input signal thereto and therefore each of the output signals is high. With all of the input signals to gate 1117 being high, there is provided a low output signal therefrom, thereby rendering the terminal $\overline{P2}$ high.

Considering the Third Position of FIGURE 11, we find that each of the AND gates has at least one input signal which is low and this, in turn, renders each of the input signals to the OR gate 1118 high. With each of the input signals to gate 1118 high, there is provided therefrom a low output signal which, in turn, renders the terminal $\overline{P3}$, high.

Examine now the Fourth Position where we find that AND gate 1119 has each of its input signals high, thereby providing a low input signal therefrom. OR gate 1120 having one low input signal provides a high output signal, thereby causing the terminal SP0 to be high.

Study the Fifth Position of FIGURE 11, where it is found that the input signals to OR gate 1121 are $\overline{S4}$ high and $\overline{S8}$ low, thereby causing a high output signal on line 1122. Examining further the AND gates in the Fifth Position, we find that at least one input signal to each of the AND gates is low, thereby providing high input signals to the OR gate 1123. Since the OR gate 1123 has each of its input signals high, a low output signal is generated thereat rendering the terminal $\overline{SP}$ high.

Consider further the Sixth Position of FIGURE 11 whereat we find that the input signals to the AND gate 1124 are both high, thereby rendering a low output signal therefrom, which, in turn, properly conditions the OR gate 1125. The OR gate 1125 having one low input signal, provides a high output signal therefrom which, in turn, renders the terminal ZP high. The terminal ZP with a high signal thereon indicates that there is a parity number error. In point of fact, from the parity ground rule originally laid down and from our further consideration, we knew beforehand that a parity number of one which was assigned to the numeral 8 was incorrect and the system has detected this error.

The description thus far has revealed how the system generates and checks a parity number. In the present example, the originally assigned parity number was found to be in error. The system is designed to correct the error, hence consider at this point the parity number correction process.

The line 1126 in FIG. 11 is connected to the AND gate 845 of FIG. 8. As a result of the parity error detection, there is a high signal on line 1126 which provides a further high input signal to the AND gate 845 (FIG. 8). At the time *t5*, a *t5*–1 pulse is also transmitted to the AND gate 845 which fully conditions this AND gate and provides a low output signal on line 846. The signal on line 846 is a correction signal which is transmitted to the OR gate 931 in FIG. 9. In accordance with the ground rule previously laid down, the low input to the OR gate 931 will provide a high output signal on line 933 which when inverted at inverter 934 will be transmitted to transfer the flip-flop 919 to its ZERO condition. It now becomes clear that the flip-flop 919 in being transferred to its ZERO condition represents a proper parity number for the numeral 8 (which as described earlier has been temporarily stored in the memory register flip-flops 911 through 917).

Thus far in the illustrative example, the numeral 8 which is the least significant digit in the amount on the check (which is $43.18) has been read from the check and temporarily stored in the memory register flip-flops. In addition the parity number which was assigned to the numeral 8 was examined and found in error. Thereafter a correct parity number was assigned to the binary coded numeral 8.

Now consider the operation of the system to effect a transfer of information from the memory register to the magnetic core memory register. The magnetic core memory plays the role of a relatively permanent memory from whence information can be retrieved at some time after it has been stored in order that arithmetic and other operations may be performed thereon. Let us turn our attention once again to FIG. 8 and in particular the AND gate 833. It will be recalled that on the input line 834 there is a high signal which is the result of an instruction signal indicating that the symbol has been identified by the check reader. Likewise on line 855 there is a $\overline{DD0}$ signal which is a high signal since the zero digit time (DD0) has passed. At *t6* time, which the *t* pulse time after the parity number has been corrected, there is a *t* pulse which conditions AND gate 833. AND gate 833, in response to being fully conditioned generates a low signal on line 838, which is the signal that initiates the transfer of information from the memory register (in FIGURE 9) to the magnetic core memory in FIGURE 13.

MAGNETIC CORE MEMORY READ-IN AND READ-OUT

Figure 14:
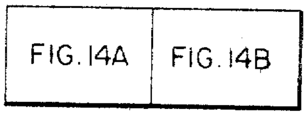
FIGURE 14 is a schematic of the circuitry to accomplish "word selection" control and comprises the circuits of FIGURES 14A and 14B.
Figure 15:
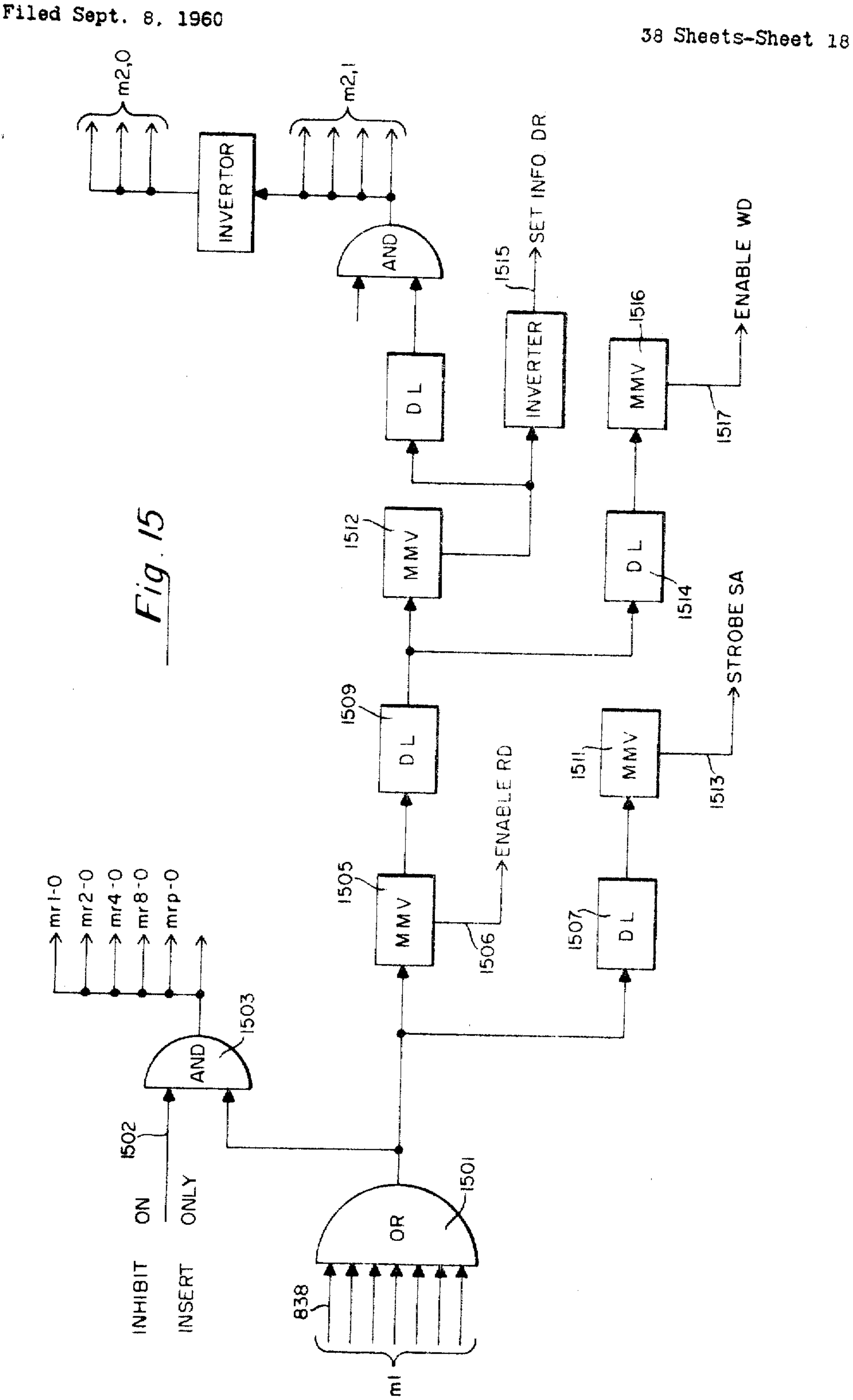
FIGURE 15 is a schematic of timing circuits for information extracted and inserted from the memory.

In connection with the description of information "read-in" to the magnetic core memory, study together FIGURES 13, 14, 15, and 16. In FIGURE 15 the *m*1 signal input lines come from many parts of the system and include in this particular instance the *m*1 signal on input line 838 which was described with FIG. 8. The *m*1 signal is transmitted on line 838 to the OR gate 1501. The low signal on line 838 causes the OR gate 1501 to provide a high output signal which is simultaneously transmitted along three paths: to AND gate 1503, to monostable multivibrator 1505 and to the delay line 1507. At this point in the illustrative example, the data from the check is for the first time being put into the magnetic core memory and it is considered an "information insert" operation which has special significance that will become apparent immediately hereinafter. In accordance with an "information insert" procedure, a low signal on line 1502 is transmitted to inhibit the AND gate 1503. When the AND gate 1503 is uninhibited, the output signal therefrom enables the memory register to be reset to 0–0–0–0–0. When the system goes through an E & I (Extract & Insert) cycle, the AND gate 1503 is uninhibited.

Follow now the path of the output signal from the OR gate 1501 to the monostable multivibrator 1505. The monostable multivibrator 1505 is transferred to its unstable state on the trailing edge of the pulse from OR gate 1501 to provide a gating pulse which lasts between seven to nine microseconds.

This gating pulse is transmitted along line 1506 (FIG. 16) to each of the AND gates in the AND gate bank 1601. It will be recalled that this operation (the transfer of numeral 8 from the memory register to the magnetic core memory) takes place during DD1 time and therefore the DD1 line 1603 (FIG. 16) is high which fully conditions the AND gate 1605. When the AND gate 1605 is fully conditioned, a driver signal is transmitted on the RDP1 (read driver plane 1) line 1607.

Figure 13A:
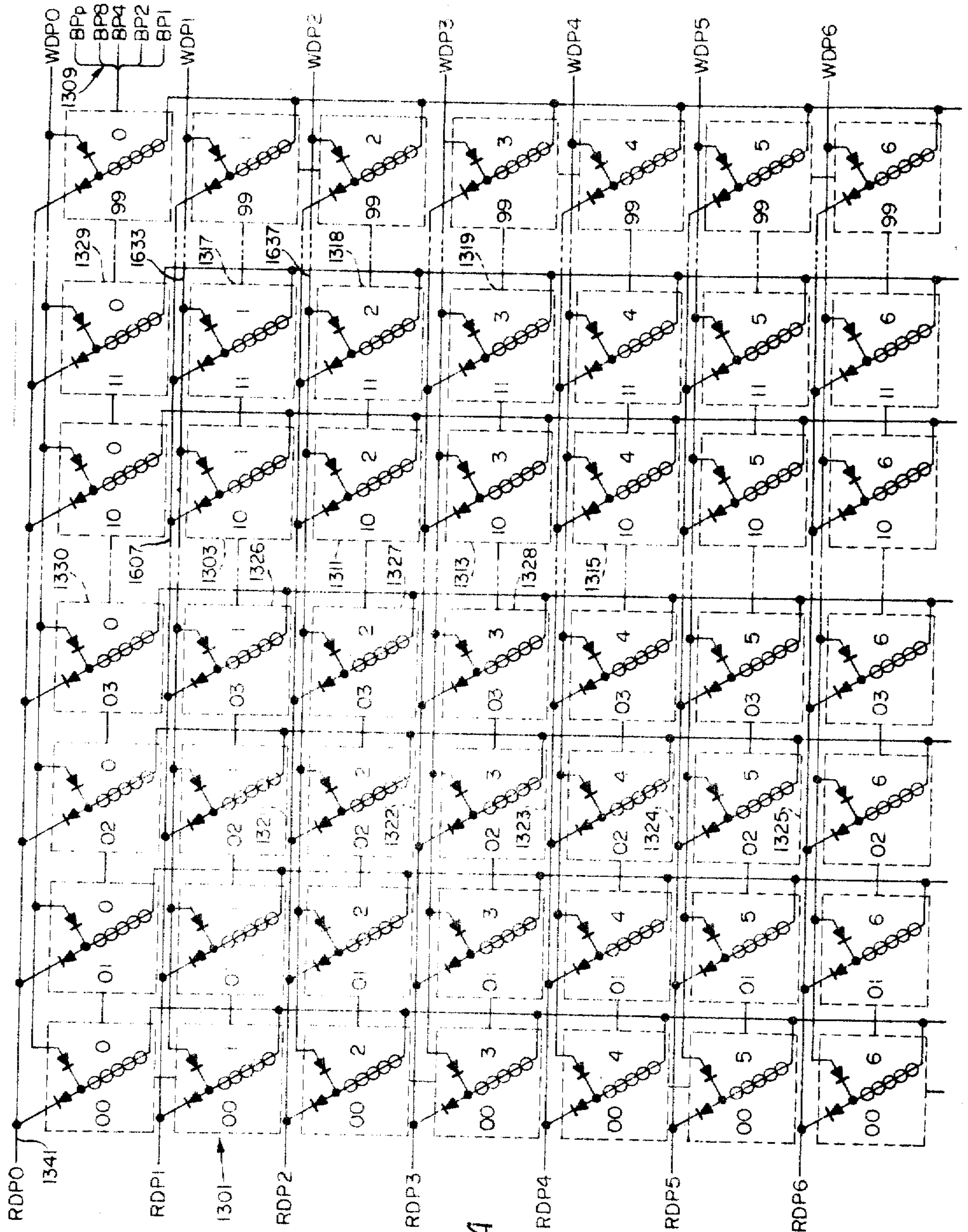
FIGURE 13 is a schematic of the word organized magnetic core memory and comprises the circuits of FIGURES 13A and 13B.
Figure 13:
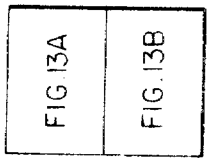
Figure 13B:
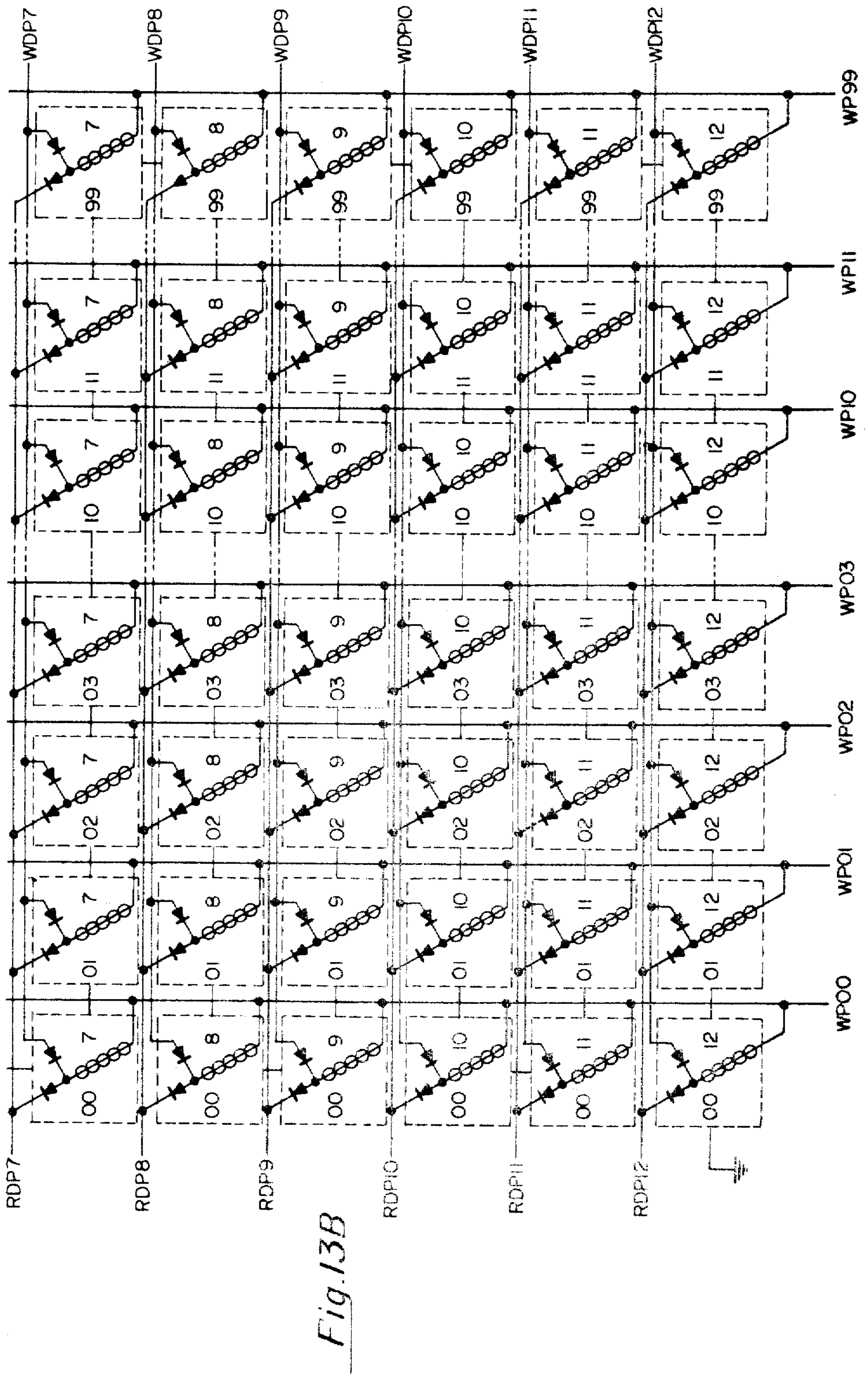
Figure 14A:
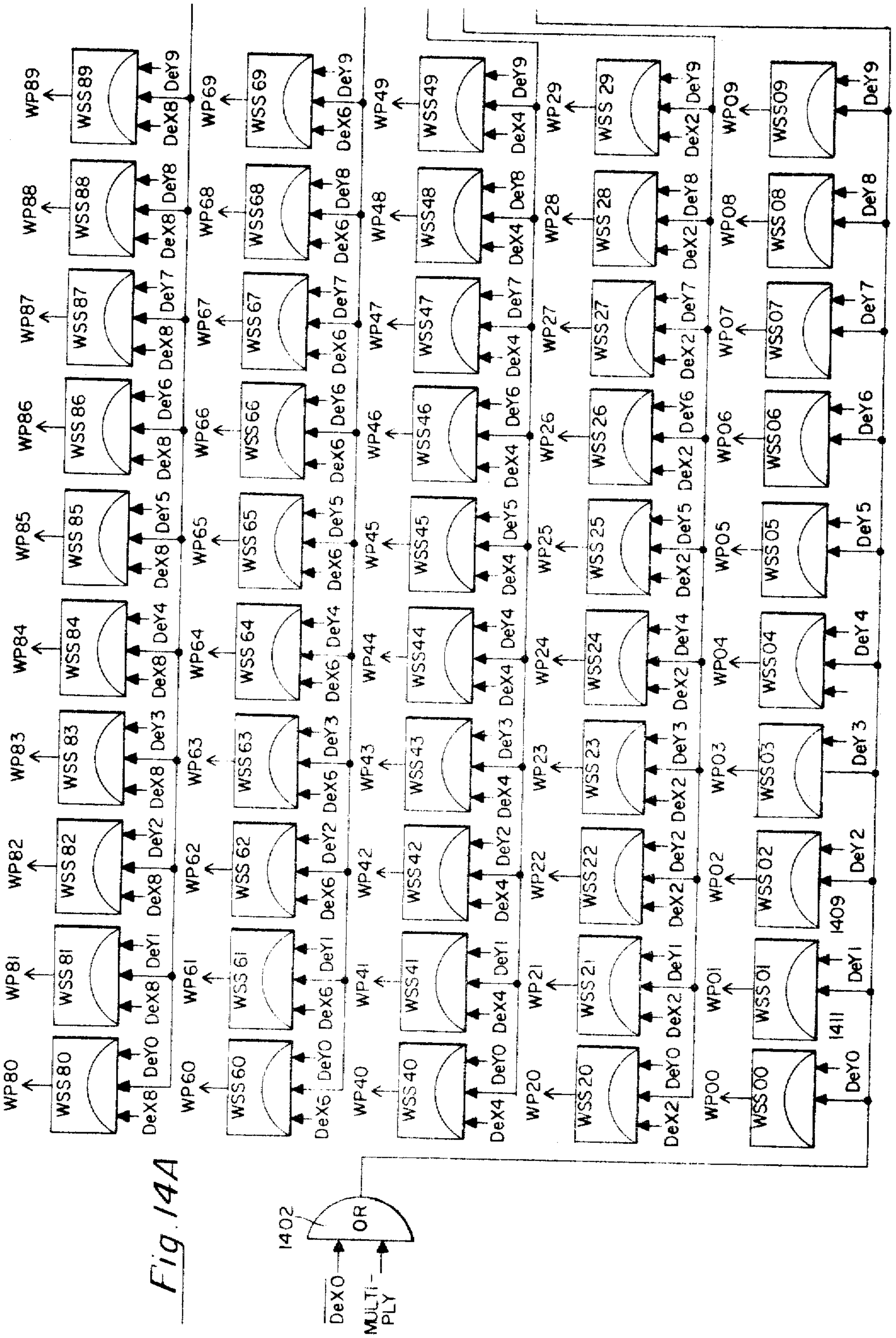
Figure 14B:
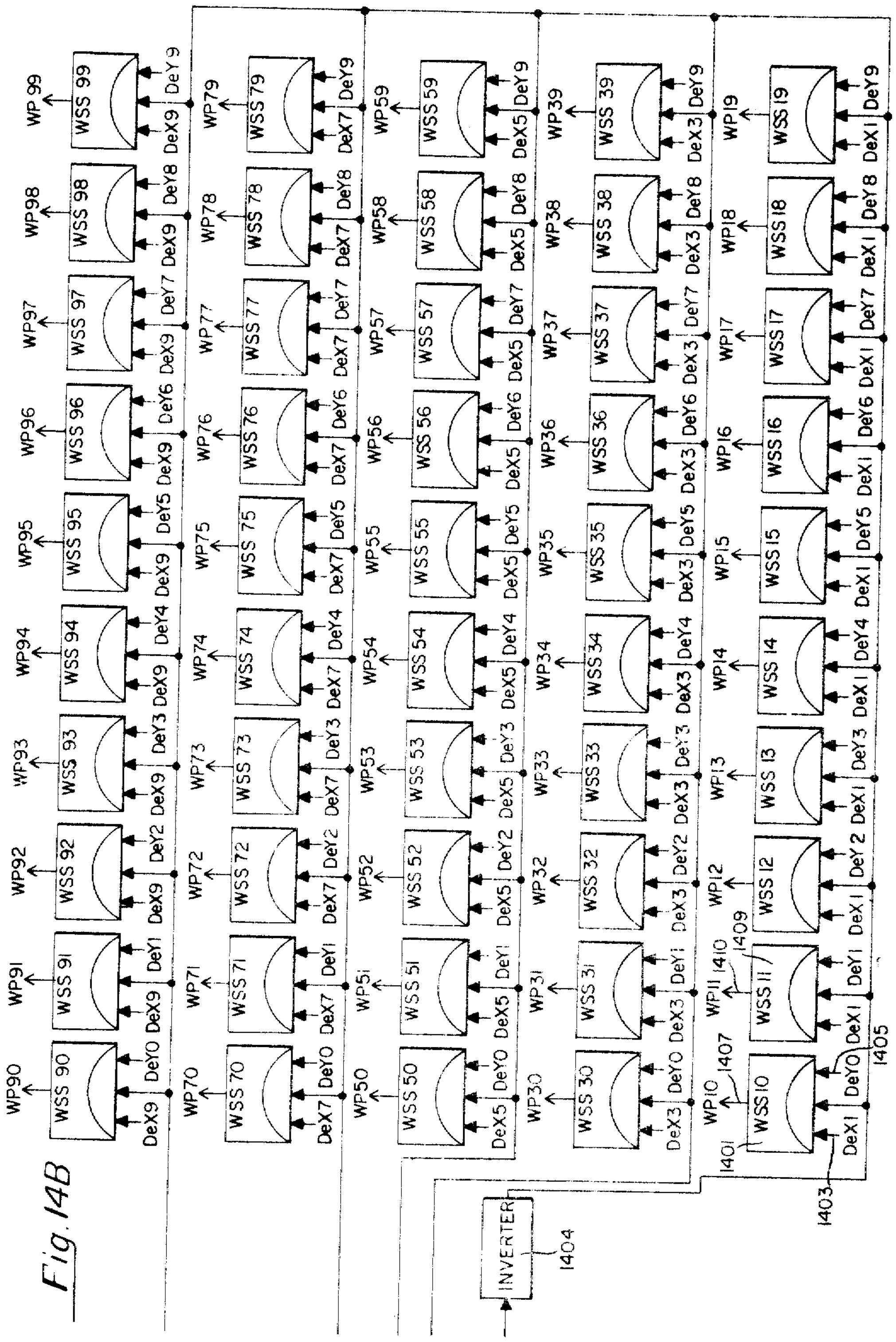

Turning our attention to FIG. 13, it will be seen that the RDP1 line 1607 is connected to each of the word locations along the word row 1301. At this point a slight digression must be made in order to consider the address control and operation of the word organized memory shown in FIG. 13.

Each of the five covers in a word organized memory location shown in FIG. 13 has a wire threaded therethrough which is connected in a forward direction through a diode to a read driver plane line and in a reverse direction through a diode to a word driver plane line. If current is passed through this threading wire in one direction, the cores will be switched to a first magnetic remanent state and if current is passed through the threading wire in a second direction, the cores will be switched to a second magnetic remanent state. A word organized memory driver arrangement is described and claimed in U.S. patent application Serial No. 782,752, filed December 24, 1958, by Meyerhoff et al. and assigned to Burroughs Corporation.

It is found that each of the five core groups lying along the word row 1301 is at least partially conditioned for an information read-out in response to the low signal on line 1607. The final determination of which one of these groups will be read out will be made by the selection of one of the WP (word plane) lines whose terminals lie along the lower edge of FIG. 13.

The selection of the proper WP line is determined by the programming operation. In FIG. 14 there is shown a memory word selection control circuit and it will be noted that the output lines of the gates shown in FIG. 14 are designated to correspond (in fact, are connected correspondingly) to the word plane lines (addresses) whose terminals are so designated in FIG. 13. The AND gates in FIG. 14 do not follow the ground rule but instead function to provide a high output signal in response to all the input signals being high. By a predetermined arrangement the first word from the check, which is the amount of the check, will be read in the word plane address 10. Obviously it could be read into another location with some other address. The WP10 address line 1407 will be seen in FIG. 14 as the output line from the AND gate 1401. In order that the transfer of the information from the memory register into the magnetic core memory might be considered with some degree of completness, it is suggested for the moment that the signals DEX1 on line 1403 and the signal DEY0 on line 1405 be considered as high. The development of the high signal on these two lines will be discussed hereinafter. Since the output signal from OR gate 1402 is low, it becomes inverted to high through inverter 1404. With these three signals being considered as high it is apparent that there is a high output on the line WP10. With the line WP10 being high and the line 1607, as shown in FIG. 13 being low, it follows that an electrical current will pass through the wire threading the five magnetic cores in the location 1303. Word organized memories are well known and therefore it should be understood that when current is flowing from the WP10 line 1407 to the RDP1 line 1607, each of the cores in the location 1303 will be driven to one of two magnetic remanent states. In the present device the cores are driven to a magnetic remanent state designated zero which corresponds to binary zero information. In retrospect then we find that the *m*1 signal initially causes the magnetic cores in location 1303 to be reset to zero.

Returning now to FIG. 15, it becomes apparent that the trailing edge of the output signal from the gate 1501 which was simultaneously transmitted to the delay line 1507 is delayed. The delay period of delay line 1507 is from 7/10 to 1.1 microseconds. Thereafter this signal is transmitted forward to transfer monostable multivibrator 1511 to its unstable state, thereby providing a gate signal lasting from 4 to 6.4 microseconds. If the timing between the signal on line 1506 mentioned earlier and the gate signal on line 1513 are considered together, it is clear that there is an overlap of the gate signals.

Figure 16:
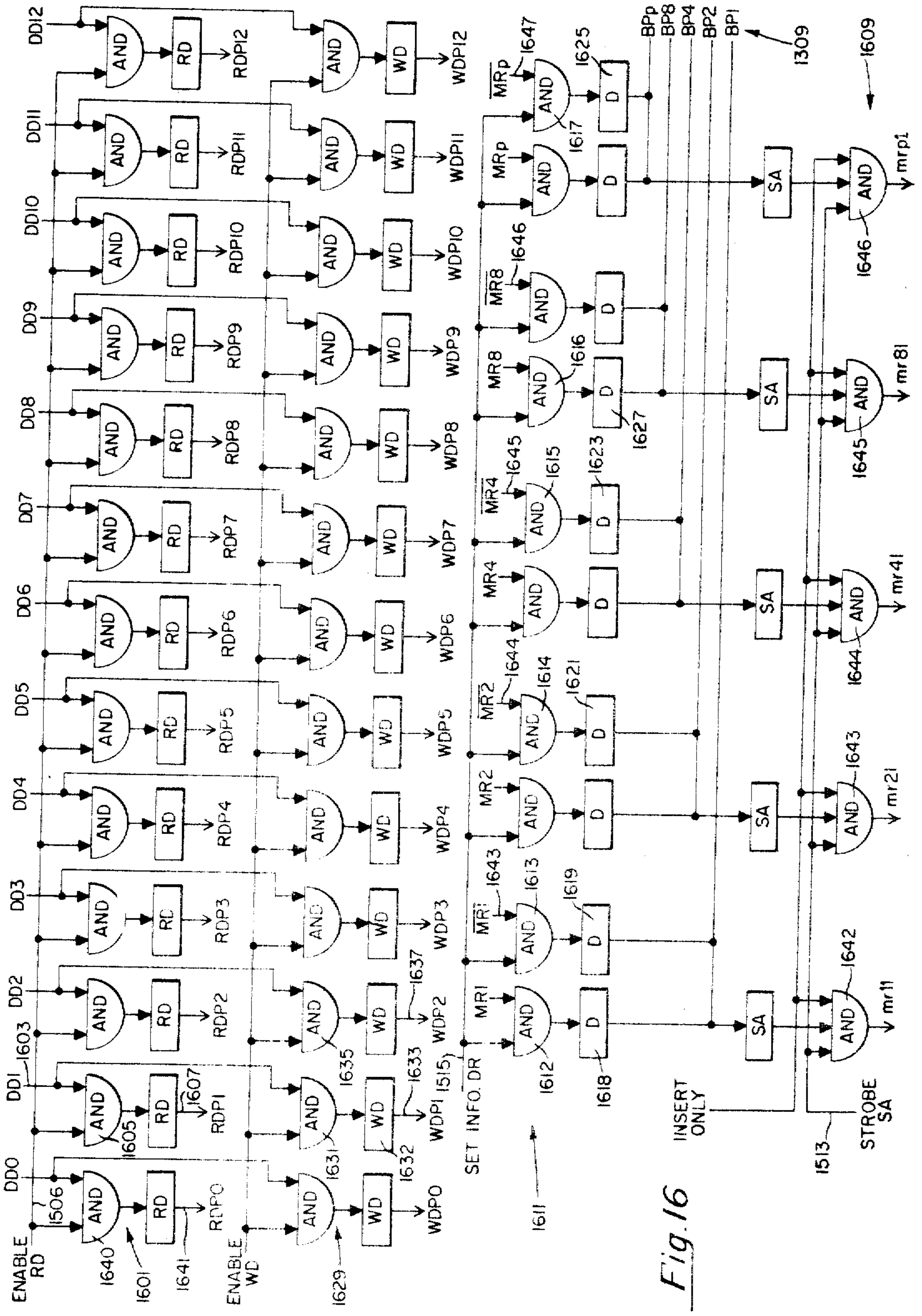
FIGURE 16 is a schematic of circuitry for memory digit and bit plane control.

The gate signal on line 1513 is transmitted, as shown in FIG. 16, to each of the AND gates in the AND gate bank 1609. However, at this time each of the AND gates in the bank 1609 has had transmitted thereto the "insert only" signal which was mentioned before. This "insert only" signal is a low signal and thereby inhibits each of the AND gates in the bank 1609. If the "insert only" signal were not present, each of the AND gates of the bank 1609 would have two input lines conditioned high in response to the presence of the strobe signal on line 1513. If the two input leads are conditioned high each gate which had an information signal applied thereto (high signal) would transmit information into the memory register.

In FIG. 13 it will be noted in the upper right hand corner that there are five information bit lines 1309. Each single one of these information bit lines threads each corresponding core throughout the whole word organized memory. In other words, the number 1 bit signal line threads each of the first position cores in each of the memory core locations throughout the whole magnetic core memory. Since only one digit at a time is read out, it is possible to have the wires threading each of the corresponding positions. When the magnetic cores are subjected to a read-out signal, as described above, each of the cores which is standing in a magnetic remanent state defined as binary one will be switched, thereby providing an output signal. The respective output signals from each of the respective cores are transmitted along these bit lines 1309. In FIG. 16 it will be apparent that the same bit lines 1309 are respectively each connected to an assigned third input line of associated AND gates in bank 1609. When a read-out operation takes place in the magnetic core memory, and the "insert only" signal is not present, the information that is being read from the cores is transmitted along the bit lines through the AND gates 1609 to the memory register shown in FIG. 9. In our case the system has taken information from a bank check and put it into the memory register to await transfer into the magnetic core memory. We simply want to transfer this information into a magnetic core memory location and therefore the information in the selected core memory location must be cleared out by resetting these cores to zero. It can be readily understood that if the information, which may have been present in the cores which are being reset, were to also be transmitted to the AND gate bank 1609 in an attempt to be placed in the memory register, the check information might thus be destroyed or distorted by also having the information from the magnetic core memory transferred into the memory register. The "insert only" line prevents the possibility of distorting information in the memory register when the magnetic core memory is restored to zero. In effect, then, thus far the system has subjected a magnetic core memory location to a read-out operation which has cleared the cores to zero and has not allowed the information which may have been present in the magnetic core memory to enter into the memory register.

Return again to FIG. 15 and consider the transmission of the *m*1 signal from the monostable multivibrator 1505 through the delay line 1509 to the monostable multivibrator 1512. The monostable multivibrator 1512 provides a gate signal which lasts ten to fourteen microseconds. This gate signal is transmitted along the line 1515 to the bank of AND gates 1611 shown in FIG. 16. The "set information" drive signal on 1515 partially conditions each of the AND gates in the bank 1611. Whether or not any of the AND gates in bank 1611 becomes fully conditioned depends on the information that is in the memory register. It will be recalled that with the numeral 8 in the memory register the flip-flops 911 through 919 read collectively 0–0–0–1–0 which in turn provides a high signal on the lines $\overline{MR1}$, $\overline{MR2}$, $\overline{MR4}$, MR8 and $\overline{MRP}$. In view, then, of the high signals from the memory register, we find that the AND gates 1613, 1614, 1615, 1616 and 1617 are each rendered fully conditioned to provide low output signals. It will be noted in FIG. 16 that to each output line of the AND gates in the bank 1611 there is connected an information driver. These information drivers are characterized by being able to drive current in either one of two directions. For instance, the driver 1618 connected to AND gate 1612 will drive current in a different direction from its associated driver 1619 which is connected to the AND gate 1613.

Consider first the information driver current. In accordance with word organized memory techniques, these information drivers will supply current having 1/3 of the value necessary to switch a core. If a core is to have a binary 1 stored therein, this 1/3 current in conjunction with write driver current having 2/3 of the value necessary to switch the core will provide 100% of the current necessary to cause the core to transfer to the magnetic remanent state representing a binary 1. On the other hand, if the core is to have a binary zero written in, the 1/3 current (information driver current) is in the opposite direction from the 2/3 current supplied from the write driver line and therefore the core is not switched. In the present example the drivers 1619, 1621, 1623 and 1625, each of which is connected to an AND gate which is fully conditioned, will be providing information driver current which is flowing in such a direction as to provide flux to buck the flux of the current supplied on the write driver line. On the other hand, the driver 1627 which is connected to the AND gate 1616 will be providing current flowing in such a direction as to provide flux which will aid the flux resulting from write driver current, thereby making it possible for the fourth core in the memory location 1303 to be transferred to its ONE magnetic remanent state.

However, the fourth core will not be switched to the ONE state without the presence of write driver current which we shall consider at this point. In FIG. 15, note that the signal which was transmitted from the delay line 1509 is simultaneously transmitted to the delay line 1514 and forwarded to the monostable multivibrator 1516. The monostable multivibrator 1516 provides a gate signal which is 7.5 to 9 microseconds long. This gate signal is transmitted on line 1517 and identified as the "enable write" pulse. The "enable write" pulse on line 1517 is supplied to each of the AND gates in the bank 1629 as shown in FIG. 16. Since this operation is taking place in DD1 time, the AND gate 1631 has each of its input lines conditioned high, which in turn provides a low output signal on the WDP1 line 1633. As just explained the write driver 1632 which is connected to the AND gate 1631 will provide a current whose value is ⅔ of the value necessary to cause a core in the core memory to be transferred to its magnetic remanent ONE state. The write current supplied on line 1633 will flow along the wire threading the cores in position 1303 in an effort to effect an information write-in. The ⅓ current from the information driver 1627 and the ⅔ current write driver 1632 will provide sufficient driving to switch the fourth core in position 1303 to its magnetic remanent ONE state.

The ⅓ currents from the information drivers 1619, 1621, 1623 and 1625 will flow opposite to the ⅔ current from write driver 1632 so that the first, second, third and fifth cores will remain in their magnetic remanent ZERO states. Thus in summary at this point, the system has transferred the numeral 8 and its parity, in binary form, from the memory register into the magnetic core memory at location 1303.

The next digit read from the check will be the number 1 or the tens position of the amount $43.18. The one is binary coded with parity 1-0-0-0-0. It will be read and temporarily stored in the memory register. The parity assigned thereto will be corrected and then the number will be transferred into the magnetic core memory at position 1311. The reason that the second digit will be transferred to the position 1311 is that the only difference between the transfer of numeral 8 and the numeral 1 is that the numeral 1 has its transfer accomplished during DD2 time. Examine FIG. 16 and it will be clear that if the DD2 line has the high signal thereon, rather than DD1, then the gate 1635 will be fully conditioned and therefore the WDP2 line 1637 will be the line that is conditioned high. A quick examination of FIG. 13 shows that the line 1637 will cause the information to be written into the location 1311. After the numeral 1 has been read and written into the location 1311, the next numeral 3, which is the units position in the dollars column, will be written into the position 1313 and finally the numeral 4, which is the tens position of the dollars column, will be written into the position 1315. Actually in this system there is allowance for 12 digits and an algebraic sign in the word. Since in the illustrative example, the first word has only four digits representing the amount $43.18 the remainder of the memory positions in the word plane 10 under location 1315 will be filled with binary coded zeros.

The account number which is the second word on the check will be read in the same manner as just described for reading the check amount. Since the account number, which is 234 in our example, is the second word, it will be stored in positions 1317, 1318 and 1319. These last mentioned word locations are found in the core memory column above word plane 11 (FIG. 13). Since the account number only uses three digits, the remainder of the memory locations will also be filled with binary coded ZEROS. Although the illustrative problem needs to deal with only two words, it should be understood that there can be many words read from the check or from the ledger and as each word is succeedingly read, a new word plane is chosen to provide a new column of 13 locations for the digits in the sign of the new word.

Thus far we have examined and considered the reading of the amount from the check and the account number from the check and this information has been stored in the core memory device shown in FIG. 13.

TRANSFER OF CHECK INFORMATION INTO ACCUMULATOR REGISTER

Before considering how information is read from the ledger card, it will be recalled that when the information from a ledger card is read it is compared upon read-in with information from the check. In this manner the ledger (in a group of ledgers) with the particular account number 234 can be found and stopped at the printer location. In order to accomplish this comparison, the check information must first be transferred into the accumulator register. Therefore at this point examine how information from the check pertaining to the account number is transferred into the accumulator register from the magnetic core memory.

In order for the check information which has been placed in the magnetic core memory to be retrieved from the magnetic core memory and transferred into the accumulator register it is necessary for the system to receive an instruction. As has been explained previously, the instruction may come from a tape device, or from a dial means, or from a plug-board. In this particular instance the instruction might well be the number 3011. The instruction number has four digits V-W-X-Y. The VW combination represents the operational instruction and the XY combination represents the address. The following table will be helpful.

*Table II*

| VW | X | Y | |
|---|---|---|---|
| 00 | 0 | 0 | Read Ledger and Align |
| 01 | 0 | 0 | Read Ledger and Compare |
| 02 | 0 | 0 | Read Auxiliary Ledger and Align |
| 03 | 0 | 0 | Read Auxiliary Ledger and Compare |
| 04 | 0 | 0 | Read Manual Ledger and Align |
| 05 | 0-4 | 0-9 | Read Ledger and Position to XY |
| 06 | 0-4 | 0-9 | Read Auxiliary Ledger and Position to XY |
| 07 | 0-4 | 0-9 | Read Manual Ledger and Position to XY |
| 08 | 0-4 | 0-9 | Feed (No Read) Auxiliary Ledger and Position XY |
| 09 | 0-4 | 0-9 | Feed (No Read) Manual Ledger and Position to XY |
| 10 | 0-4 | 0-9 | Feed (No Read) Ledger and Position to XY |
| 11 | 0 | 0 | Write and Eject Ledger |
| 12 | 0 | 0 | Eject Ledger (No Write) |
| 18 | 0-9 | 0-10 | Read Keyboard |
| 19 | 0 | 0 | Release Keyboard |
| 20 | 0-1 | 0-9 | Print Accumulator Contents in Format XY |
| 30 | 0-9 | 0-9 | Clear Accumulator and Add XY |
| 31 | 0-9 | 0-9 | Store Contents of Accumulator in Memory Location XY |
| 32 | 0-9 | 0-9 | Add Contents of XY to Accumulator |
| 33 | 0-9 | 0-9 | Subtract Contents of XY from Accumulator |
| 34 | 0-9 | 0-9 | Multiply Contents of XY by the Contents of Memory Location 00. |
| 36 | 0 | 0 | Clear Memory |
| 37 | 0 | 1-11 | Shift Right Around Y Digits |
| 38 | 0 | 1-11 | Shift Right Off Y Digits |
| 39 | 0 | 1-11 | Shift Right Off Y Digits—With Round Off |
| 46 | 1-12 | 0-14 | Advance Program Tape X to Sector Y |
| 47 | 1-12 | 0-14 | Advance Program Tape X to Sector Ya |
| 60 | 0 | 0 | Accumulator Zero, Take Next Instruction, Accumulator Non-Zero, Skip Next Instruction |
| 61 | 0 | 0 | Accumulator Minus, Take Next Instruction, Accumulator Plus, Skip Next Instruction |
| 62 | 0 | 0 | Ledger Full, Take Next Instruction Ledger Not Full, Skip Next Instruction |
| 66 | 0 | 0 | Accumulator Sterling, Take Next Instruction Decimal, Skip Next Instruction |
| 80 | 0 | 0 | Clear Accumulator to Zero and Make Sign Plus |
| 81 | 0 | 0 | Make Sign of Accumulator Plus |
| 82 | 0 | 0 | Make Sign of Accumulator Minus |
| 83 | 0 | 0 | Change Sign of Accumulator |

The above table shows a representative number of instructions. Actually there are over 90 instructions which direct the system into doing various operations such as selectively spacing the ledger, obtaining constants from the tape, etc.

The signals representing the number will condition a group of gate devices as will be immediately explained. In connection with the explanation of the transfer of check information from the magnetic core memory to the accumulator register, consider FIGS. 17 and 18.

Figure 17A:
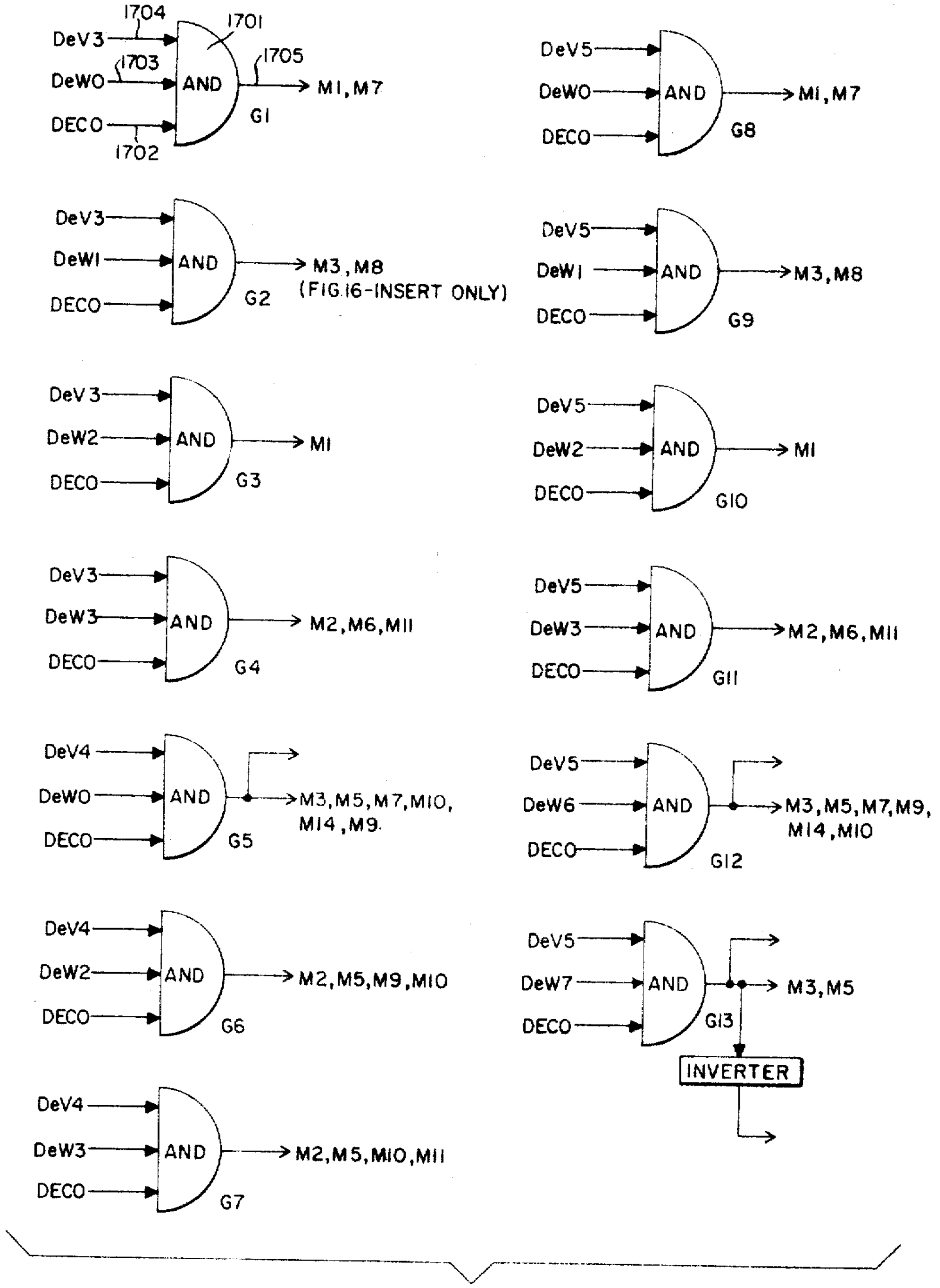
FIGURES 17A and 17B show a plurality of "logical" control circuits.
Figure 17B:
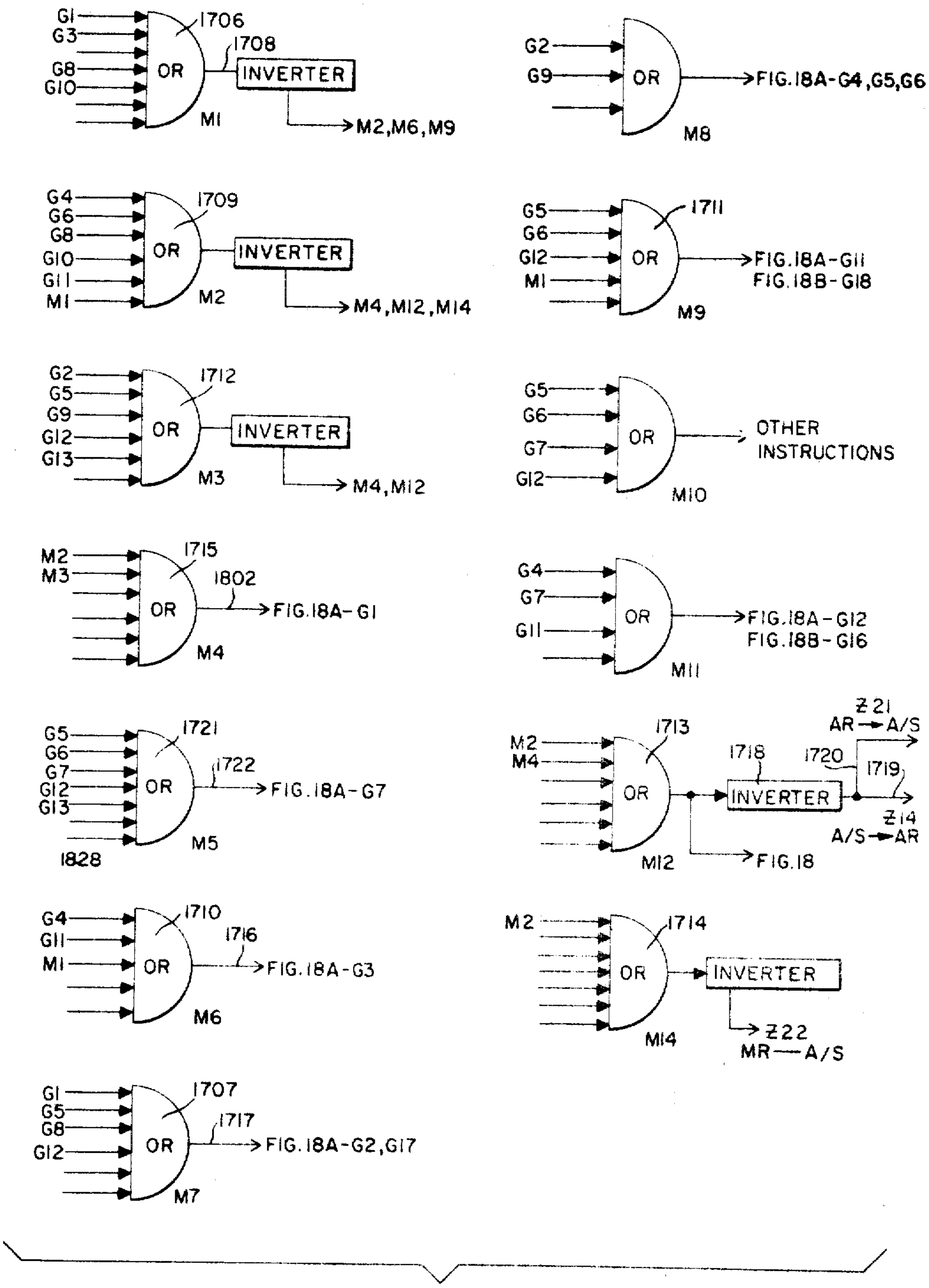
Figure 18A:
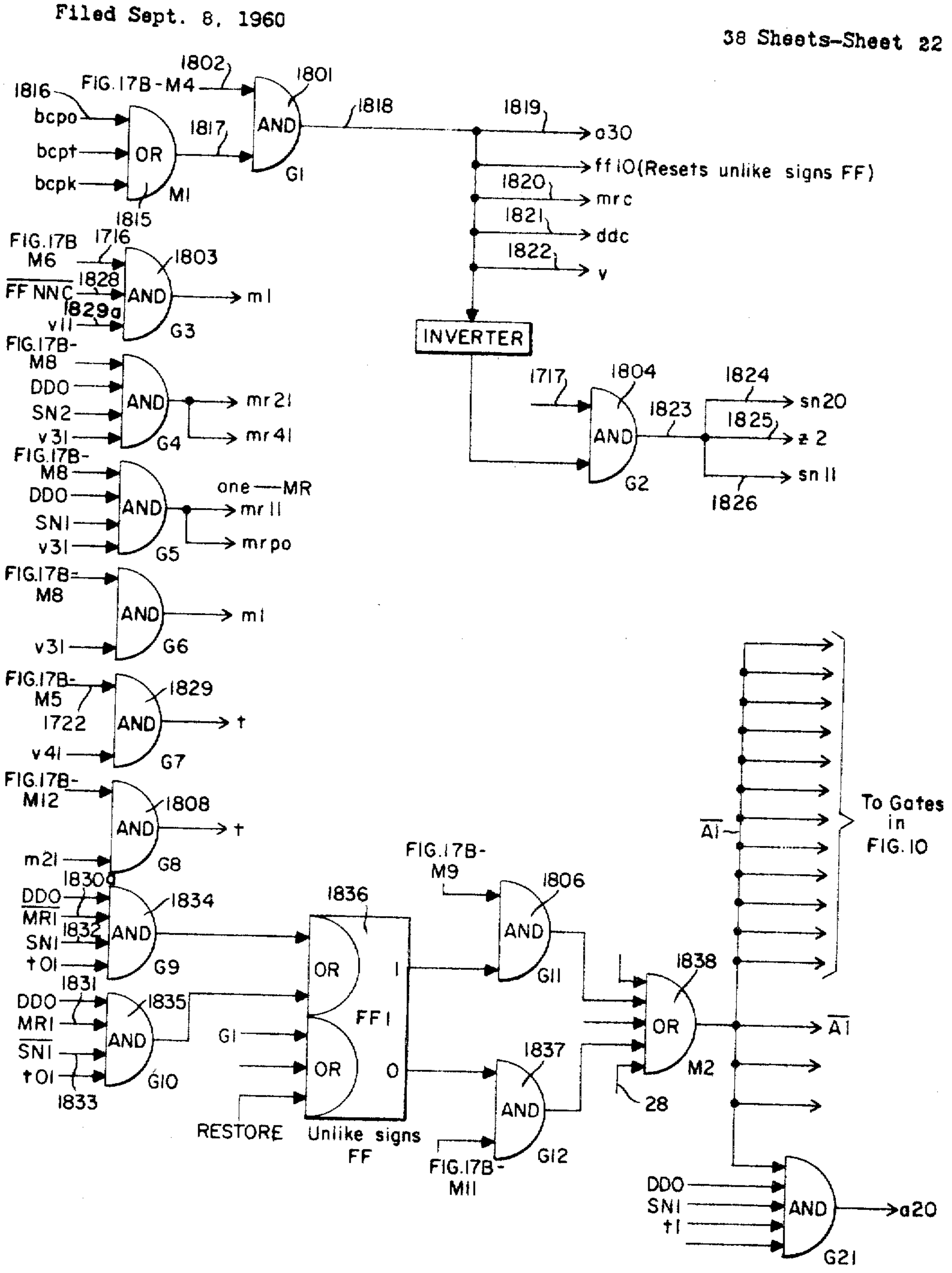
FIGURES 18A and 18B show a plurality of "logical" control circuits for instructions.
Figure 18B:
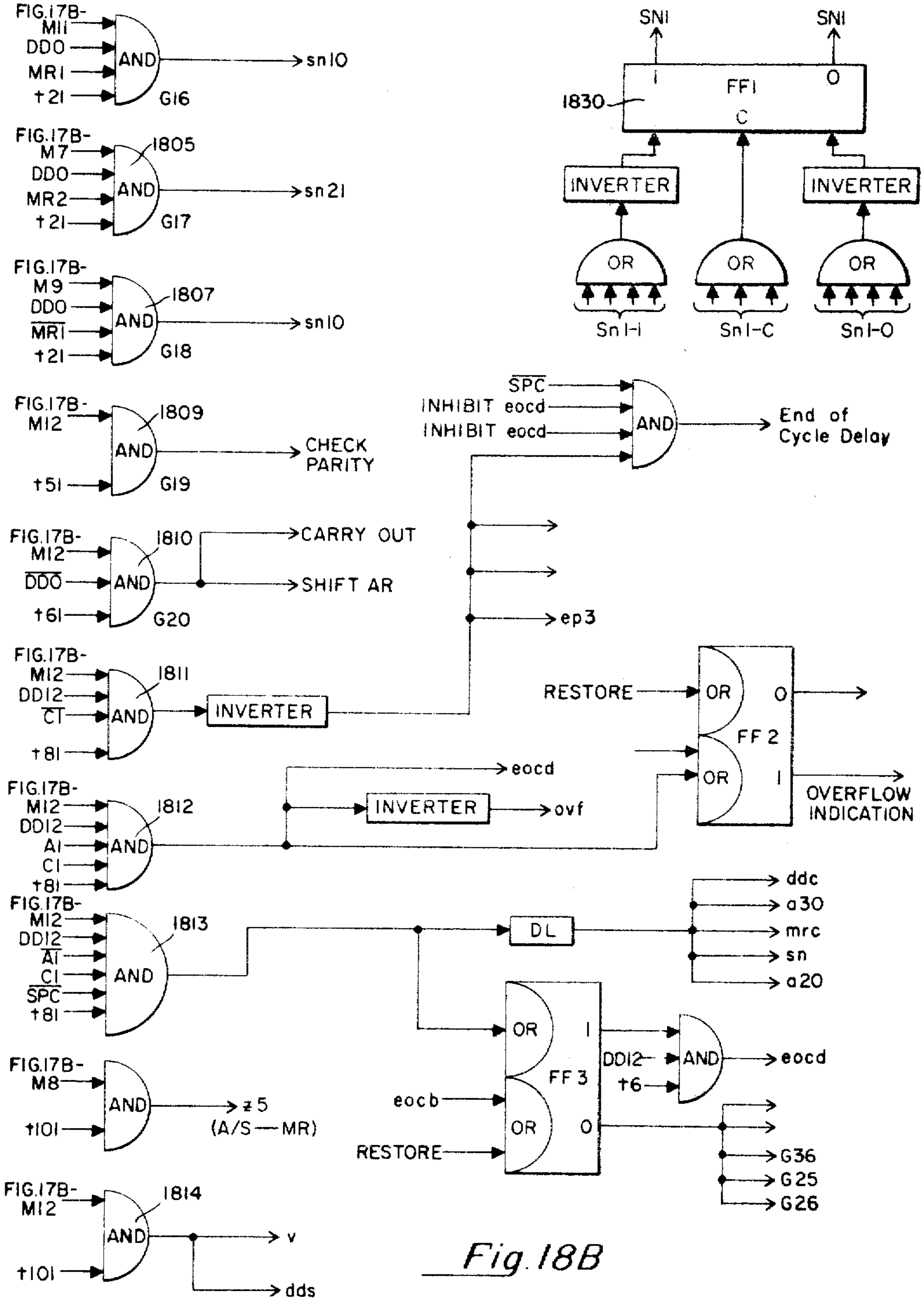

FIGS. 17 and 18 illustrate a great number of the AND gates and OR gates which operate to provide instruction signals in order that the logical operation of the system might be performed.

In particular, in FIG. 17A there is shown in the upper left hand corner the AND gate 1701, which has three input leads thereto. It will be noted that the input leads are labeled DEV3, DEW0 and DEC0. As can be seen from the table above, the DE signals are decoded instruction signals and in particular the DEC0 signal indicates that the instruction is being executed and therefore the line 1702 is high. The DEV3 signal indicates that the V portion of the instruction is three and the DEW0 signal indicates that the W portion of the instruction is 0. Since in our case the instruction (VWXY) is 3011 it becomes evident that the lines 1703 and 1704 are also high, thereby rendering the AND gate 1701 fully conditioned. The fully conditioned AND gate 1701 provides a low signal on line 1705.

The low signal from the AND gate 1701 which low signal appears on output line 1705 is transmitted to the two OR gates 1706 and 1707 in FIG. 17B. In response to a single low input signal on one of its input lines, the OR gate 1706 provides a high signal on line 1708 which high signal is inverted and thereafter transmitted to the OR gates 1709, 1710 and 1711. The OR gate 1709 having thus been properly conditioned provides a high signal which is inverted to provide a low input signal to OR gate 1715, 1713 and 1714. The high signal from the OR gate 1715 is transmitted to the AND gate 1801 in FIG. 18.

The high signal on the line 1802 which is transmitted to the AND gate 1801 partially conditions that AND gate toward providing a low signal, which will initiate the operation that we are herein considering. Examining further the operative gates in FIG. 17, we find that the OR gate 1710 which is providing a high signal on line 1716 is transmitting this high signal to AND gate 1803 in FIG. 18.

An examination of the AND gate 1803 reveals that its output signal is another *m*1 pulse which we have already learned is the triggering pulse that starts the transfer of information out and in of the magnetic core memory.

Examining further the operative gates in FIG. 17, it is found that OR gate 1707 is transmitting a high output signal to gates 1804 and 1805 in FIG. 18. Again in FIG. 17, the OR gate 1711 is transmitting a high output signal to the AND gates 1806 and 1807. We also find that the OR gate 1713 is transmitting high signals to the AND gates 1808 through 1814.

Simultaneously, with the transmission of the high signal to the AND gates just mentioned in FIG. 18, the high signal from the OR gate 1713 is inverted at inverter 1718 to provide two low signals. The first low signal on line 1719 is a control signal which causes the arithmetic unit to read into the accumulator register, and the second low signaal on line 1720 is a control signal which causes the accumulator register to read into the arithmetic unit. The nature of these last two control signals will become apparent hereinafter.

Consider now the significance of the various partially conditioned AND gates in FIG. 18. It should be recalled at this point that the system is endeavoring to accomplish a transfer of the account number information, which was received from the check and which is stored in the magnetic core memory, into the accumulator register device.

The AND gate 1801 is partially conditioned by the high signal on the input line 1802. The OR gate 1815 has three input signal lines provided thereto and in our case the uppermost line is the recipient of a "begin cycling" pulse on line 1816, which causes the OR gate 1815 to provide a high output signal therefrom. The "begin cycling" pulse is a signal which is generated from the program instruction and is not shown here. The high output from the OR gate 1815 is transmitted on line 1817 to fully condition the AND gate 1801 and thereby provide a low output signal on line 1818. The low output signal on line 1818 becomes: a "clear carry register" on line 1819; a "clear the memory register" on line 1820; a "clear the digit distributor" on line 1821; the initiation signal for the *v* pulses on line 1822; a reset signal to flip-flop 1836 and the inverted low signal is transmitted to fully condition the AND gate 1804. With the AND gate 1804 being fully conditioned, there is provided a low output signal on line 1823 which is further transmitted: on line 1824 to cause the operation we are considering to be a decimal operation as compared with a sterling or limited binary operation; on line 1825 to clear the accummulator register to zero which will become significant in the discussion to follow; and on line 1826 to cause the sign of the accumulator to be negative.

The sign of the accumulator is made negative initially so that in the event the word from the memory register is, in fact, negative there will not be a complementary output transmitted from the arithmetic device. In other words, if the word from the memory register is negative and the accumulator sign is positive, the answer will be complemented at the output from the arithmetic device. In this case the information in its true form is simply being transferred from the magnetic core memory to the accumulator register.

The flip flop 1827 has been restored to its zero side and therefore the $\overline{NNC}$ signal on line 1828 is high. The $\overline{NNC}$ signal is an input signal to gate 1803. It will be recalled that the *v* timing pulses were started by a signal on line 1822 described above. At the first *v* timing pulse signal (*v*1), there is a timing pulse transmitted to the input line **1829*a* of the AND gate 1803** thereby rendering this AND gate fully conditioned to transmit the *m*1 pulse to the OR gate 1501 of FIG. 15.

The role of the trigger signal *m*1 has already been considered. Before following the transfer of information from the magnetic core memory through the memory register in response to this last-mentioned *m*1 pulse, consider some of the other conditions that are effected within the system. The signal from M12 in FIG. 17B is high and is applied to gate 1808 in FIG. 18A. The other input line to gate 1808 becomes high with an *m*2 signal from FIG. 15. In FIG. 15 it will be seen that after the *m*1 signal travels the entire line of monistable multivibrators and delay lines, there is produced an *m*2 pulse. When the *m*2 pulse is applied to gate 1808 this gate becomes fully conditioned and generates a low output signal therefrom which starts the *t* pulse generator.

Since the sign of our information in the core memory is actually plus, the $\overline{MR1}$ sign will not be high thereby providing a high signal on line **1830*a* and a low signal on line 1831**.

Since the sign of the accumulator has been set at a negative value there is initially a low signal on line 1832 and a high signal on line 1833. In view of the fact that each of the AND gates 1834 and 1835 have a low input signal applied thereto, neither of these AND gates is fully conditioned and therefore the flip-flop 1836 is not transferred into its ONE condition. With the flip-flop 1836 in its ZERO condition, neither the AND gate 1806 nor 1837 is fully conditioned. Therefore the output from the OR gate 1838 is low so that the internal subtract signal $\overline{AI}$ is low. A large number of the control signals have been studied in the above description with respect to FIG. 18 and other control signals can be determined if necessary, with a minimum of study.

According to the description thus far the account number is stored in the magnetic core memory positions 1317, 1318, 1319 of FIG. 13. When the *m*1 signal from the AND gate 1803 of FIG. 18 is transmitted to the OR gate 1501 of FIG. 15, it properly conditions this OR gate to generate a low output signal. The low output signal from the OR gate 1501 is transmitted to the AND gate 1503 and since this operation is not an "insert only" operation as previously described, the "insert only" line will be conditioned high. Therefore there is a low output signal transmitted from the AND gate 1503 to restore the memory register flip-flops 911 through 919 to their zero conditions. This low output signal is designated in FIG. 9 as being transmitted on line 936.

The trailing edge of the output signal from the OR gate 1501 is transmitted to provide a gate signal on line 1506 which in FIG. 16 is shown as being transmitted to each of the AND gates in bank 1601. Since the initial transfer of information involves transferring the sign of the word (at DD0 time) the DD0 signal is also high thereby rendering the AND gate 1640 fully conditioned to provide a low output signal on the RDP0 line (FIG. 13). It will be recalled that the instruction is 3011, the address portion being 11. This address portion 11 will result in having signal which will properly condition word plane 11 and therefore the sign of the word will be read from the core memory position 1329. When the sign bit signals are read out onto the lines 1309 they are transmitted as shown in FIG. 16 to the AND gate bank 1609. Since this is not an "insert only" operation, the "insert only" line is high and therefore each of the AND gates in the bank 1609 has one of its input lines properly conditioned toward being fully conditioned. The sign digit actually only has one significant bit which is the lowest order bit. In other words, although there are five cores in position 1329 only the first core would be subject to transfer if a "word sign" is stored thereat. A ZERO bit is a negative sign, a ONE bit is a positive sign. For sterling, MR4, MR2, are also set in the sign digit.

Returning to FIG. 15, the output from the OR gate 1501 was transmitted to provide a gating signal on line 1513 which, as shown in FIG. 16, is transmitted to each of the AND gates in the bank 1609 thereby properly conditioning a second input line to each of these AND gates. If, in fact, there were a ONE signal representing the sign of the word then the AND gate 1642 would have been fully conditioned and there would be a binary ONE read into the memory register flip-flop 911 as shown in FIG. 9. However, as previously suggested, the sign is actually plus and therefore BRP is high and only AND gate 1646 in the bank 1609 is fully conditioned, so that the memory register becomes 0–0–0–0. Since the memory register reads 0–0–0–0, each of the lines 1647 through 1651 is rendered high and when the "set information" driver signal on line 1515 is transmitted subsequently (FIG. 15), each of the AND gates 1613 through 1617 will provide an output signal. In this manner the 0–0–0–0–1 which has been read from the magnetic core memory is returned to the magnetic core memory. It should be noted here that the non-destructive read-out has been accomplished by having the information which is read from the magnetic core memory transmitted through the memory register back into the magnetic core memory.

The sign information is not transferred through the arithmetic unit but instead at DD0 time the memory register is tested. If the least significant digit MR1 is high the sign is negative and flip-flop 1830 shown in FIG. 18 is set to remember the sign during the word transfer.

The digits of the account number which are stored in the magnetic core memory positions 1317, 1318 and 1319 will be read from the magnetic core memory and transferred into the memory register one at a time as was just described in connection with the transfer of the sign digit, excepting of course, that the account number digits will each have four bits and a parity. It should be kept in mind at this point that the digits representing the account number will also be recirculated and transmitted back into the magnetic core memory in accordance with the non-destructive read-out so that the account number will actually be in the magnetic core memory as well as in the accumulator register.

Consider now in detail the further transfer of the account number. As was just mentioned, the account number 234 is stored in the core memory in positions 1317 through 1319. If the transfer of the digit 4 into the accumulator register is studied and fully understood, it can be assumed that all other digits will be transferred by a similar process.

The numeral 4 is binary coded 0–0–1–0–0. Initially there is an *m*1 pulse to start the transfer digits from the magnetic core memory and the provision of the *m*1 pulse has been already described. The control signals which result from the generation of the *m*1 pulse have also already been described. Since the transfer of the digit 4 is at DD1 time, the AND gate 1605 becomes fully conditioned and there is a resultant high output signal on line 1607.

The high signal on line 1607 (which is the RDP1 line as is seen in FIG. 13) is transmitted to condition the magnetic cores in position 1317 for a read-out operation. Simultaneously there is a control signal to condition the word plane line 11 as seen in FIG. 14 and as has been explained previously. The high signal on line 1607 in conjunction with the relatively low signal on the word plane line 11 causes a read-out signal to be passed through the cores found in the memory location 1317 to effect a read-out of the bit information related to the digit 4.

The digit 4 is binary coded 0–0–1–0–0 including the parity number and therefore only the third core is in the magnetic remanent state representing a binary ONE. Therefore when the read signal is transmitted through these cores, there is an output on only one of the bit lines 1309. If the bit lines 1309 are read from top to bottom the output signals would be 0–0–1–0–0. The bit signals will be transmitted to the AND gates in the bank 1609 as shown in FIG. 16. Assuming the other input line to the AND gates have high signals thereon, the AND gate 1644 will be the only one providing a low output signal while the AND gates 1642, 1643, 1645 and 1646 will each be providing a high output signal. The output signals from the AND gates of the bank 1609 will transfer the memory register flip-flops 911 through 919 respectively, to the collective condition 0–0–1–0–0. As explained before the outputs from the AND gates 1609 will be transferred back into the magnetic core memory position 1317 through the AND gates 1611 shown in FIG. 16.

Examine FIG. 10, recalling that $\overline{\text{MR1}}$ equals $\overline{\text{Y1}}$ and $\overline{\overline{\text{MR1}}}$ equals Y1, etc. In FIG. 17 it can be seen from OR gates 1713 and 1714 respectively that both Z1 and Z2 are high. From FIG. 9 we find that the conditions which are present to cause the logic circuit of FIG. 10 to operate in a particular fashion are the following: The lines $\overline{\text{X1}}$, $\overline{\text{C1}}$, Z1, Z2, $\overline{\text{Y1}}$ and $\overline{\text{A1}}$ each have a high signal thereon. In addition there will be a high signal $\overline{\text{Y2}}$, Y4, $\overline{\text{Y8}}$ and $\overline{\text{YP}}$. Since the accumulator register has been reset to 0–0–0–0, there will be a high signal at the $\overline{\text{X2}}$, $\overline{\text{X4}}$, $\overline{\text{X8}}$ and XP. Keeping these last mentioned conditions in mind, study the conditioning of the gates in FIG. 10, as was done earlier in the description relative to the reading of the check information into the system. It will be found that the following output signals are high, $\overline{\text{R1}}$ equals $\overline{\text{S1}}$, $\overline{\text{C2}}$, $\overline{\text{R2}}$, $\overline{\text{C4}}$, R4, $\overline{\text{C8}}$, $\overline{\text{R8}}$, and $\overline{\text{C16}}$.

With the above conditions in mind consider the correction circuit shown in FIG. 12. The following output signals are all high $\overline{\text{S1}}$, $\overline{\text{S2}}$, S4, $\overline{\text{S8}}$, and $\overline{\text{C10}}$ as well as P1 and $\overline{\text{P2}}$. Examining the circuitry in FIG. 11 with the conditions heretofore derived, we find that there results high output signals at terminals $\overline{\text{SP}}$ and $\overline{\text{ZP}}$, the latter indicating no parity error.

Figure 19:
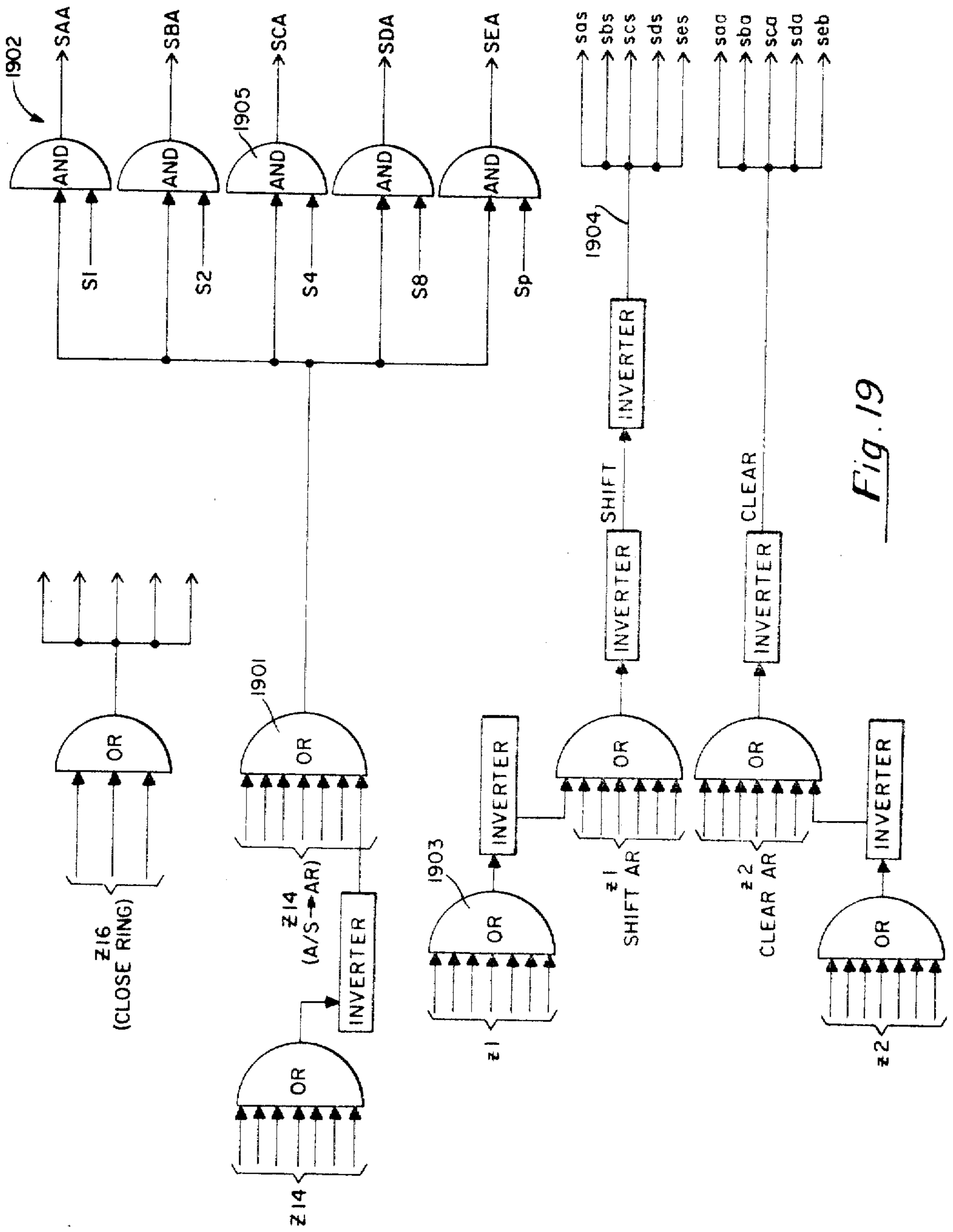
FIGURE 19 is a schematic of the accumulator register control circuitry.

Consider the aforementioned output signals in connection with FIG. 19 and it is found that there is a Z14 signal transmitted from the OR gate 1713 in FIG. 17 to the OR gate 1901 in FIG. 19. This causes the last mentioned OR gate to provide a high output signal to each of the AND gates in the bank 1902. In a similar fashion there is a Z1 signal from the AND gate 1810 in FIG. 18 transmitted to the OR gate 1903 in FIG. 19 and this causes a shift signal to be transmitted on the line 1904. In accordance with the S signals just described (S4 being high) the AND gate 1905 is fully conditioned, while the other AND gates in the bank 1902 are not fully conditioned. Therefore in response to the shift pulse on line 1904 the numeral 4 is transmitted through the AND gates in the bank 1902 into the left hand most position of the shift register in the accumulator register 504 (FIG. 5). With subsequent shift pulses the digits of the word will be moved into the shift register and the accumulator register and eventually the numeral 4 in binary coded form will assume the right-hand most position of the accumulator register.

In like fashion the numerals 2 and 3, which when taken together with numeral 4 constitute the account number, are transmitted through the accumulator register control circuitry into the accumulator register devices. The numerals are shifted to the right, until eventually the three right-hand most positions read 234, the account number.

INFORMATION FROM LEDGER

With the account number from the check having thus been stored in the accumulator register, consider how the numerals from the ledger are read. In the following discussion bear in mind that the number from the ledger is to be read into the arithmetic unit for a comparison with the account number from the check in order that the proper ledger may be recognized.

The ledgers are advanced physically through the ledger reader whereat the account numbers on the ledger are examined and when there is a match between the account number on the ledger and the account number on the check, the ledger will be stopped. Thereafter the information contained on both the ledger and the check will be further handled. In particular, the amount of the check will be subtracted from the bank balance on the ledger and the resultant information will be transferred out of the arithmetic unit to be printed on the ledger. Insofar as the present invention is concerned it is not necessary to describe the mechanical operations of the line finding equipment which transports and stops the ledger at the printing station. These mechanical features have been described and claimed in United States patent application entitled "Record Sheet Feeding and Line Selection Mechanism," filed September 8, 1959, Serial No. 838,468, in the name of Robert Bradshaw et al.

Figure 20:
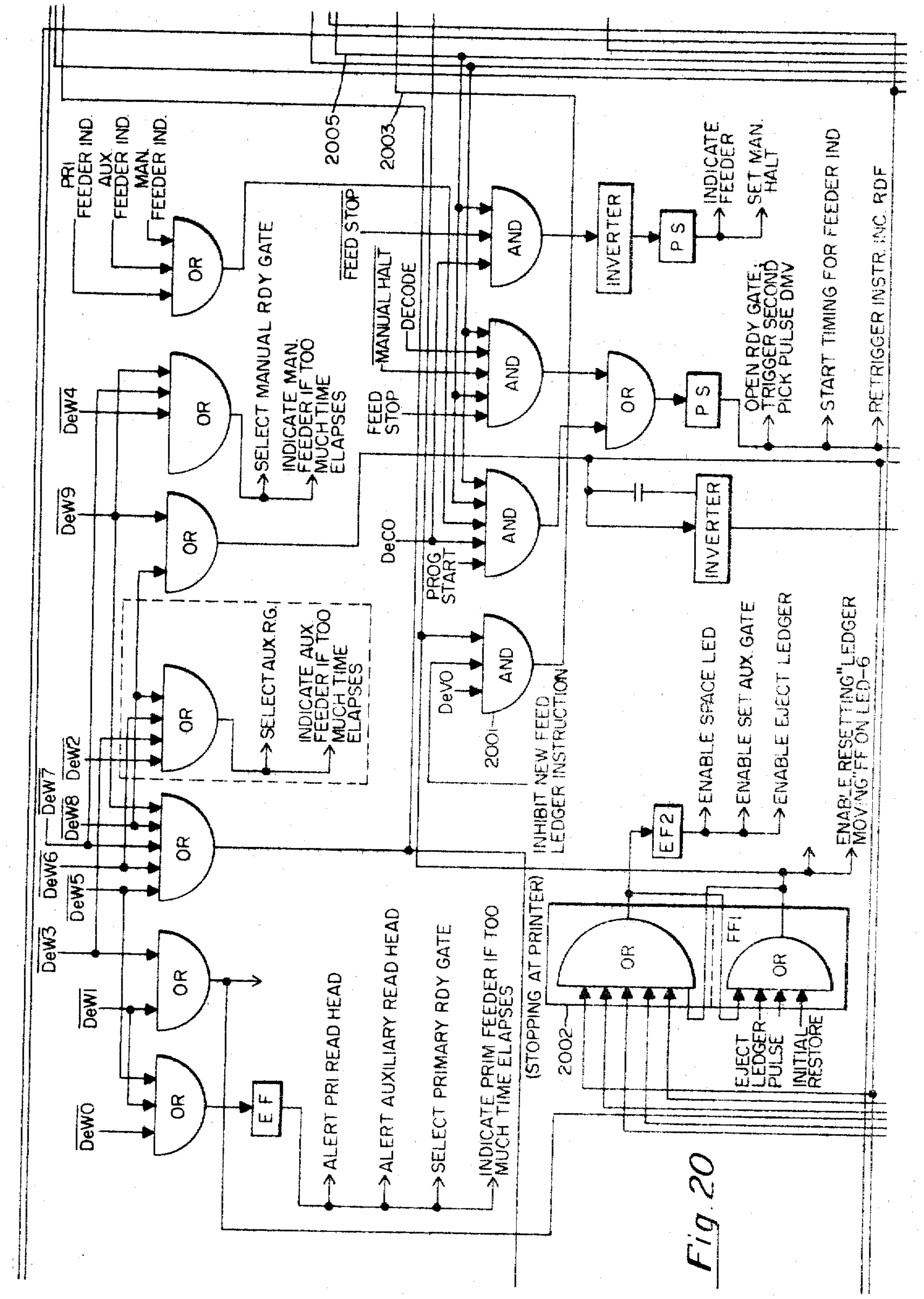
Figure 21A:
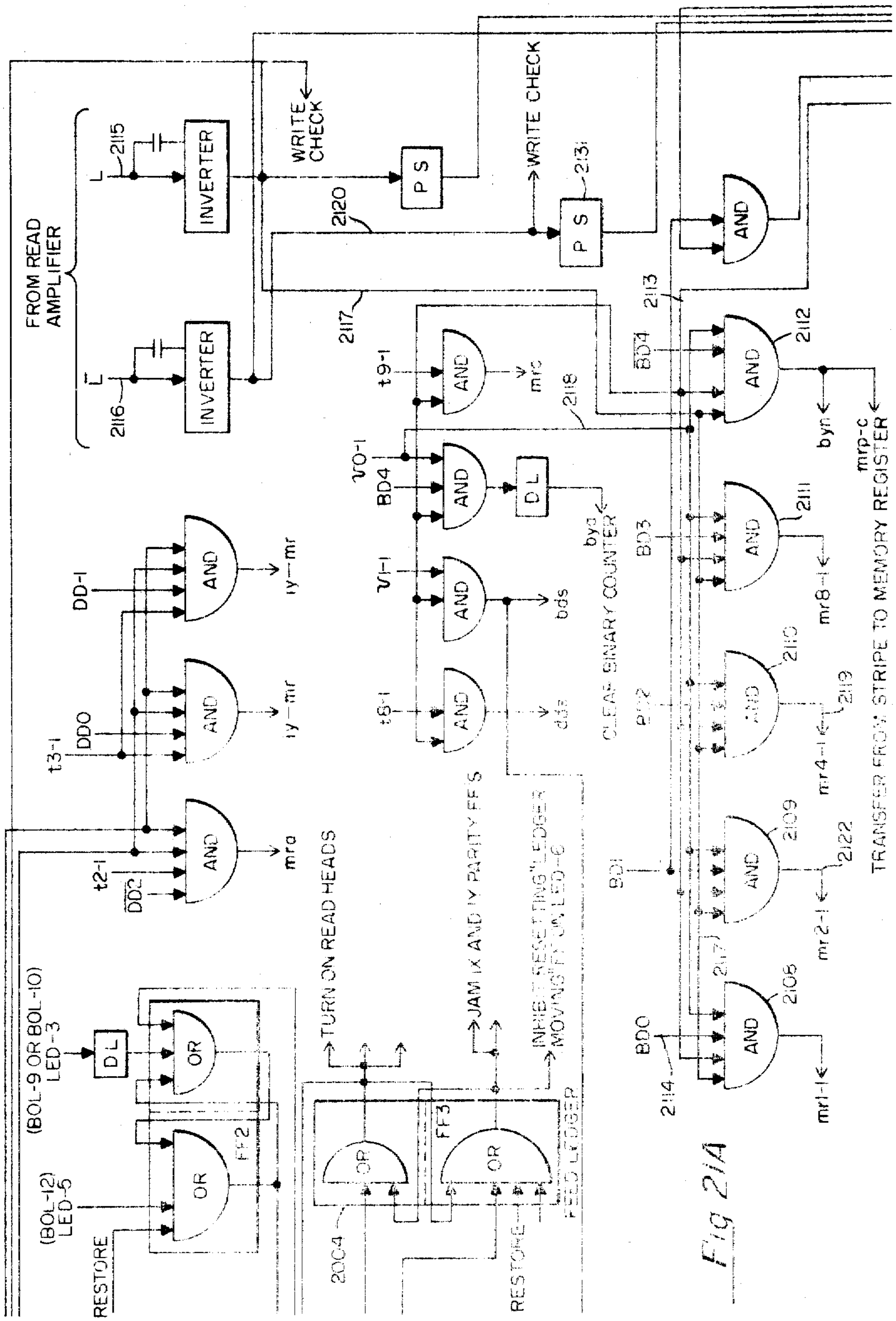
Figure 21B:
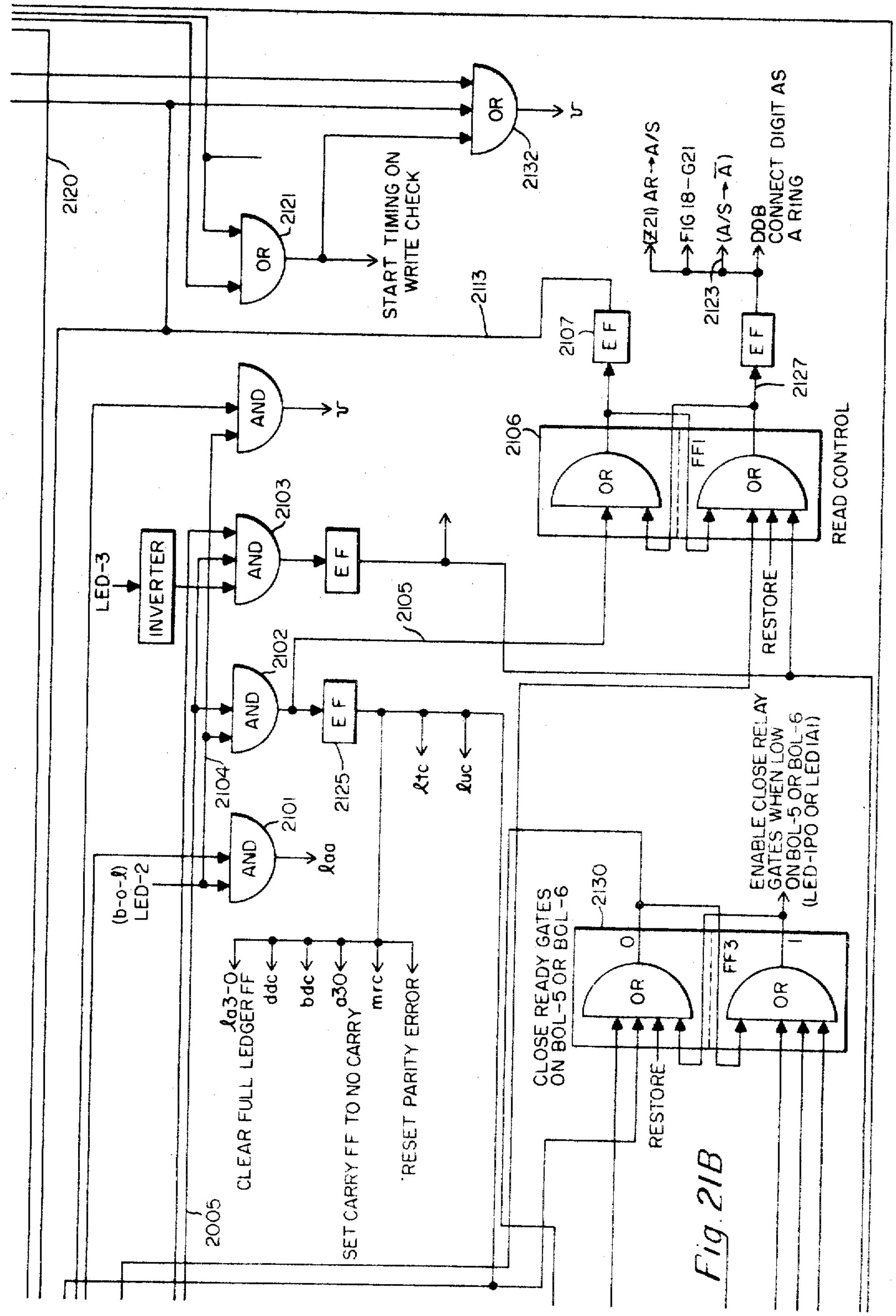
Figure 22:
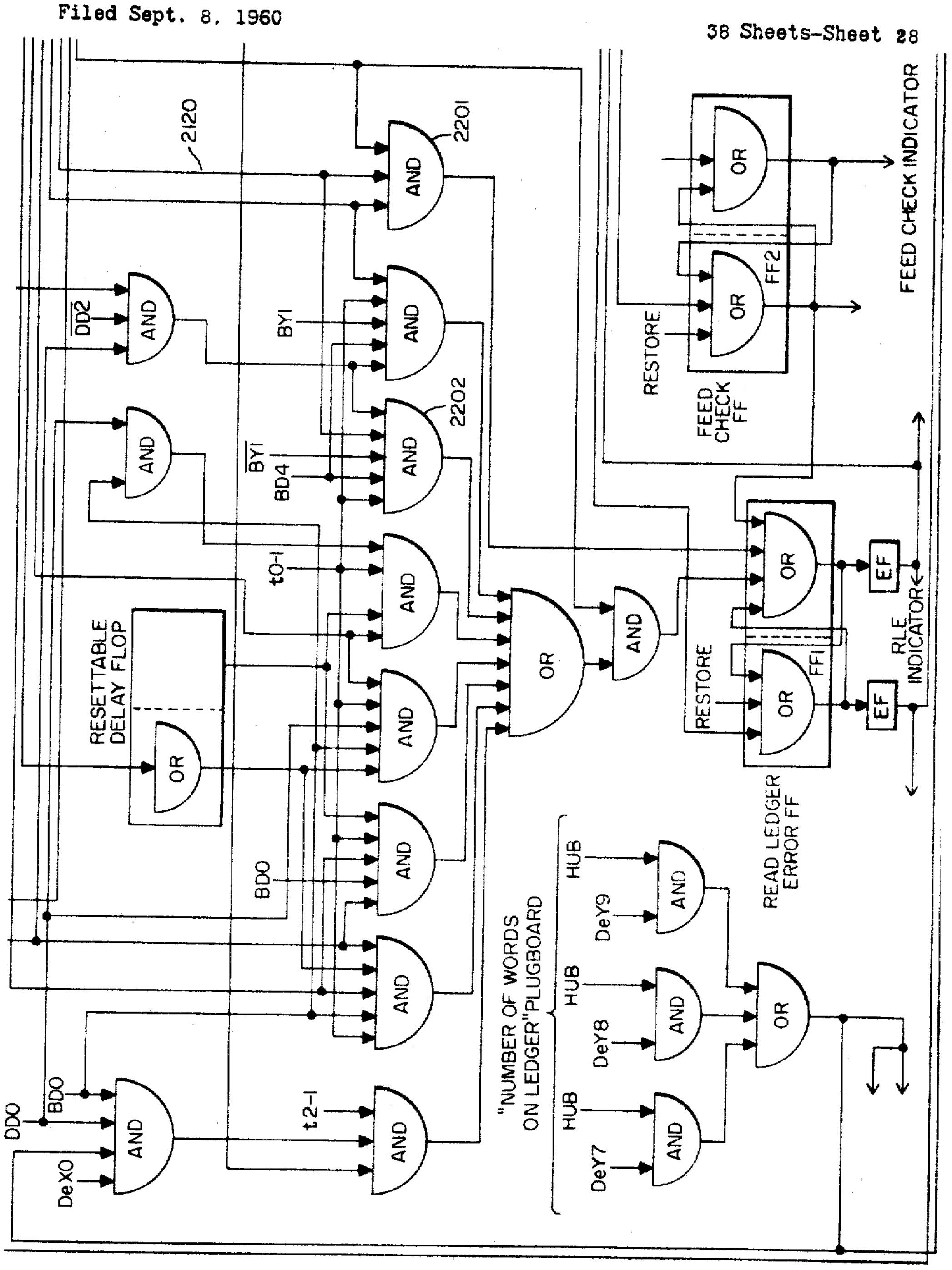
Figure 23:
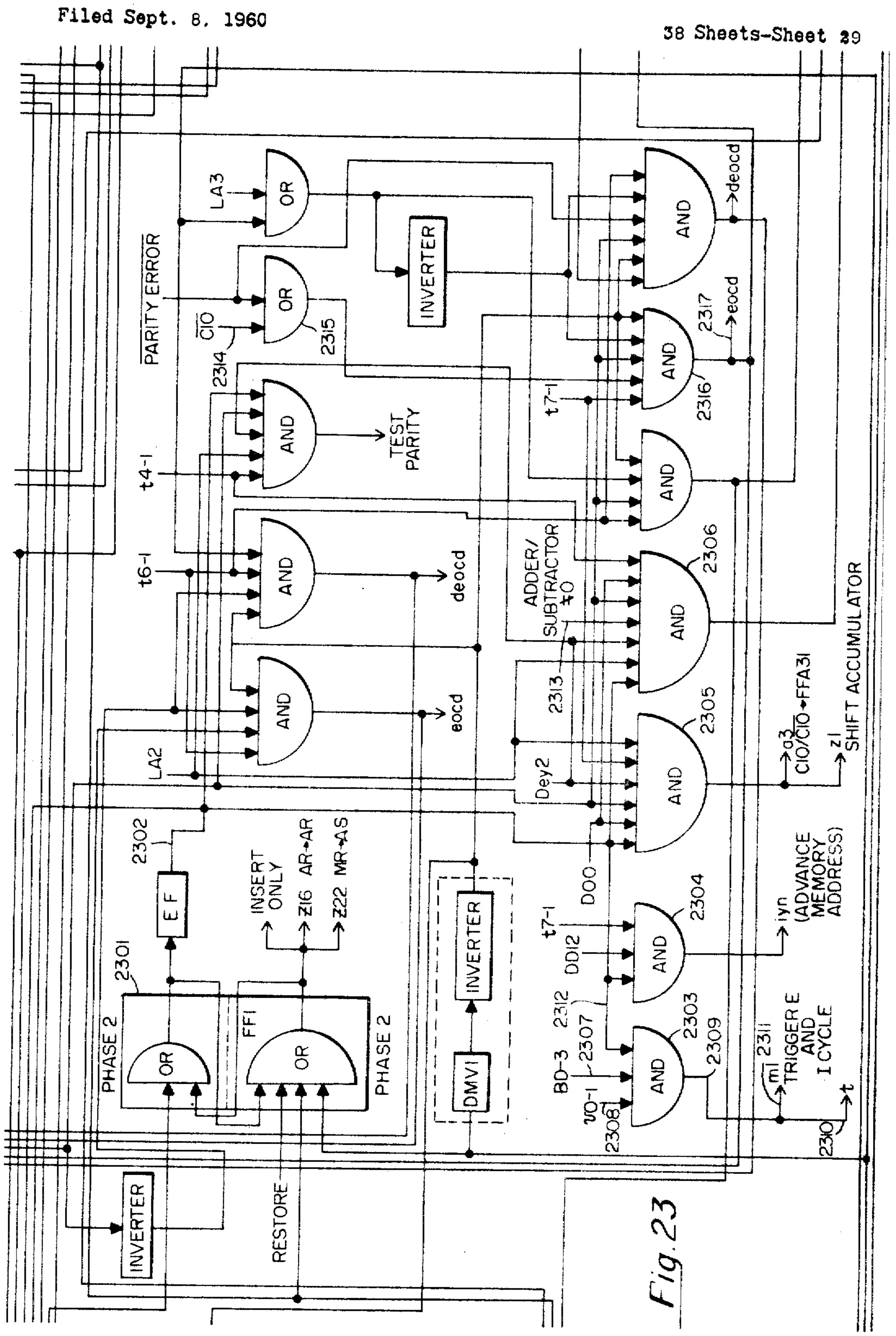

Consider FIGURES 20 through 24 together and arranged as shown in FIGURE 25. When the system is ready to read the information on the ledger, there is an instruction signal $\overline{DEV0}$ as shown in FIG. 20, transmitted to the gate 2001. On the second input line there is found a signal which is normally high and only becomes low if a new ledger feed is signalled while the first ledger feed is yet in effect. Since the ledgers are initially not being stopped at the printing station the flip-flop 2002 is in its ZERO condition which provides a third high input signal to the AND gate 2001 thereby fully conditioning that AND gate. The output signal from the AND gate 2001 is transmitted on line 2003 to transfer the feed ledger flip-flop 2004 to its ONE condition. In response to the feed ledger flip-flop 2004 being transferred to its ONE condition, the output signal therefrom is transmitted along line 2005 at twelve o'clock angle, then at a nine o'clock angle again at a six o'clock angle and then at a three o'clock angle to the AND gates 2102 and 2103 shown in FIG. 21B.

For the moment only consider the operation of the AND gate 2102. The presence of the feed ledge signal on line 2005 serves to properly condition one of the input lines to the AND gate 2102. When the ledger has been advanced physically beyond a certain position in the ledger feed mechanism, (which position is recognized by the breaking of a beam of light by the ledger) a beam-of-light signal is transmitted on line 2104 to render the AND gate 2102 fully conditioned. With the AND gate 2102 being fully conditioned there is a signal transmitted therefrom to transfer the read control flip-flop 2106 to its ONE position. The output from the read control flip-flop 2106 while in its ONE condition is transmitted through the emitter follower 2107 to each of the AND gates 2108 through 2112. The read control signal on line 2113 thereby partially enables each of the AND gates 2108 through 2112.

Returning for the moment to the output of the AND gate 2102 it can be seen that this output signal is transmitted through the emitter follower 2125 and thereafter is designated as a number of different control signals. In particular it should be noted that one of these control signals is a *mrc* control signal. This last mentioned control signal is transmitted to the memory register flip-flops in FIGURE 9 to restore the memory register flip-flops to the condition 0–0–0–0–1.

When the read ledger operation commences and in fact the ledger is in a position to be read, there is provided to each of the AND gates 2108 through 2112, in sequential order, BD (bit distributor) timing pulses. It will be noted that one line 2114 there is provided a BD0 pulse to the AND gate 2108 and in a similar fashion a BD1, BD2, and BD3 pulses are respectively provided to the AND gates 2109, 2110 and 2111. The AND gates 2112 which is the parity number AND gate, has a BD timing signal provided thereto which is designated $\overline{BD4}$. The reason for this $\overline{BD4}$ timing pulse will become apparent hereinafter, but for the moment it should be understood that this gate has one of its input lines conditioned high for the timing periods BD0 through BD3.

As the ledger moves under the ledger reading station, the two tracks are read simultaneously. As described earlier in connection with FIGURE 3, the two stripes on the back of the ledger card have been printed with material which is similar to magnetic tape, and the information on one stripe is complementary to the information on the other. In our particular example, ignoring the "line find" information and "special" information, the first word information which will be read by the ledger reader will be the account number. As suggested earlier the system operates to first feed the "line finding" information and store this information to move the ledger to the next printable line for printing the results of the current transaction. But insofar as this invention is concerned, the reading of this information and its utility is not described. The first digit read in is the sign digit but for our purpose consider that the first digit which will be read by the ledger reader will be the least significant digit of the account number, which is the digit 4.

The L reading station 2115 will read the stripe which has the true coded information on it, while the $\overline{L}$ reading station will read the stripe on the ledger which has the complementary coded information thereon. The number 4 is coded 0–0–1–0–0 (with parity) and as the ledger moves by the reading station there will be a pulse signal read at the $\overline{L}$ reading station 2116. The $\overline{L}$ bit signal serves to perform two functions. This $\overline{L}$ bit signal is transmitted along the line 2120 at the three o'clock angle, along the line 2120 at a six o'clock angle, further along 2120 at a nine o'clock angle, through the pulse standardizer 2131 to the OR gate 2121. The output signal from OR gate 2121 partially conditions AND gate 2132 to provide a *v* starting signal. The output on 2120 from the $\overline{L}$ bit signal is also transmitted at the three o'clock, six o'clock angle and a nine o'clock angle to eventually terminate in the two AND gates 2201 and 2202 in FIGURE 22. The two AND gates 2201 and 2202 serve to provide control signals which will indicate, among other things, if in fact each of the stripes simultaneously contains a bit signal, rather than one or the other containing a bit signal as is proper. In other words, since for each bit signal on one stripe there must be a complementary non-bit condition on the other stripe and if in fact both stripes have bit signals this constitutes an error. The system will recognize the error by the output of one of the gates 2201 or 2202.

When the third bit is read from the ledger this will provide a signal at the L reading station 2115 since the numeral 4 is coded 0–0–1–0–0. This L signal will be transmitted along line 2117 at a six o'clock angle and further along the line 2117 to each of the AND gates 2108 through 2112. Since this will be the third bit signal to be read the BD2 pulse signal will also be applied, thereby conditioning three of the four input lines to the AND gate 2110. The parity AND gate 2112 as explained before will have a BD4 signal thereon and therefore it also will have three of its four input lines properly conditioned. Simultaneously with each reading of either an L or $\overline{L}$ bit signal, there are $\nu$ clock pulses started. In accordance therewith a $\nu$0–1 signal on line 2118 is transmitted to the AND gates 2108 through 2112. It follows that with the transmission of the $\nu$0–1 clock pulse, the AND gate 2110 becomes fully conditioned and there is an output signal therefrom on line 2119 which is designated *mr*4–1. The output signal from the AND gate 2110 in FIGURE 21 is transmitted to one of the *mr*4–1 input lines in FIGURE 9 to cause the memory register flip-flop 915 to be transferred to its ONE condition. Since the memory register flip-flops were restored to 0–0–0–0–1, as described earlier, the numeral 4 now has been transmitted to the memory register flip-flops which are read collectively 0–0–1–0–1.

With the memory register flip-flops 911 through 919 setting at 0–0–1–0–1, it is recognized that there is a wrong parity number present. Therefore let us consider the role of the gate 2112 and the $\overline{BD4}$ signal in FIGURE 21. It will be recalled that this gate has three of its four input lines conditioned for each of the bit distributor signals BD0 through BD3. Whenever a signal is read by the L reading station 2115 the fourth input line to the gate 2112 becomes fully conditioned and there is an output signal transmitted along two paths, one of which is designated *mrp–c*. It will be noted in FIGURE 9 that the *mrp–c* signal is transmitted to the center of the flip-flop 919. The location of the input line in the center of the flip-flop 919 is indicative of the fact that a signal coming in at that point serves as a complementing signal thereby transferring the flip-flop to its opposite state. Since the flip-flop 919 was reset to ONE by the *mrc* signal, originally, this *mrp–c* signal from gate 2112 in response to the L bit signal will transfer the flip-flop 919 to its ZERO side. Therefore the numeral 4 as stored in the memory register flip-flops will now have a proper parity number.

Once a binary coded digit has been read from the ledger into the memory register it is then necessary to transfer this information to the magnetic core memory for further use. In order to transfer the information from the memory register into the core memory, it is necessary to provide an *m*1 signal as was true when the check information was transferred from the memory register to the core memory as previously described. Consider FIGURES 23 and 24.

It will be recalled that insofar as this description is concerned the "line find" information was not studied and its subsequent processing in the system was not considered. The procedure of storing the "line find" information and storing it for use in order to locate the ledger card at the next printable line constitutes Phase 1. When Phase 1 has terminated, there is provided a Phase 2 signal. The Phase 2 signal is transmitted from flip-flop 2301 in FIGURE 23, when this flip-flop has been transferred to its ONE condition. The flip-flop 2301 is transferred to its ONE condition at the end of Phase 1 or after the line find operation has been completed.

The output signal from the flip-flop 2301 is transmitted on line 2302 to each of the AND gates 2303 through 2306. Examine the input signals to the AND gates 2303 in FIGURE 23. The first input signal on line 2312 is the "Phase 2" input signal which has just been described. The input signal on line 2307 is the BD3 signal which we have already encountered as being the time that the fourth bit signal was read from the ledger. The third input signal is a $\nu$0–1 transmitted on line 2308 and therefore the AND gate 2303 becomes fully conditioned with the arrival of the $\nu$0–1 pulse. The output of the AND gate 2303 is transmitted on line 2309 to start the *t* pulses by virture of line 2310 and to provide an *m*1 trigger signal on line 2311. The *m*1 signal on line 2311 is identical to the *m*1 signal described before to initiate the transfer of information from the memory register to the magnetic core memory.

Examining FIGURE 15 once again we find that the *m*1 signal is transmitted to the OR gate 1501 and thereafter the operation is identical with that described in connection with the transfer of the check information from the memory register into the core memory. There is one slight variation in this transfer in that the information transferred from the ledge to the core memory must have a location different from the check information since obviously the ledger information cannot occupy the same location as the check information simultaneously. Therefore examining FIGURE 14 it is suggested that, for the moment, it be assumed that the information from the memory register which represents the ledger information will be transferred into the word plane designated WP02. Therefore, the line DeY2 switching line and the companion line 1411 both are considered high to render the gate fully conditioned and therefore the output line WP02 is also high. Thereafter the line WP02 as shown in FIGURE 13 is conditioned for a read in operation and, as was described earlier in connection with the check information, the two words from the ledger are read into the location 1321 through 1328.

COMPARISON OPERATION

The description thus far has detailed how the information from the check is read into the magnetic core memory and also into the accumulator register. Further, the description is detailed how information from the ledger is read into the magnetic core memory and from the early general description it is recognized that a comparison is to be made between the information coming from the memory register and the information from the check which is stored in the accumulator register.

In FIG. 21 when the flip-flop 2106 was transferred into its ONE condition, the signal from the lower half of the flip-flop which is transmitted on line 2127 serves to condition the system for a comparison operation. It can be seen from FIG. 21 that the signal on line 2127 passes through the emitter follower and then is guided into four paths each of which is a control signal. For instance, the signal on line 2123 is transmitted therefrom to the gate 1838 in FIG. 18. Since the signal on line 2123 is low, the OR gate 1838 provides a high output signal which provides the condition $\overline{AI}$ or internal subtract. It can be further seen in FIG. 21 that there is a control signal to connect the distributor as a ring counter device and a further control signal which causes the accumulator register to read into the add/subtracter or the arithmetic unit.

Examine the following Table III which sets up all the high signal conditions which will be present when there is a comparison made between the numeral 4 in the memory register and the numeral 4 in the accumulator register.

*Table III*

MR=numeral 4=0–0–1–0–0
AR=numeral 4=0–0–1–0–0
From AR and MR: $\overline{C1}$, Z1, Z2, $\overline{X1}$, $\overline{X2}$, X4, $\overline{X8}$, $\overline{XP}$, $\overline{Y1}$, $\overline{Y2}$, Y4, $\overline{Y8}$, $\overline{YP}$, $\overline{A1}$ and A2
From ONE position: $\overline{Z1}+\overline{X1}$, $\overline{Z2}+\overline{Y1}$, $\overline{S1}$, $\overline{C2}$
From TWO position: $\overline{Z1}+\overline{X2}$, $\overline{Z2}+\overline{Y2}$, $\overline{R2}$, $\overline{C4}$
From FOUR position: $\overline{R4}$, $\overline{CR}$
From EIGHT position: $\overline{Z1}+\overline{X8}$, $\overline{Z2}+\overline{Y8}$, $\overline{R8}$, $\overline{C16}$
From Connector Circuit: $\overline{S2}$, $\overline{S4}$, $\overline{S8}$, $\overline{C10}$, $\overline{B12}$, $\overline{B2}$ If the various high signals which are tabulated above are examined in connection with each of the AND gates under the one position in FIG. 10 it will be found that none of these gates is fully conditioned and therefore there is a low output from the OR gates 1019 and 1020. The low outputs from the OR gates 1019 and 1020 result in a further set of conditions which are added to the table.

Considering the new conditions which have been added to the table, if the AND gates in the two position of FIG. 10 are considered, it also becomes evident that none of these AND gates is fully conditioned and therefore there is a low output from each of the OR gates 1025 and 1026. The low output from each of the OR gates 1025 and 1026 results in a further set of conditions which are added to the table.

If the AND gates in the four position are considered as having applied thereto the signals thus far shown in the table including the latest signals, it will be found that none of the AND gates in the four position is fully conditioned and therefore there is a low output from each of the OR gates 1031 and 1032. The low output signals from each of the OR gates 1031 and 1032 result in a new set of conditions which are added to the table.

If the AND gates in the eight position are considered in view of the high signals in the table, it will be found that none of the AND gates in the eight position is fully conditioned and therefore each of the OR gates 1038 and 1039 provides a low output signal. The output signal from the OR gates 1038 and 1039 provides a new set of conditions which are also added to the table.

Referring again to the table which has been developed thus far, consider the operation of the adder/subtracter correction circuit shown in FIG. 12. Since we are not attempting to do a sterling or a limited binary operation here, two additional conditions are added to the table.

If the AND gates in the two position in FIG. 12 are examined, it will be found that none of these AND gates is fully conditioned and therefore the OR gate 1212 provides a low output therefrom. The low output from the OR gate 1212 adds an additional condition $\overline{S2}$ to the table.

If the AND gates in the four position of FIG. 12 are now examined in view of the high signals applied in accordance with the table above, it will be found that none of the AND gates in the four position of FIG. 12 is fully conditioned and therefore the OR gate 1213 provides a low output signal therefrom. The low output signal from the OR gate 1213 provides an additional condition to the table $\overline{S4}$.

If the AND gates in the eighth position of FIG. 12 are considered in conjunction with the high signals which are applied in view of the table above, it will be found that none of the AND gates in the eighth position of FIG. 12 is fully conditioned and therefore the OR gate 1215 provides a low output therefrom. The low output from the OR gate 1215 provides an additional condition $\overline{S8}$ to be added to the table. If the AND gates under the decimal carry position in FIG. 12 are examined in view of the high signals available as indicated by the table above, it will be found that none of these AND gates is fully conditioned and since the line $\overline{C10}$ also has a high signal thereon, the OR gate 1216 provides a low output therefrom which provides an additional condition to the table $\overline{C10}$.

Now if we examine the information signals, which are the S signals in the table above, we will find that we have $\overline{S1}$, $\overline{S2}$, $\overline{S4}$ and $\overline{S8}$ and a $\overline{C10}$ which indicates that there is an answer of 0000 and no carry. Since we compared the numeral 4 from the check with the numeral 4 from the ledger and effected an internal subtract within the arithmetic unit, we find that the answer is properly 0000 and therefore the two numbers compare.

When a comparison between two words has been made there are three possible outcomes. First, if the two words are equal the answers as designated at the S terminals for each digit will be ZERO. Secondly, if the check account number is higher than the ledger account number, there will be an answer other than ZERO and there will be no "carry out" on line C10. On the other hand, if the ledger account number is larger than the check account number there will be an answer other than ZERO and there will be a "carry out" on line C10. If the latter situation should occur, in all probability, either the ledger cards or the checks are out of sequence and the operator of the system is interested in this situation.

Consider the first situation where the account number from the check equals the account number from the ledger. In this case as each digit is compared the answer transmitted from the arithmetic unit is $\overline{S1}$, $\overline{S2}$, $\overline{S4}$ and $\overline{S8}$. The $\overline{S}$ terminals are connected to an OR gate and if none of them is low, a low signal is transmitted from this OR gate. The low signal from last-mentioned OR gate is transmitted on line 2313 to inhibit AND gate 2306. If AND gate 2306 is not inhibited the output signal therefrom will transfer flip-flop 2130 to its ONE condition. When flip-flop 2130 is in its ONE condition the ledger cards are transported through the printing station. When there is a match between the account numbers the ledger should be stopped at the printing station, hence the AND gate 2306 is inhibited when the digits are equal.

Consider the second case where the account number of the ledger is lower than the account number of the check. In this case at some digit time during the comparison the output from the adder/subtracter will be other than ZERO, in which case the OR gate handling the S signals provides a high output signal. The high output signal from this last-mentioned OR gate is transmitted to line 2313 to condition AND gate 2306. Assuming that all the other input lines to gate 2306 are properly conditioned, at *t*4–1 time there will be a signal from AND gate 2306 to transfer the ready gate flip-flop 2130 to its ONE condition. When the flip-flop 2130 is in its ONE condition the ready gate is open and therefore the ledgers continue to be transported past the printing station. However, simply because there has been an adder/subtracter answer other than ZERO it cannot be determined from this condition alone whether or not the account number of the ledger is greater or less than the check number. Therefore the machine interrogates the carry flip-flop which provides the signal $\overline{C10}$ on line 2314. If in fact the ledger account number is lower than the check account number there will be no carry and therefore the $\overline{C10}$ line will have a high signal thereon. With a high signal on line 2314 the OR gate 2315 provides a low output signal which is transmitted to inhibit the AND gate 2316. Since gate 2316 is inhibited the flip-flop 2130 is not restored to its ZERO condition and therefore the ledger cards continue to be transported past the printing station.

If the third situation were present, i.e., the situation in which the ledger card account number is higher than the check account number, flip-flop 2130 would initially be transferred to its ONE condition as described with the second situation. However in the third situation the $\overline{C10}$ line would have a low signal thereon since there would be a carry out and therefore the high output from OR gate 2315 further conditions AND gate 2316. The output from the AND gate 2316 restores the flip-flop 2130 to its ZERO condition at *t*7–1 time. Therefore the ready gate is closed and the ledger is stopped at the printing station.

It will be also noted that the output from the AND gate 2316 has a second path labelled *eocd*. This signal on line 2317 causes the system to go to the next instruction which in all probability will be to eject the ledger card, or at least enable the operator to determine whether the ledger card or the check is out of sequence. The output signal from AND gate 2318 is labelled *deocd* which will cause the system to skip the following instruction. If flip-flop 2130 is in its ZERO condition (all other inputs being high) the *deocd* signal will be generated.

When the comparison has been made and the amount from the check is to be subtracted from the amount on the ledger card there follow three instructions: 3003, 3311, and 3103. It can be determined from the instruction signal Table II, that these instructions indicate: (3003) the accumulator will be cleared and the information from WP03 will be added, thereby putting the ledger amount into the accumulator register; (3311) the amount of the check which is in WP11 will be subtracted from the accumulator; and (3103) the contents of the accumulator will be stored in the memory location 03.

The actual subtraction process and the answers are readily worked out with FIGURES 9 through 12 as were the operations described above. The arithmetic unit will handle one digit from the accumulator register and one digit from the memory register at any one time. When the digit from the memory register is subtracted from the digit from the accumulator register, the digit answer will be transmitted to the magnetic core memory in the same fashion as was described above when such an information transfer was considered.

In order to simplify the subtraction operation, the following table has been developed showing the operation that is taking place and what conditions are present at each step and ultimately the S conditions which are the answers in the arithmetic unit indicate how the machine operates to subtract the amount $43.18 from the balance $205.69.

*Table IV*

(X) (Y)

$205.69 minus $43.18

9 minus 8

| | |
|---|---|
| Initially | X1, $\overline{X2}$, $\overline{X4}$, X8, $\overline{Y1}$, $\overline{Y2}$, $\overline{Y4}$, Y8, $\overline{A1}$, Z1, Z2, $\overline{C1}$, A2 |
| FIG. 10 | R1=S1, $\overline{C2}$, $\overline{R2}$, $\overline{C4}$, $\overline{R4}$, $\overline{C8}$, $\overline{R8}$, $\overline{C16}$ |
| FIG. 12 | $\overline{B12}$, $\overline{B2}$, $\overline{S2}$, $\overline{S4}$, $\overline{S8}$, $\overline{C10}$ |
| | S1, $\overline{S2}$, $\overline{S4}$, $\overline{S8}$=One |

6 minus 1

| | |
|---|---|
| Initially | $\overline{X1}$, X2, X4, $\overline{X8}$, Y1, $\overline{Y2}$, $\overline{Y4}$, $\overline{Y8}$, $\overline{A1}$, Z1, Z2, $\overline{C1}$, A2 |
| FIG. 10 | R1=S1, C2, $\overline{R2}$, $\overline{C4}$, R4, $\overline{C8}$, $\overline{R8}$, $\overline{C16}$ |
| FIG. 12 | $\overline{B12}$, $\overline{B2}$, $\overline{S2}$, S4, $\overline{S8}$, $\overline{C10}$ |
| | S1, $\overline{S2}$, S4, $\overline{S8}$=Five |

5 minus 3

| | |
|---|---|
| Initially | X1, $\overline{X2}$, X4, $\overline{X8}$, Y1, Y2, $\overline{Y4}$, $\overline{Y8}$, $\overline{A1}$, Z1, Z2, $\overline{C1}$, A2 |
| FIG. 10 | $\overline{R1}$=$\overline{S1}$, $\overline{C2}$, R2, C4, $\overline{R4}$, $\overline{C8}$, $\overline{R8}$, $\overline{C16}$ |
| FIG. 12 | $\overline{B12}$, $\overline{B2}$, S2, $\overline{S4}$, $\overline{S8}$, $\overline{C10}$ |
| | $\overline{S1}$, S2, $\overline{S4}$, $\overline{S8}$=TWO |

0 minus 4

| | |
|---|---|
| Initially | $\overline{X1}$, $\overline{X2}$, $\overline{X4}$, $\overline{X8}$, $\overline{Y1}$, $\overline{Y2}$, Y4, $\overline{Y8}$, $\overline{A1}$, Z1, Z2, $\overline{C1}$, A2 |
| FIG. 10 | $\overline{R1}$=$\overline{S1}$, $\overline{C2}$, $\overline{R2}$, $\overline{C4}$, R4, C8, R8, C16 |
| FIG. 12 | $\overline{B12}$, $\overline{B2}$, S2, S4, $\overline{S8}$, C10 |
| | $\overline{S1}$, S2, S4, $\overline{S8}$=Six |

2 minus 0

| | |
|---|---|
| Initially | $\overline{X1}$, X2, $\overline{X4}$, $\overline{X8}$, $\overline{Y1}$, $\overline{Y2}$, $\overline{Y4}$, $\overline{Y8}$, $\overline{A1}$, Z1, Z2, C1, A2 |
| FIG. 10 | R1=S1, C2, $\overline{R2}$, $\overline{C4}$, $\overline{R4}$, $\overline{C8}$, $\overline{R8}$, $\overline{C16}$ |
| FIG. 12 | $\overline{B12}$, $\overline{B2}$, $\overline{S2}$, $\overline{S4}$, $\overline{S8}$, $\overline{C10}$ |
| | S1, $\overline{S2}$, $\overline{S4}$, $\overline{S8}$=1 |

Total answer 162.51=New Balance

In summary at this point, the description has indicated how the amount and the account number from the check can be read into the magnetic core memory through the memory register and thereafter into the accumulator register; how the information can be read from the ledger into the memory register and into the magnetic core memory and further how the information from the ledger is compared with the information in the accumulator register upon read-in; and finally how an arithmetic operation in particular a subtraction of the amount of the check from the balance on the ledger can be made.

Throughout the description we have referred to various control signals and timing signals and it was suggested at various points that we merely accept that certain signals were present. At this point then, in the description of the operation, let us consider how some of the timing signals are developed and how some of the control signals are developed which were used and referred to in the description which has preceded.

CONTROL CIRCUITS AND TIMING CIRCUITS

Consider first FIGURES 26 and 27. FIGURE 26 shows the means for providing eight *v* pulses. Throughout the description there have been numerous references to a *v* pulse arriving at a particular component and causing it to function. The *v* pulses are generated along the delay lines in the bank of delay lines 2601. The *v* pulses are initiated by a *v* initiating signal from some component that is conditioned such that the operation is going to use *v* pulses. These *v* pulses are transmitted from various parts of the machine into the OR gate 2602. It will be recalled, for instance, in connection with FIGURE 18 that when the gate 1801 was fully conditioned it provided the initiation of a *v* pulse on line 1822.

The *v* pulse on line 1822 in FIGURE 18 is one of the *v* pulses that is transmitted to the OR gate 2602.

When the *v* pulse arrives at the OR gate 2602 there is provided a high output signal therefrom on line 2603, which is steered to the AND gate 2604. An additional control on the *v* timing signal is provided by a flip-flop 2605. As long as the flip-flop 2605 is in its restored condition there will be a high signal on line 2606 and therefore when the output from the OR gate 2602 is transmitted to the AND gate 2604 there is provided a low signal on line 2607. The low signal on line 2607 is transmitted to the OR gate 2608 and thereafter is transmitted through the delay lines in the bank of delay lines 2601. It can be seen that the tap-off points between the delay lines provide the various *v* signals *v*0–1 through *v*8–1. In order to accomplish some of the operations in the system an inverted *v* signal must be provided and this is accomplished, for instance, at *v*1–0 through the inverter 2609.

In FIGURE 27, the *t* signals are generated in substantially the same manner as are the *v* signals and one of the significant differences in the *t* timing pulse signal generating means is that there is provision in the bank of delay lines 2701 for providing ten *t* pulses rather than eight pulses which are provided in the *v* timing generator means. Also the *t* timing generator means provides additional inverted *t* pulses.

It should be understood that the *t* and *v* pulses are used throughout the system wherever they are needed and are initiated by the logic circuitry which needs these pulses. In this way it becomes clear that the timing signals are asynchronously generated and can be provided whenever they are needed without having the delay which results from waiting until independently and synchronously generated pulses arrive.

We also encountered the presence of bit distributor signals when the description referred to the reading of the ledger numerals. In FIGURE 28 there is shown a bit distributor device which is simply a bank of five flip-flops. The flip-flops in the bit distributor device are arranged to form a ring counter and are pulsed through the ring with each of the shift pulses arriving on line 2801. The shift pulses are also initiated in the same way that the *v* pulses are, in that there is not a clock timing arrangement continually shifting these bit distributor pulses but instead when the logic of the system recognizes there is a need for a new bit distributor signal a *bds* signal is transmitted to the OR gate 2802. The OR gate 2803 handles signals which are transmitted thereto to reset the ring counter of the bit distributor back to its home posiion.

It will be recalled that an instruction had four letter portions XWYZ. The X and Y instruction signals are handled in an identical fashion and can be understood from FIGURE 29. In FIGURE 29 there is shown a group of flip-flops arranged in counter form 2901. This group of flip-flops 2901 plays a dual role in that sometimes it is used as a straight binary counter and other times it is used as simply a means of storing information to be used in the translation of instructions. For instance, from a tape, or a dial, or a plugboard weighted parallel signals are transmitted to the OR gates 2902. The instruction signals to the OR gates 2902 served to transfer the flip-flops in the bank 2901 into their respective ONE conditions if, in fact, there is a ONE signal transmitted to these OR gates. In this way the output signals represent some number.

Consider in addition the logic circuitry of FIGURE 30. In FIGURE 30 there is a group of gates shown which provided the coded Y address and the decoding operation is a means of decoding the IY signals from FIGURE 29. For instance, it will be recalled that when the word from the check was to be stored in the magnetic core memory the address 11 was given to it. In this case the IY signals transmitted to the counter 2901 would set that counter 2901 in the state 1–0–0–0. In accordance therewith, there would be the following high signals, IY1, $\overline{IY2}$, $\overline{IY4}$, $\overline{IY8}$. If the AND gates in FIGURE 30 are considered in view of these IY signals, it will be found that the AND gate 3001 is fully conditioned and therefore there is provided therefrom a high DEY1 signal. In this same way a high DEX signal is developed because there is similar equipment and circuitry to take care of the IX instruction signals. If at this point we examine FIGURE 14, it will be recalled that a DEX1 signal and a DEY1 signal were the signals that properly conditioned the AND gates 1409 to provide a signal on the WP11 line 1410.

When the counter 2901 of FIGURE 29 is used to count signals, for instance, IYN signals, it becomes a limited decimal binary counter. For instance when the count becomes 1–0–0–1, indicating the numeral nine, the tenth signal will be transmitted from the ONE side of the eight flip-flops along line 2903 and return through the gate 2904 to inhibit the gate 2905. At the same time this signal from the ONE condition of the eight stage of the counter is transmitted on line 2906 through the AND gate 2907 and on through the OR gate 2908 to reset each of the flip-flops in counter 2901 to its home position.

In retrospect then, thus far we have seen how the IX and the IY instruction signals are decoded into DE signals which were used in the description above.

FIGURES 31 and 32 are provided to show how the IW and also the IV instruction signals are transformed into DEV and also DEW decoded signals. The operation is quite similar to the one described for IX and IY signals. In FIGURE 31, the set of flip-flops are not used as a counter but simply as a storage device. The instruction V and also the instruction W signals are transmitted the flip-flop bank 3101 and these flip-flops in turn provide IV and $\overline{IV}$ signals, as shown. The IV and $\overline{IV}$ signals are transmitted to the AND gates shown in FIGURE 32 and provide therefrom decoded V and also decoded W signals. The circuitry for the W instruction and decoded signals is not shown, but is to be understood that it is substantially identical to the circuitry shown for the instruction V and decoded V signals.

Further consider FIGURE 33 which shows the digit distributor pulse signal generations. The digit distributor is simply a ring counter as shown by the bank of flip-flops 3301. The various inputs to the shift register, for instance DDB, *dds*, *ddd* and *ddc* are all shown being gated into OR gates. These various signals are initiated as were the *v* and *t* pulses, whenever the logic circuitry of the system recognizes that a digit distributor signal is necessary. There is provided on the line 3302 a means for restoring the digit distributor ring counter to its home position. When there is a DDB pulse transmitted to the OR gate 3303, the output therefrom is transmitted to the AND gate 3304 to cause the counter to act as a ring counter. In other words, when the last position of the counter is transferred to its ONE condition, the output signal therefrom is transmitted via line 3305 to the AND gate 3304 and back to the first position of the counter via the lines 3306. Many various types of flip-flops may be used in the various counters. Since bistable multivibrators and variation thereof which are used with shift registers, etc., are well known, it is not necessary to describe any particular one bistable multivibrator in connection with the description of this system.

Consider now FIGURES 34 and 35 of which represent respectively the SA accumulator shift register and the SE accumulator shift register. The SA accumulator shift register is identical to the SB, SC, and SD accumulator shift registers illustrated in FIG. 5. Each of these accumulator shift registers is composed of twelve flip-flops connected together to form a shift register. In FIGURE 34 the shift signal is transmitted on line 3401 while the clear or reset signal is transmitted on line 3402. When the accumulator shift register is used as a ring counter to accomplish a comparison, the circuit connection from the ONE side of flip-flop 3403 to AND gate 3404 comes into consideration. Since the information in the accumulator register is used repeatedly in the comparison operation wherein a check account number is compared with a group of account numbers from a group of ledgers, the accumulator registers are connected as ring counters. The signal on line 3405 is a "connect as ring" signal and fully conditions the AND gate 3404 when the flip-flop 3403 is in its ONE state.

The shift register, FIGURE 35, is identical to that of FIGURE 34 excepting that as can be seen in FIGURE 35 when the shift register is cleared or reset, it is restored to its ONE condition throughout rather than to its ZERO condition.

Consider FIGURE 36 which is an illustration of the memory register control. It will be noted that to each of the AND gates in the bank 3601 there is connected either an S or a $\overline{S}$ input line. These S and $\overline{S}$ input lines come from the arithmetic unit and signals thereon are continually attempting to be transferred into the memory register. When in fact a Z5 signal is transmitted to the OR gate 3602, indicating that the add-subtract unit, or the arithmetic unit, is to be read into the memory register, there is an additional conditioning signal placed on each of the AND gates 3601. Therefore during a Z5 instruction whichever AND gates have a high S or $\overline{S}$ signal thereon will be fully conditioned, and consequently the corresponding *mr* output signals will transfer information into the memory register.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A data processor system comprising: first data input means to be coupled to a data source; first data storage means coupled to said data input means; arithmetic means connected to said first data storage means to receive data therefrom; second data storage means loop-connected to transmit data to said arithmetic means and receive data from said arithmetic means; data utility means coupled to said arithmetic means to receive output data therefrom and respond in accordance therewith; and circuit control means coupled to each of (1) said first data storage means, (2) said second data storage means, and (3) said arithmetic means to control data transmission through said first data storage means to said arithmetic means to be compared and to be mathematically operated thereon in conjunction with data from said second data storage means.

2. A data processor system comprising: first data input means to be coupled to a first data source; second data input means to be coupled to a second data source; first data storage means coupled to both said first and said second data input means; arithmetic means coupled to said first data storage means to receive data therefrom; second data storage means loop-connected to said arithmetic means to transmit data thereto and to receive data therefrom; third data storage means loop connected to transmit data to said first data storage means and receive data from said first data storage means; data utility means coupled in said arithmetic means to receive output data therefrom and respond in accordance therewith; and circuit control means coupled to each of (1) said first data storage means, (2) said second data storage means, (3) said third data storage means, and (4) said arithmetic means to control data transmission through said first data storage means to said arithmetic means selectively both (1) from said first and second data sources and (2) from said third data storage means, said data from said first data storage means to be mathematically operated upon by said arithmetic means in conjunction with data from said second data storage means.

3. A data processor system according to claim 2 wherein said second data storage means is loop connected from its output means to its input means thereby enabling data stored therein to be repeatedly retrieved therefrom without the loss of said data.

4. A data processor system comprising: first data input means to be coupled to a first source of binary coded digits; second data input means to be coupled to a second source of binary coded digits; first data storage means including a plurality of bistable multivibrators with one each for each different weighted bit of one of said binary coded digits, said first data storage means coupled to both said first and second data input means; arithmetic means connected to receive bit signals from said plurality of bistable multivibrators; second data storage means loop-connected to transmit bit signals to said arithmetic means and receive bit signals from said arithmetic means; data utility means coupled to said arithmetic means to receive bit signals therefrom and respond in accordance therewith; and control means circuitry coupled to each of (1) said first data storage means, (2) said second data storage means, and (3) said arithmetic means to control the transmission of bit signals through said first data storage means to said arithmetic means to be mathematically operated thereon in conjunction with bit signals from said second data storage means.

5. A data processor system for use with binary coded words wherein said words each have a predetermined number of binary coded digits comprising: first data input means to be coupled to a first source of binary coded digits; second data input means to be coupled to a second source of binary coded digits; first data storage means including a plurality of bistable multivibrators with one each for each different weighted bit of one of said binary coded digits, said first data storage means coupled to both said first and second data input means; arithmetic means connected to receive bit signals from said plurality of bistable multivibrators; second data storage means including a plurality of banks of bistable multivibrators, each of said banks having as many bistable multivibrators as said predetermined number of said binary coded digits, said second data storage means having as many banks as there are different weighted bits in one of said binary coded digits; said second data storage means loop connected to transmit bit signals to said arithmetic means and receive bit signals from said arithmetic means; data utility means coupled to said arithmetic means to receive bit signals therefrom and respond in accordance therewith; and control circuitry means coupled to each of (1) said first data storage means, (2) said second data storage means, and (3) said arithmetic means to control the transmission of bit signals through said first data storage means to said arithmetic means to be mathematically operated thereon in conjunction with bit signals from said second data storage means.

6. A data processor system according to claim 5 wherein there is further included third data storage means loop connected to transmit bit signals to said first data storage means and receive bit signals from said first data storage means.

7. A data processor system according to claim 6 which further includes means connected to said arithmetic means to generate a parity number for each binary coded digit processed and means to check said parity number for error.

8. Data processing apparatus for use with binary coded words made up of binary coded digits comprising: first data input means to be coupled to a first source of binary coded digits; second data input means to be coupled to a second source of binary coded digits; first data storage means coupled to both said first and said second data input means; second data storage means; control signal source means; arithmetic means including a plurality of coincident gate devices each of which has a plurality of input means, said plurality of gate devices arranged in groups with each group individually assigned to each weighted bit of one of said binary coded digits, said input means of said gate devices selectively connected to said first and said second data storage means to receive bit signals therefrom according to the weight of their respective groups and further connected to said control signal source means to receive control signals therefrom; said gate devices providing intermediate and final answer bit signals; first circuitry means connecting said arithmetic means to said second data storage means to transmit signals thereto; second circuitry means further connecting said control signal source means to said first data storage means and said second data storage means to control the transmission of bit signals through said first data storage means to said arithmetic means to be mathematically operated thereupon in conjunction with bit signals from said second data storage means.

9. Data processing apparatus comprising: first data input means to be coupled to a first data source; second data input means to be coupled to a second data source; first data storage means coupled to both said first and said second data input means; arithmetic means connected to receive data from said first data storage means; second data storage means loop connected to transmit data to said arithmetic means and receive data from said arithmetic means; data utility means coupled to said arithmetic means to receive output data therefrom and respond in accordance therewith; control circuitry means coupled to each of (1) said first data storage means, (2) said second data storage means, and (3) said arithmetic means to control data transmission through said first data storage means to said arithmetic means to be mathematically operated thereon in conjunction with data from said second data storage means, and asynchronous timing circuit means connected to said control circuitry means to provide timing pulses throughout the data processing apparatus.

10. A data processor system comprising, in combination, data input means for receiving first signals from a data source; said data input means receiving second signals from said data source; first data storage means operatively coupled to said data input means; arithmetic means connected to said first data storage means to receive data signals therefrom; second data storage means connected to said arithmetic means to transmit data signals thereto and to receive data signals therefrom; third data storage means including a magnetic core memory having non-destructive information read out means, said third data storage means having its magnetic core memory connected to said first data storage means to transmit data signals thereto and to receive data signals therefrom; data utility means coupled to said arithmetic means to receive output data therefrom and respond in accordance therewith; and control means circuitry coupled to each of said first data storage means, said second data storage means, said third data storage means and said arithmetic means, and operable to control data signal transmission to said arithmetic means for mathematical calculations thereon.

11. A data processor system comprising, in combination, first data input means for receiving data signals from a first data source; second data input means for receiving data signals from a second data source; first data storage means coupled to both said first and said second data input means and operable to store the data signals therefrom; arithmetic means connected to said first data storage means to receive data signals therefrom; second data storage means loop connected to said arithmetic means for transmitting data signals and for receiving data signals from said arithmetic means; a word organized magnetic memory means connected to said first data storage means, said magnetic memory means being operable automatically to both (1) read information bit signals from its memory into said first data storage means and (2) write said bit signals into its memory from whence it came; data utility means coupled to said arithmetic means to receive output data therefrom and respond in accordance therewith; and circuit control means coupled to each of (1) said first data storage means, (2) said second data storage means, and (3) said arithmetic means to control the transmission of the data signals through said first data storage means to said arithmetic means selectively both (1) from said data sources and (2) from said word organized magnetic memory for mathematical operation upon the signals in conjunction with data signals from said second data storage means.

12. A data processor system for use with binary coded words made up of binary coded digits comprising: first data input means to be coupled to a first source of binary coded digit signals; second data input means to be coupled to a second source of binary coded digit signals; first data storage means coupled to both said first and said second data input means for storing the digit signals received therefrom; arithmetic means including both (1) means to mathematically translate bit signals into a set of intermediate answer signals having a base 16 and (2) means to correct said intermediate answer bit signals to final answer bit signals having a base 10; said arithmetic means connected to said first data storage means to receive bit signals therefrom; second data storage means loop connected to transmit bit signals to said arithmetic means and receive bit signals from said arithmetic means; data utility means coupled to said arithmetic means to receive said final answer bit signals therefrom and respond in accordance therewith; and control means circuitry coupled to each of (1) said first data storage means, (2) said second data storage means, and (3) said arithmetic means to control the transmission of bit signals through said first data storage means to said arithmetic means to be mathematically operated thereon in conjunction with the bit signals from said second data storage means.

13. A data processor system according to claim 12 and further including a parity generator means connected to said arithmetic means for generating a parity number for each binary coded digit processed and means to provide a parity check of said parity numbers for errors.

14. A data processor system for use with binary coded words made up of binary coded digits comprising: first data input means for receiving binary coded digit signals from a first source of such signals; second data input means for receiving binary coded digit signals from a second source of such signals; first data storage means coupled to both said first and said second data input means for storing the coded digit signals received therefrom; arithmetic means including means to mathematically translate bit signals into a set of intermediate answer bit signals having a base 16 and further means to convert said intermediate answer bit signals to final answer bit signals having a base 12; said arithmetic means connected to said first data storage means for receiving bit signals therefrom; second data storage means forming a closed circuit loop with said arithmetic means and operable to transmit bit signals to the arithmetic means and receive bit signals from the arithmetic means; data utility means coupled to said arithmetic means to receive said final answer bit signals therefrom and respond in accordance therewith; and control circuit means coupled to each of said first data storage means, said second data storage means, and said arithmetic means to control the transmission of bit signals to said arithmetic means; said arithmetic means performing mathematical calculations on the signals thus received to provide said intermediate and final answer bit signals.

15. A data processor system for use with binary coded words made up of binary coded digits comprising; first data input means to be coupled to a first source of binary coded digits; second data input means to be coupled to a second source of binary coded digits; first data storage means coupled to both said first and said second data input means; arithmetic means including both (1) means to mathematically translate bit signals into a set of intermediate answer bit signals having a base 16 and (2) means to correct said intermediate answer bit signals to final answer bit signals having a base (2); said arithmetic means connected to receive bit signals from said first data storage means; second data storage means connected to transmit bit signals to said arithmetic means and receive bit signals from said arithmetic means; data utility means coupled to said arithmetic means to receive said final answer bit signals therefrom and respond in accordance therewith; and control means circuitry coupled to each of (1) said first data storage means, (2) said second data storage means, and (3) said arithmetic means to control the transmission of bit signals through said first data storage means to said arithmetic means to be mathematically operated thereon in conjunction with bit signals from said second data storage means.

16. An item processor system comprising: first data input means for receiving data signals read from a first item; second data input means for receiving data signals read from a second item; first data storage means coupled to both said first input means and said second input means and operable to store the data signals received thereby; arithmetic means connected to said first data storage means for obtaining the data signals stored therein; second data storage means loop-connected to transmit data signals to said arithmetic means and to receive data signals from said arithmetic means; item control means coupled to said arithmetic means for receiving control signals therefrom for controlling the physical transportation of said second item in accordance with the data output from said arithmetic means; and data flow control means coupled to each of (1) said first data storage means, (2) said second data sorage means, and (3) said arithmetic means to control the transmission of data signals to the arithmetic means to effect a comparison by a mathematical operation between the data signals from said first item and the data signals from said second item.

17. A system for processing binary coded words each of which is composed of one or more binary coded digits comprising: first data input means for receiving binary coded digit signals from a first source of such signals; second data input means for receiving binary coded digit signals from a second source of such signals; first data storage means including a plurality of bistable multivibrators having each one individually assigned to a different weighted bit, corresponding to the bits of said binary coded digit signals, said first data storage means coupled to both said first and said second data input means; arithmetic means including both means to mathematically translate bit signals into a set of intermediate answer bit signals having a base 16 and means to correct said intermediate answer bit signals to final answer bit signals having a base 10, said arithmetic means connected to receive bit signals from said first data storage means; second data storage means including a plurality of banks of bistable multivibrators, each of said banks having the same number of bistable multivibrators as the maximum number of digits provided by each of said binary coded words, each of said banks being assigned to a weighted bit corresponding to the bits of one of said coded digits, said second data storage means loop-connected to transmit bit signals to said arithmetic means and receive bit signals from said arithmeti: means, data utility means coupled to said arithmetic means to receive final answer bit signals therefrom and respond in accordance therewith; and control means circuitry coupled to each of (1) said first data storage means, (2) said second data storage means, and (3) said arithmetic means to control the transmission of bit signals through said first data storage means to said arithmetic means to be mathematically operated thereon in conjunction with bit signals from said second data storage means.

18. A data processor system according to claim 17 wherein there is further included a parity generator means for generating a parity binary number for each digit processed and means to check said parity numbers for errors.

19. A data processor system according to claim 17 wherein there is further included a word organized magnetic core memory means loop-connected to said first data storage means, said word organized magnetic core memory means having means to automatically both (1) read information bit signals from said magnetic cores into said first data storage means and (2) write said bit information into the cores from whence it came; and further means connecting said control means to said word organized magnetic core memory means.

20. A data processing system comprising a first and a second temporary data storage means, third permanent data storage means, said stored data comprising groups of digits; each of said groups comprising value data and identification data, said first storage means being responsive to receive successive groups of said data, control means to effe:t feeding a first group of said successive groups of said data into said first storage means and then into said third storage means, and to effect transfer of the identification data of said group back into said first storage means and then into said second storage means, and to effect transfer of identification digits of the next succeeding group into said first temporary storage means, an arithmetic unit to compare the identification digits of the successive groups which are retained in said first and in said second storage means for predetermined relationship and upon such relationship occuring to further process the groups of data.

21. The apparatus of claim 20 wherein upon said comparison, the value data of said next succeeding group is received by said first temporary storage means and transferred into said third permanent storage means, said control means further comprising means to non-destructively retrieve said groups of value digits from said third permanent storage means, said arithmetic means further comprising means to mathematically operate upon said successive groups of value data which compare.

22. The apparatus of claim 20, at least one of the identification and the value data of each group having a first parity bit, said arthimetic means further comprising means to generate a second parity bit in accordance with the data which has entered said first storage means, said system further comprising means to check parity of said first and second parity bits and still further comprising means to effect correction in the absence of matching of said first and second parity bits.

23. Data processing apparatus comprising a first document reading station, a second record reading station, first and second temporary storage means, an arithmetic unit, permanent storage means, the documents and the records processed by said document and record reading stations each having compound data comprising value data and identification data, control means to transmit said document value data and identification data into said first temporary storage means and thence into said permanent storage means, means to transfer said document identification data back into said first temporary storage means then through said arithmetic unit and then into said second temporary data storage means, said control means being operative to transfer said record identification data into said first temporary storage means, said arithmetic unit comprising means to compare said identification data from said record in said first temporary register with said identification data from said document in said second temporary register and in accordance with results of said comparison selectively where said record identification data is numeracilly smaller than that of said documents, said control being operative to discard said record information and process the next record and where said record identification data is numerically greater than that of said document to discard both and to provide appropriate operation halt and where said record and document identification compare in predetermined relationship to transmit the value designation from said record to said first temporary storage device and into said permanent storage device and then from said permanent storage into said first temporary storage and into said arithmetic units, said arithmetic unit further comprising means to then perform arithmetic operations upon said record value number in accordance with said document value to provide a combined value.

24. A system for processing data comprising means for reading a sequence of coded data indications from successive documents, each of said indications comprising value data and identification data, first temporary data storage means responsive to said sequence of coded data indications from each of said successive documents, each said indication including at least one first parity digit; a second temporary storage means responsive to said first data storage means to receive data therefrom and an arithmetic unit comprising means to generate at least one second parity digit in accordance with each of said coded data indications and to check that each said first parity digit transmitted to said first storage means is equivalent to each said second generated parity digit and to compare the identification data in said first and said second temporary storage means in a substantially single operation for each pair of successive documents.

25. A data processing system comprising means for reading a data indication from each document of a sequence of successive documents, a first digital storage means responsive to receive each of said successive data indications, each data indication including a plurality of number forming digits and a parity digit, a second digital storage means coupled to said first storage means and responsive to receive the information contained in said first storage means and arithmetic means coupled to both said first and second storage means to check each said parity digit and to compare successive data indications for sequential predetermined relationship of said data of said successive documents, said arithmetic unit further comprising means to shift the system to perform in accordance with a new program step.

26. A data processing system comprising means responsive to indications on each of a plurality of documents to supply binary coded information indications from each said document, a first and a second temporary digital storage means, an arithmetic unit, said first storage means being responsive to receive each of said successive binary coded information indications, said indications each being compounded of value designations and identification designations, at least one of said designations including a parity bit, said second temporary information retaining storage means being responsive to receive the contents of said first temporary storage means to temporarily store the successive indications received therefrom, at a given time the first of two successive designations from successive documents being stored in said second temporary storage means and the second successive designation being stored in said first temporary storage means, said arithmetic unit comprising parity bit generating and checking means to check each said designation parity bit, said arithmetic unit further comprising means to compare the identification designations stored in said first and said second temporary storage means for predetermined relationship.

27. The apparatus of claim 26 including permanent memory means responsive to said first storage means to store indications received therefrom for subsequent retrieval for operation on said last-named indications, said arithmetic unit further comprising means to perform arithmetic operations on said retrieved indications in accordance with the results of said comparison, said retrieval being effected by transfer from said permanent storage means to said first temporary storage means and through said arithmetic unit into said second temporary storage means.

28. Data processing apparatus for processing records having value data and identification data comprising a first record reading means, a second record reading means, first and second storage means, means connected to said reading means and to said first and second storage means and operable to transmit value data and identification data read by said first reading means into said first storage means and to transmit identification data read by said second reading means into said second storage means, an arithmetic unit having means for comparing the identification data read by said first and second record reading means and connected to said first and second storage means and in accordance with the results of said comparison being operable to discard the value data read when the identification data read by the first reading means is numerically greater than that read by the second reading means and to process the next record and further being operable to halt the flow of the records when the identification data read by the first reading means is numerically smaller than that read by the second reading means and being further operable when the identification data read by these reading means is identical to transmit the value data from said first record reading means stored in the first storage means into the arithmetic unit for computation with the value data read from the record by said second record reading means.

29. A data processing system for processing successive records having groups of digits representing value data and identification data comprising a record reading station, a first and a second data storage means, an arithmetic unit, a third data storage means, said first storage means being coupled to said station and responsive to receive successive groups of said data, communications means to couple said record station and said first data storage means and to interconnect each of said data storage means to the other data storage means, control means for said communications means to effect feeding a first group of the successive groups of data into said first storage means and then into said third storage means, and to effect transfer of identification data of said group back into said first storage means and then into said second storage means, and to effect transfer of identification digits of the next succeeding group into said first storage means, said arithmetic unit comprising means to compare the identification digits of the successive groups which are retained in said first and said second storage means for predetermined relationship and upon such relationship occurring to further process the groups of data.

References Cited by the Examiner

UNITED STATES PATENTS

| | | | |
|---|---|---|---|
| 2,615,629 | 10/1952 | Dayger et al. | 235—61.9 |
| 2,901,168 | 8/1959 | Burrell et al. | 235—61.6 |

MALCOLM A. MORRISON, *Primary Examiner.*

CORNELIUS, D. ANGEL, DARYL W. COOK, *Examiners.*

UNITED STATES PATENT OFFICE
CERTIFICATE OF CORRECTION

Patent No. 3,238,356

March 1, 1966

Thomas A. Dowds et al.

It is hereby certified that error appears in the above numbered patent requiring correction and that the said Letters Patent should read as corrected below.

Column 6, line 40, for "yyc=Clear register to" read -- yyc=Clear YY register to --; column 9, lines 56 and 57, for "(ZZ1→AR→A/S; $\overline{ZZ1}$→ZERO→A/S)." read -- (ZZ1⇒AR→A/S; $\overline{ZZ1}$⇒ZERO→A/S). --; lines 58 and 59, for "(ZZ2→MR→A/S; ZZ2→ZERO→A/S)." read -- (ZZ2⇒MR→A/S; ZZ2⇒ZERO→A/S). --; column 11, line 46, for "dial" read -- dials --; column 16, line 52, for "input signal therefrom" read -- output signal therefrom --; column 18, line 28, for "covers" read -- cores --; line 67, for "completness" read -- completeness --; column 23, line 46, for "signaal" read -- signal --; column 25, line 7, for "signal" read -- signals --; column 26, line 38, for "$\overline{MR1}$" read -- MR1 --; column 27, line 62, for "ledge" read -- ledger --; line 72, for "position" read -- condition --; column 30, line 14, for "ledge" read -- ledger --; column 40, line 31, for "(2)" read -- 2 --; column 42, line 20, for "numeracilly" read -- numerically --; same line 20, for "documents" read -- document --.

Signed and sealed this 16th day of May 1967.

(SEAL)
Attest:

EDWARD M. FLETCHER, JR.
Attesting Officer

EDWARD J. BRENNER
Commissioner of Patents